(12) United States Patent
Cunningham et al.

(10) Patent No.: US 6,366,217 B1
(45) Date of Patent: Apr. 2, 2002

(54) WIDE AREA REMOTE TELEMETRY

(75) Inventors: James D. Cunningham, Broken Arrow; Chris L. Schuermann, Sand Springs; Gregg G. Wonderly, Tulsa, all of OK (US); Donald I. Wallace, Overland Park, KS (US); John K. Holmes, Tulsa, OK (US); Keith D. Hollcroft, Overland Park, KS (US)

(73) Assignee: Internet Telemetry Corp., Tulsa, OK (US)

(*) Notice: Subject to any disclaimer, the term of this patent is extended or adjusted under 35 U.S.C. 154(b) by 0 days.

(21) Appl. No.: 09/376,103

(22) Filed: Aug. 16, 1999

Related U.S. Application Data

(62) Division of application No. 09/152,010, filed on Sep. 11, 1998, now Pat. No. 6,124,806.
(60) Provisional application No. 60/058,978, filed on Sep. 12, 1997, and provisional application No. 60/094,057, filed on Jul. 24, 1998.

(51) Int. Cl.[7] .............................................. G08C 19/06
(52) U.S. Cl. ........................... 340/870.31; 340/870.02; 340/637; 73/273
(58) Field of Search ....................... 340/870.02, 870.31, 340/637; 73/273

(56) References Cited

U.S. PATENT DOCUMENTS

| | | | |
|---|---|---|---|
| 3,720,106 A | * 3/1973 | Varga | 73/273 |
| 4,008,458 A | 2/1977 | Wensley | 340/151 |
| 4,264,897 A | 4/1981 | Farnsworth | 340/870 |
| 4,296,411 A | 10/1981 | Romanelli et al. | 340/870 |
| 4,315,248 A | 2/1982 | Ward | 340/825 |
| 4,350,980 A | 9/1982 | Ward | 340/870 |
| 4,388,690 A | 6/1983 | Lumsden | 364/483 |
| 4,463,354 A | 7/1984 | Sears | 340/870 |
| 4,495,596 A | 1/1985 | Sciulli | 364/900 |
| 4,607,527 A | * 8/1986 | Sears | 340/870.02 |
| 4,614,945 A | 9/1986 | Brunius et al. | 340/870 |
| 4,646,084 A | 2/1987 | Burrowes et al. | 340/870 |
| 4,654,662 A | 3/1987 | Van Orsdel | 340/870 |
| 4,663,970 A | * 5/1987 | Sutherland | 73/273 |
| 4,692,761 A | 9/1987 | Robinton | 340/825 |
| 4,724,435 A | 2/1988 | Moses et al. | 340/870 |
| 4,749,992 A | 6/1988 | Fitzemeyer et al. | 340/870 |
| 4,780,910 A | 10/1988 | Huddleston et al. | 455/617 |
| 4,799,059 A | 1/1989 | Grindahl et al. | 340/870 |
| 4,804,938 A | 2/1989 | Rouse et al. | 340/310 |
| 4,811,011 A | 3/1989 | Sollinger | 340/870 |
| 4,817,131 A | 3/1989 | Thornborough et al. | 379/107 |
| 4,839,642 A | 6/1989 | Batz et al. | 340/825 |
| 4,850,010 A | 7/1989 | Stanbury et al. | 379/107 |
| 4,866,761 A | 9/1989 | Thornborough et al. | 379/107 |
| 4,940,976 A | 7/1990 | Gastouniotis et al. | 340/870 |
| 4,975,687 A | * 12/1990 | Murphy, Jr. et al. | 340/688 |
| 5,053,766 A | 10/1991 | Ruiz-del-Portal et al. | 340/870 |

FOREIGN PATENT DOCUMENTS

| | | | |
|---|---|---|---|
| DE | 2613739 | 3/1976 | G01B/7/30 |
| EP | 0629098 A2 | 5/1994 | H04Q/9/00 |

*Primary Examiner*—Timothy Edwards
(74) *Attorney, Agent, or Firm*—Head, Johnson & Kachigian

(57) ABSTRACT

A wide-area remote telemetry system which monitors and controls remote devices by means of a information control system. The system uses a plurality of sensor interface modules which constantly monitor devices for triggering events. The sensor interface modules transmit information to at least one data collection module which gathers, process, stores and transmits information to a host system via standard external communication systems. The host module receives, records, processes, and transmits information to the network. The information may then be transmitted to customers or may be accessed by customers as desired.

5 Claims, 42 Drawing Sheets

U.S. PATENT DOCUMENTS

| | | | |
|---|---|---|---|
| 5,086,292 A | 2/1992 | Johnson et al. | 340/637 |
| 5,107,440 A | 4/1992 | Callahan et al. | 364/492 |
| 5,136,613 A | 8/1992 | Dumestre, III | 375/1 |
| 5,179,569 A | 1/1993 | Sawyer | 375/1 |
| 5,194,860 A | 3/1993 | Jones et al. | 340/370 |
| 5,204,896 A | 4/1993 | Oliver | 379/106 |
| 5,270,704 A | 12/1993 | Sosa Quintana et al. | 340/870 |
| 5,421,201 A * | 6/1995 | Pellerin, Jr. | 73/272 A |
| 5,432,507 A | 7/1995 | Mussino et al. | 340/870 |
| 5,438,329 A | 8/1995 | Gastouniotis et al. | 340/870 |
| 5,448,230 A | 9/1995 | Schanker et al. | 340/870 |
| 5,451,938 A | 9/1995 | Brennan, Jr. | 340/870 |
| 5,475,867 A | 12/1995 | Blum | 455/53.1 |
| 5,481,259 A | 1/1996 | Bane | 340/870 |
| 5,485,150 A | 1/1996 | Hisanaga et al. | 340/870 |
| 5,491,473 A | 2/1996 | Gilbert | 340/870 |
| 5,493,287 A | 2/1996 | Bane | 340/825 |
| 5,495,239 A | 2/1996 | Ouellette | 340/870 |
| 5,523,751 A | 6/1996 | Byford et al. | 340/870 |
| 5,528,507 A | 6/1996 | McNamara et al. | 364/483 |
| 5,528,675 A | 6/1996 | Chen | 379/106 |
| 5,541,589 A | 7/1996 | Delaney | 340/870 |
| 5,559,870 A | 9/1996 | Patton et al. | 379/107 |
| 5,590,179 A | 12/1996 | Shincovich et al. | 379/107 |
| 5,602,744 A | 2/1997 | Meek et al. | 364/464 |
| 5,617,084 A | 4/1997 | Sears | 340/870 |
| 5,631,636 A | 5/1997 | Bane | 340/825 |
| 5,659,300 A | 8/1997 | Dresselhuys et al. | 340/870 |
| 5,659,303 A | 8/1997 | Adair, Jr. | 340/870 |
| 5,673,252 A | 9/1997 | Johnson et al. | 370/94.1 |
| 5,684,472 A | 11/1997 | Bane | 340/870 |
| 6,100,816 A * | 8/2000 | Moore | 340/870.02 |

* cited by examiner

FIG. 17
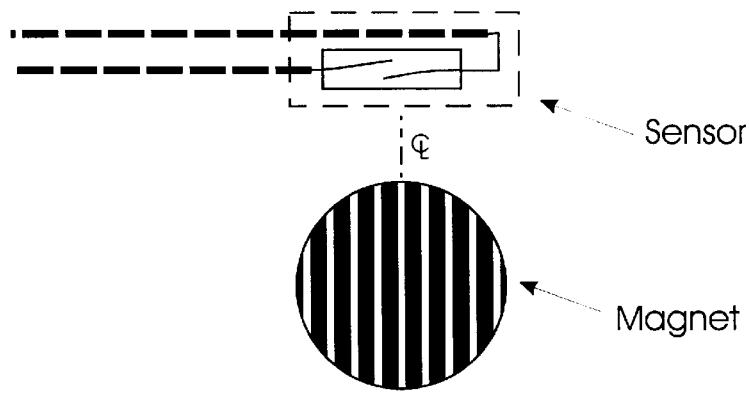
One rotation of the magnet in this configuration
Open/Close indicates the status of the contacts of the reed switch
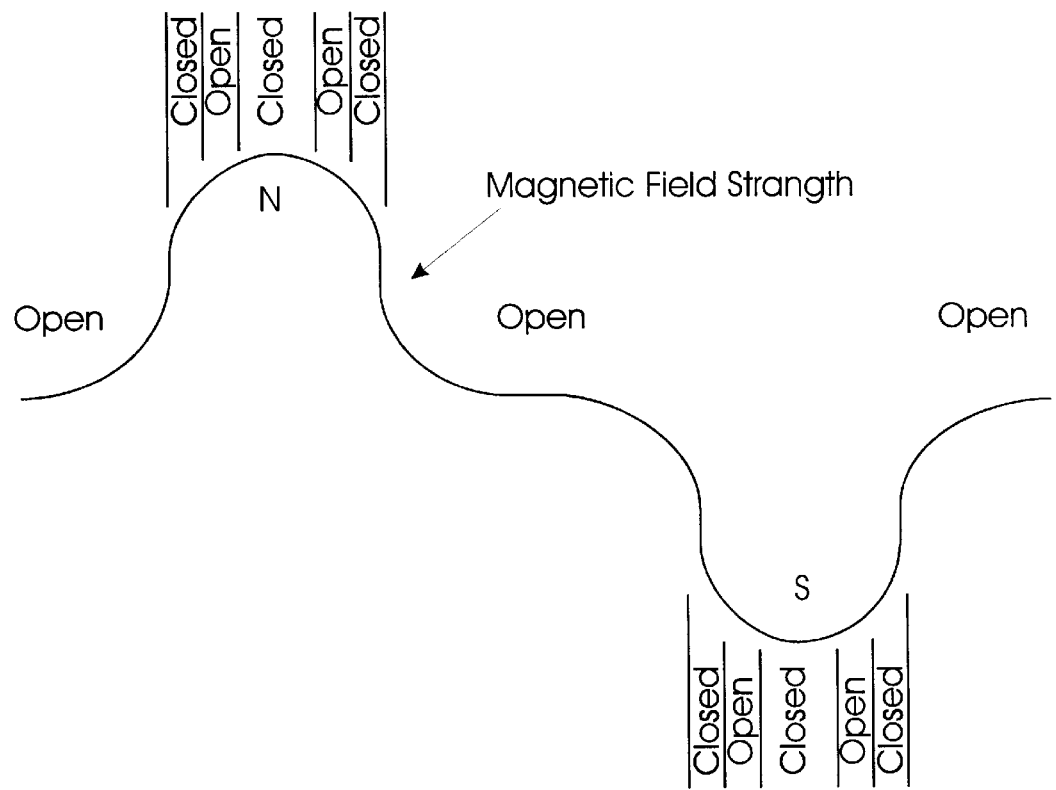

FIG. 18
Use a second sensor to detect tanpering
Be sure that the second sensor does not
detect the rotating magnet.
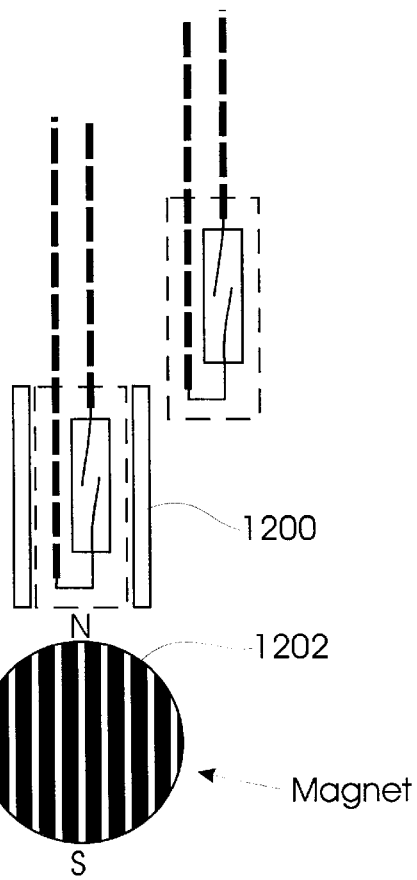
1200
1202
Magnet
One rotation of the magnet in this configuration
Open/Close indicates the status of the contacts of the reed switch
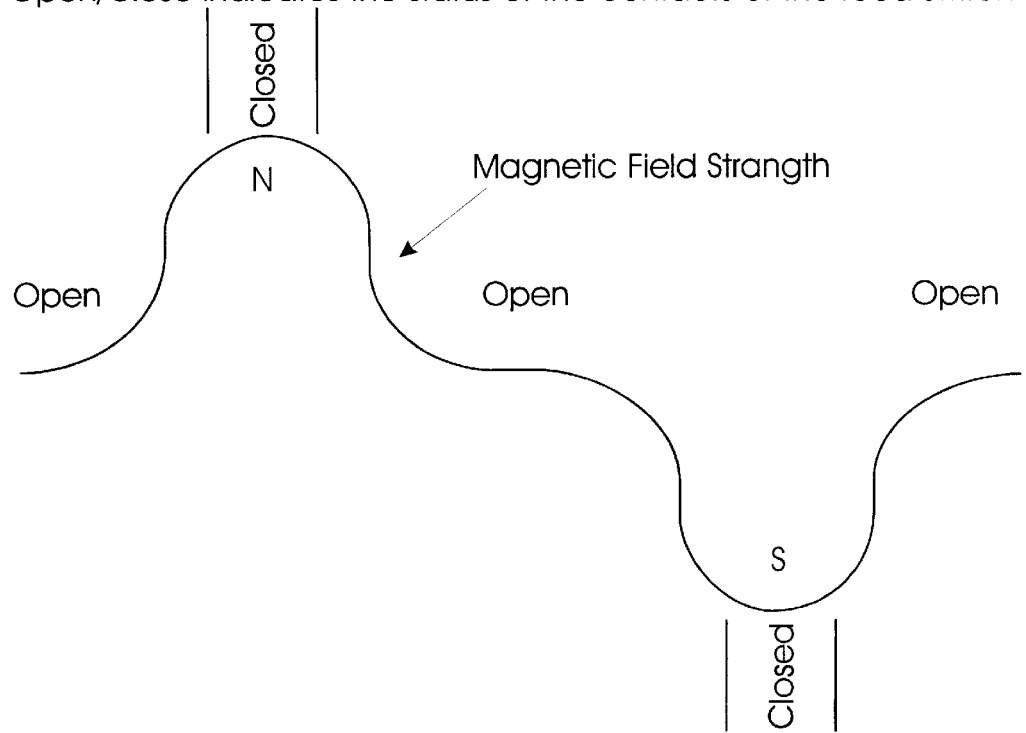

PAN connection to Telemetry Gateway via short range spread spectrum transceiver ( Transmit only option )

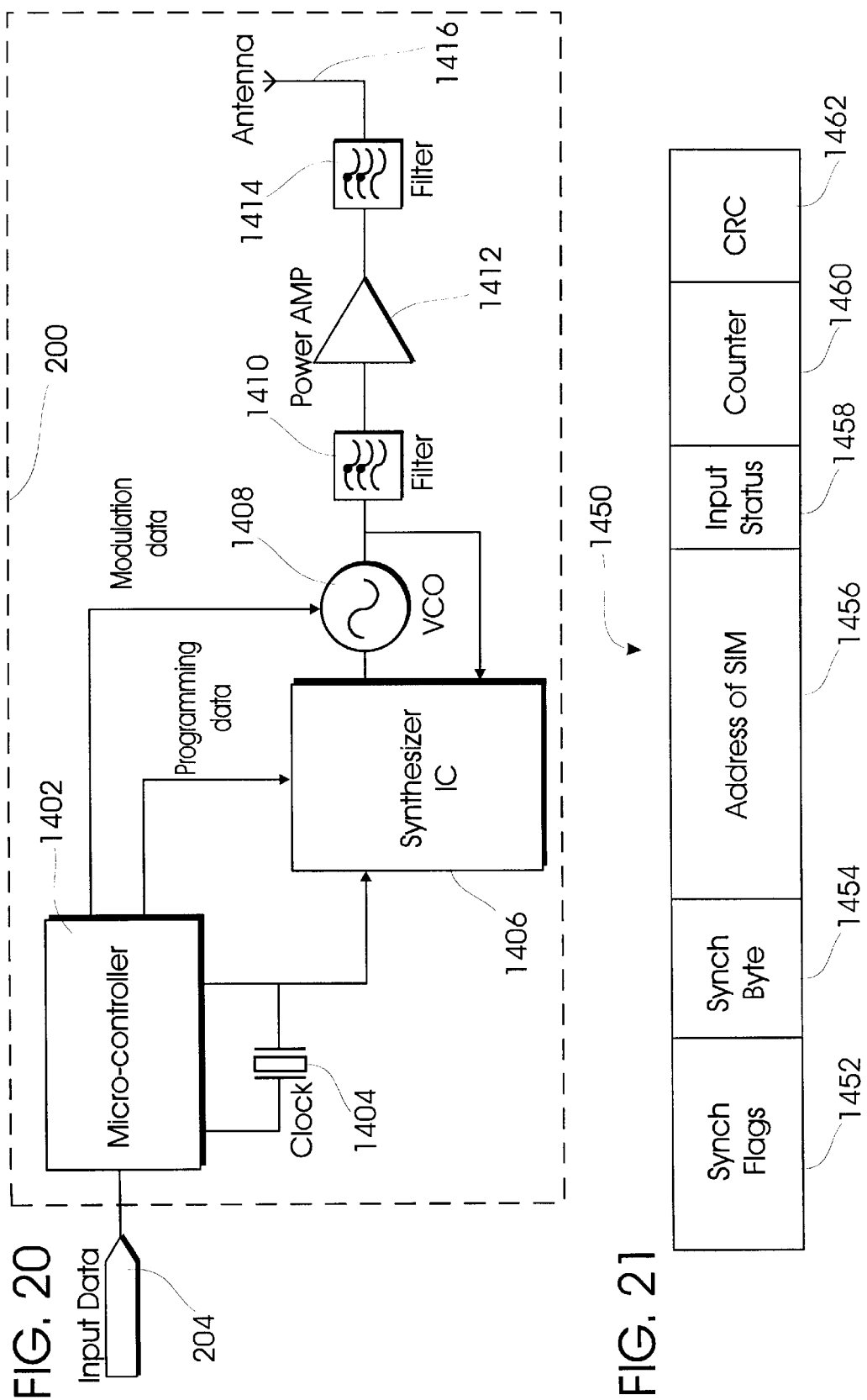

WinGate CPU Board Functional Block Diagram

WIDE AREA REMOTE TELEMETRY

CROSS REFERENCE TO RELATED APPLICATIONS

This is a divisional application of Ser. No. 09/152,010 filed on Sep. 11, 1998, now U.S. Pat. No. 6,124,806.

The present application is related to U.S. Provisional Patent Application Ser. No. 60/058,978, filed Sep. 12, 1997, entitled WIDE AREA REMOTE TELEMETRY and U.S. Provisional Patent Application No. 60/094,057, filed Jul. 24, 1998, entitled WIDE AREA REMOTE TELEMETRY, which are incorporated herein by reference.

BACKGROUND OF THE INVENTION

1. Field of the Invention

The present invention is directed to the fields of automatic meter reading of electric, gas, water meters and other systems, automatic reading of flow data, monitoring of such usage, and distribution of information thereon.

The need for near real-time information is becoming critical to the efficient operation of many types of industries. This invention addresses a need for information from remote monitoring locations. This disclosure will center on preferred embodiments of a monitoring system for the electrical and gas utility industry, although this monitoring system could be used for other areas such as gas pipeline metering, pipeline monitoring, water system monitoring, security systems, vending machines, energy control devices, or other areas where remote monitoring is necessary.

The need for near real-time information from remote locations is becoming more pronounced due to the deregulation of several industries. For the utility industries, deregulation means an increase in competition which demands increased efficiencies in the utility systems. These increased efficiencies require better information about, and better control over, the systems involved. Increased efficiency heightens the need for near real-time information monitoring. Thus, the utilities need the ability to obtain near real-time information on consumer demand, supply, and overall system operations.

As an example, electric utilities need this information to balance the generation of electricity against consumer demand, and to operate the transmission system as efficiently as possible.

In general, electricity is generated at a generating plant, transformed for transmission over distances, and transformed again for the distribution to customers. The deregulation of the electrical utility industry will require innovative solutions to balance the generated electrical supply against the consumer demand for electricity. These solutions will require a reduction in the system costs, by increasing the system efficiencies, to match the competition levels of the deregulated industry. An increase in the electrical transmission system efficiency will require access to remotely-located consumer-usage information to enable the utilities to eliminate the excessive generation of electricity. Thus, increasing the system efficiency will require the utility to reduce excessive generation and balance the amount of generated electricity against the consumer demand.

The onset of deregulation of the electrical utility industry, and other similar industries, will result in unbundling of utility operations and segmenting of the marketplace. Deregulation will widen the gap between the supplier and consumer and increase the competition in the industry. This widened gap and increased competition results in the formation a new type of organization in the electrical utility industry called the independent sales organization (ISO). The ISO will operate as an intermediary between the electrical generating facilities and the consumers by buying generated electricity, transmitting it from the generating location to the consumer area, and reselling the electricity to the consumers.

Bulk users of electricity will generally have more negotiating power in the purchasing of electricity. To take advantage of bulk rates, local consumers may join together to form a distribution pool which has associated demand levels and other characteristics. These distribution pools of customers will compare prices for electricity and purchase electricity from the lowest cost supplier or ISO. Because of varying electricity prices, the electricity bought and sold by an ISO for use in a particular distribution pool of customers, such as Tulsa, Okla., may actually be generated in remote locations, such as Colorado on one day and in Florida on the next. Thus, potential problems will arise in balancing the generation, transmission, and usage of the nation's electrical transmission system. To avoid these problems, the ISO will need increased access to information in order to predict customer demand, purchase electricity, and resell the electricity to the consumer.

The present invention is additionally capable of providing a number of services to energy users such as energy usage analysis, energy management services, Internet inquiry services, and billing services.

2. Prior Art

Systems and methods for monitoring various types of meters, and collecting information to a centralized location are widely described in the prior art. Examples of these systems can be seen in the following patents:

U.S. Pat. No. 4,940,976, issued to Gastouniotis et al. on Jul. 10, 1990 describing an AUTOMATED REMOTE WATER METER READOUT SYSTEM; U.S. Pat. No. 5,053,766, issued to Ruiz-del-Portal et al. on Oct. 1, 1991 describing a TELEMETERING SYSTEM FOR ELECTRICAL POWER CONSUMED BY VARIOUS USERS; U.S. Pat. No. 5,451,938, issued to Brennan, Jr. on Sep. 19, 1995 describing a RF METER READING SYSTEM; U.S. Pat. No. 5,475,867, issued to Blum on Dec. 12, 1995 describing a DISTRIBUTED SUPERVISORY CONTROL AND DATA ACQUISITION SYSTEM; and U.S. Pat. No. 5,673,252, issued to Johnson et al. on Sep. 30, 1997 describing a COMMUNICATIONS PROTOCOL FOR REMOTE DATA GENERATING STATIONS. A brief discussion of these various examples is outlined in the following discussion.

U.S. Pat. No. 4,940,976, issued to Gastouniotis et al. on Jul. 10, 1990 describes an AUTOMATED REMOTE WATER METER READOUT SYSTEM. This system creates a periodic electrical signal whose frequency is proportional to the flow rate. This signal is stored into a solid state counter from which this information is transmitted to a remote receiver by a standard radio frequency telemetry link. The receiver stores the information for multiple meters and periodically sends the data to the data processing office by means of a telephone line, CATV cable, or RF link. The transmitting link between the solid state counter and the remote receiver occurs every time the flow counter is incremented as well as periodically whenever a timer generates a pulse.

The Gastouniotis et al. '976 patent uses sensing and transmitting units which both randomly and periodically sends one burst of consumption data at times throughout the day to the receiving interface unit for the area. This data is then accumulated in memory which is disgorged to the central billing site either periodically or on demand. This system teaches away from the use of multiple transmission to assure successful information transmittal. This system does not disclose any method for signal verification of the transmission from the sensing and transmitting unit. In addition, this system teaches an inefficient method of double counting the usage information and then dividing it before transmitting.

U.S. Pat. No. 5,053,766, issued to Ruiz-del-Portal et al. on Oct. 1, 1991 describes a TELEMETERING SYSTEM FOR ELECTRICAL POWER CONSUMED BY VARIOUS USERS. This system monitors consumer power usage from meters with disk revolution indicators of power consumption by utilizing a pulse generator, light generating LEDs, light and dark regions on the revolving disk, and sensors which monitor the passage of the light and dark regions of the revolving disk. The system detects and monitors disk revolutions and uses a sending means for transmitting a consumption signal to a meter concentrator, and a means for communicating the information acquired into a central computer.

U.S. Pat. No. 5,451,938, issued to Brennan, Jr. on Sep. 19, 1995 describes a RF METER READING SYSTEM. Brennan '938 collects data from the meter and stores the data for transmission. At preselected pseudorandom timing intervals, the transmitter encodes the data, creates a synch signal, start signal, message signal, and a verification signal. The RF transmitter sends the information signals to the RF receiver which identifies the start signal, receives the transmission, and verifies the accuracy of the transmission.

U.S. Pat. No. 5,475,867, issued to Blum. on Dec. 12, 1995 describes a DISTRIBUTED SUPERVISORY CONTROL AND DATA ACQUISITION SYSTEM. This system is designed to overcome the inherent problems in short range radio broadcast communication by using supplemental controllers to enhance the transmission and control range of master controllers. Supplemental controllers are placed within the range of the master controller, but are capable of broadcasting to supplemental remote terminal units outside of the master controller's range. The supplemental controller transmits messages from the master controller to the supplemental remote terminal units, and relays responses from the supplemental remote terminal units. This allows for the supplemental remote control units to be placed outside the normal broadcast range of the master controller and, thus, extend the operating range of the master controller.

U.S. Pat. No. 5,673,252, issued to Johnson et al. on Sep. 30, 1997 describes a COMMUNICATIONS PROTOCOL FOR REMOTE DATA GENERATING STATIONS. This system is used to gather information and transmit the gathered information to a central location. Specifically, this system uses a Network Service Module (NSM) which communicates with a Remote Cell Node (RCN). The RCN communicates through an optional Intermediate Data Terminal (IDT) to get information to a Central Data Terminal (CDT). As an alternative to the separate IDT, the IDT functions may be implemented by the CDT.

In Johnson '252, the NSM is used to acquire information from utility meters, disconnect service, manage load, or monitor for alarm conditions. The NSM includes a transmitter, processor, memory, antenna, and optionally includes a receiver. The NSM processor monitors, collects, and arranges acquired information into packets of data for a pre-determined monitoring scheme and stores the acquired data in memory. Once the NSM has acquired a period or segment of data for the monitoring scheme, the NSM transmits all of the acquired data as a data packet. This transmission takes place at a predetermined time period over a single frequency to the RCN. Alarm messages are not stored into memory, but are immediately transmitted to the RCN. The NSM transmits and can receive information through this first frequency and can also receive information through a second carrier frequency. The NSM is designed to utilize a maximum of two frequencies which are controlled by the design of the unit.

Johnson '252 collects information through the RCN which receives, stores, and processes the NSM signals. The RCN includes a transmitter, receiver, processor, memory, and antenna. The RCN receives the NSM data packets and temporarily stores them in memory. The RCN then collates the information, identifies duplicates of NSM data packets already transmitted by other RCN modules and acknowledged by IDT modules, and deletes the duplicate NSM data packets from its memory. The RCN transmits its collated information as a single packet of RCN information when polled by the IDT and deletes the stored information upon acknowledgement of the transmission by the IDT.

Johnson '252 either uses an IDT or a CDT which performs the functions of an IDT. The IDT includes a transmitter, processor, memory, and receiver. The IDT transmits a polling signal to the RCNs, receives the RCN information, transmits an acknowledgment of the receipt of the RCN information, and stores the RCN information in memory. The IDT collates the RCN information and deletes any duplicate NSM data packets to form IDT information which is sent to the CDT.

The Johnson '252 CDT element includes a transmitter, receiver, processor, and memory. The CDT receives IDT information and deletes any duplicate NSM data packets. The CDT then processes and stores the received information.

The prior art as evidenced by the described patents suffers from excessive duplicate information transmission, required polling for second layer information retrieval, being overly complicated, and having excessive parts which are susceptible to failure. Further, the systems disclosed in the patents do not appear to maintain temporary duplicate information at efficient levels for transmission failures and other system problems.

Hence, there remains a need for a simplified remote sensing information collection and information distribution system which addresses these and other problems.

SUMMARY OF THE INVENTION

The need for near real-time processed information on consumer utility usage which is available to the utility or other parties will require innovative solutions to remote-device system monitoring. An effective monitoring system can be developed through the use of a sensor interface module, a data collection module, commercially available information transmission systems, and a host module.

The sensor interface module will constantly monitor individual customer demand and usage to gather information for the monitoring system. The sensor interface module will send this information to the data collection module over unlicensed radio frequency bands. The data collection modules will gather the information from sensor interface modules or other inputs wired directly and transmit the information to the host module over the commercially available information transmission systems. The host module will gather, store, and process the information from the sensor interface modules as needed, and communicate through commercially available information transmission systems to send the processed information to the appropriate consumers as desired.

BRIEF DESCRIPTION OF THE DRAWINGS

FIGS. 12 and 13 illustrate a gas meter cover for mounting a sensor interface module and a pulse encoder hardware sensor.

FIGS. 14, 15, 16, and 18 illustrate improved mounting methods for a magnetically actuated switch.

FIG. 17 illustrates one method for mounting a magnetic switch for actuation by a magnetic field.

FIG. 20 illustrates a simplified block diagram of a sensor interface module.

FIG. 21 illustrates the elements of a sensor interface module transmission to a data collection module.

DETAILED DESCRIPTION OF THE PREFERRED EMBODIMENTS

Figure 1:
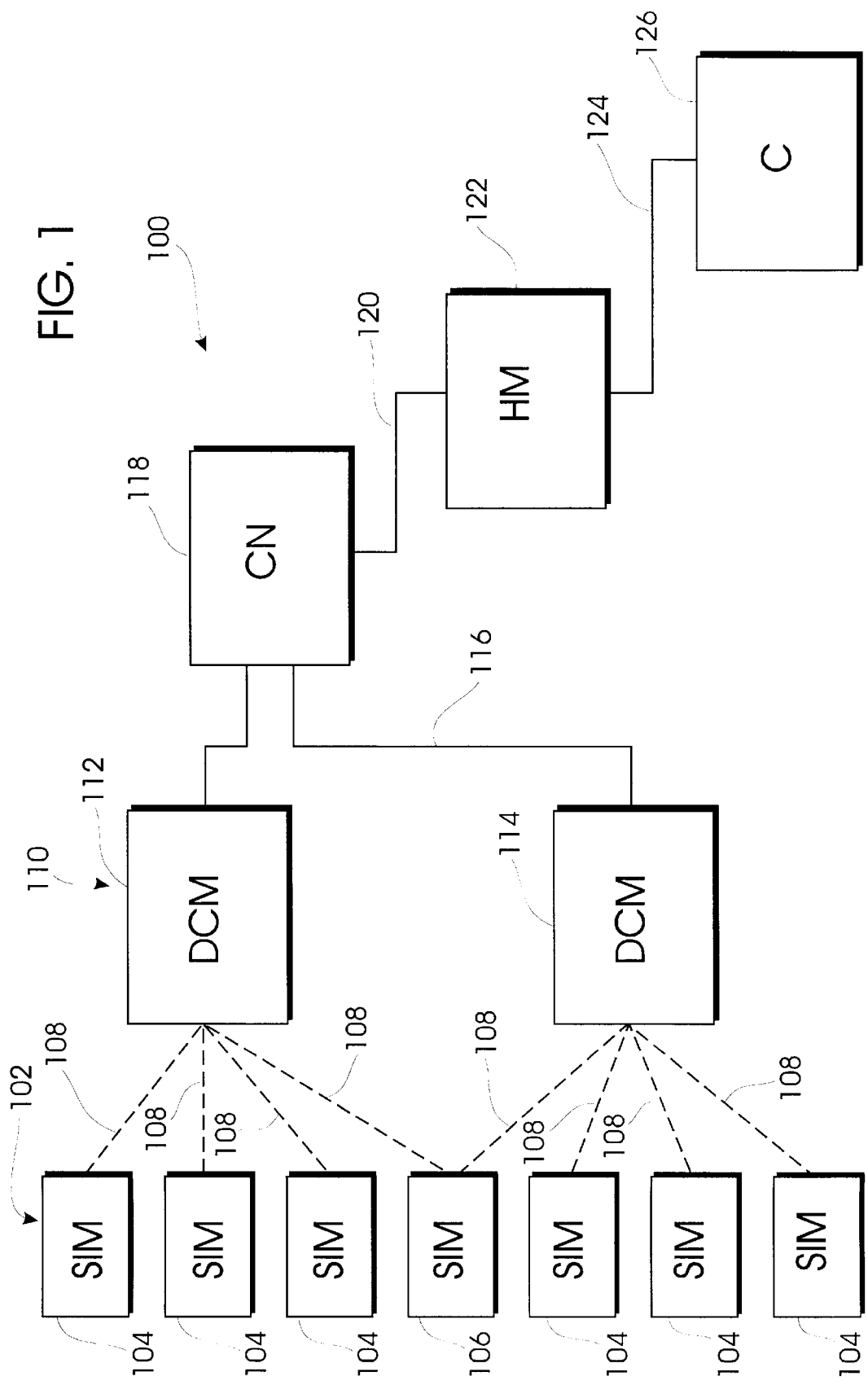
FIG. 1 shows a block diagram of the general monitoring system and the information flow from sensor interface modules to a customer in a wide area remote telemetry system constructed in accordance with the present invention.

Referring to the drawings in detail, FIG. 1 is a schematic representation for a wide-area remote telemetry system 100, constructed in accordance with the present invention. A plurality of sensor interface modules 102, which are electromechanical interfaces, act as data gathering equipment.

Sensor interface modules 102 communicate with data collection modules 110 through a hardwire or wireless transmission 108. Standard wire connection may be utilized for the hardwire or wireless transmission 108, or various types of known, low-power, radio-frequency transmissions may be utilized. The preferred embodiment communicates by using a frequency-hopping spread-spectrum transmission in an unlicensed range, such as 902–928 Mhz.

Sensor interface modules 102 can be a single path sensor interface module 104 or a multiple path sensor interface module 106. The only difference between the single path sensor interface module 104 and multiple path sensor interface module 106 is the number of data collection modules 110 receiving the hardwire or wireless transmission 108 from the individual sensor interface modules 102. Single path sensor interface modules 104 communicate through hardwire or wireless transmission 108 to only one of the data collection modules 110. Multiple path data collection modules 106 transmit a hardwire or wireless transmission 108 to multiple data collection modules 110.

The method of transmitting information to the data collection modules 110 will be explained by separately describing a first data collection module 112 and a second data collection module 114. Note, however, that any number of data collection modules 110 may be used in the wide area telemetry system 100. If the first data collection module 112 is the only reception point for data from a single path sensor interface module 104, then the first data collection module 112 will have primary responsibility for forwarding the information from the single path sensor interface module 104. If the second data collection module 114 is the only reception point for data from a single path sensor interface module 104, then the second data collection module 114 will have primary responsibility for forwarding the information from the single path sensor interface module 104. If the wireless transmission 108 is received by both the first data collection module 112 and second data collection module 114, then a priority will be assigned to both the first and second data collection modules 112 and 114.

As shown in FIG. 1, the wireless transmission 108 from multiple-path sensor interface module 106 is received by both the first data collection module 112 and second data collection modules 114. Only one of the data collection modules 110 will have primary responsibility for forwarding the information received from a multiple-path sensor interface module 106. Initially both data collection modules will forward information from a new sensor interface module. Then, either the first data collection module 112 or the second data collection module 114 will be assigned a primary responsibility for forwarding information from the multiple-path sensor interface module 106. The remaining data collection module 112 or 114 will be assigned secondary responsibility for forwarding the information from the multiple-path sensor interface module 106. Data collection modules 110 with primary responsibility for a multiple-path sensor interface module 106 will forward information received from the multiple-path sensor interface module 106 during both the normal transmission of signals and upon a transmit request. Data collection modules 110 with secondary responsibility for a multiple-path sensor interface module 106 will not transmit information from that multiple-path sensor interface module 106 during normal transmissions, and will only transmit the information from that multiple-path sensor interface module 106 upon a transmit request.

In the overall wide area remote telemetry system 100, only one of the multitude of data collection modules 110 will be assigned primary responsibility for any one of the sensor interface modules 102, but any number of data collection modules 110 may be assigned secondary responsibility for any one of the sensor interface modules 102. This method of data transmission allows for an efficient, single-line of communication of messages during normal operation of the system, but allows for multiple paths of data recovery if the system fails during its normal operation.

The data collection modules 110 transmit the information received from the sensor interface modules 102 over a data module connection 116 to a network system 118. The network system 118 forwards the transmitted information over a network connection 120 to a host module 122 where the information is stored or processed. The stored or processed information may then be transmitted from the host module 122 through a host connection 124 to the customer interface 126.

Each of the modules, connections, and transmissions will be explained in detail herein.

1. The Sensor Interface Module (TIM)

a. Overview

The sensor interface modules 102 are intelligent communications devices which attach to gas, electric and water meters and other types of monitored equipment. The basic sensor interface modules 102 may be adapted to any number of systems to be monitored, including but not limited to: electrical systems, gas systems, water systems, security systems, temperature control systems, vending machines, and remotely monitored devices of any sort. The sensor interface modules 102 include an appropriate hardware sensor for the device being monitored; a computerized monitoring system with associated firmware; battery power supply and/or a converter for external power; and a transmitter.

b. Physical Characteristics

Figure 2:
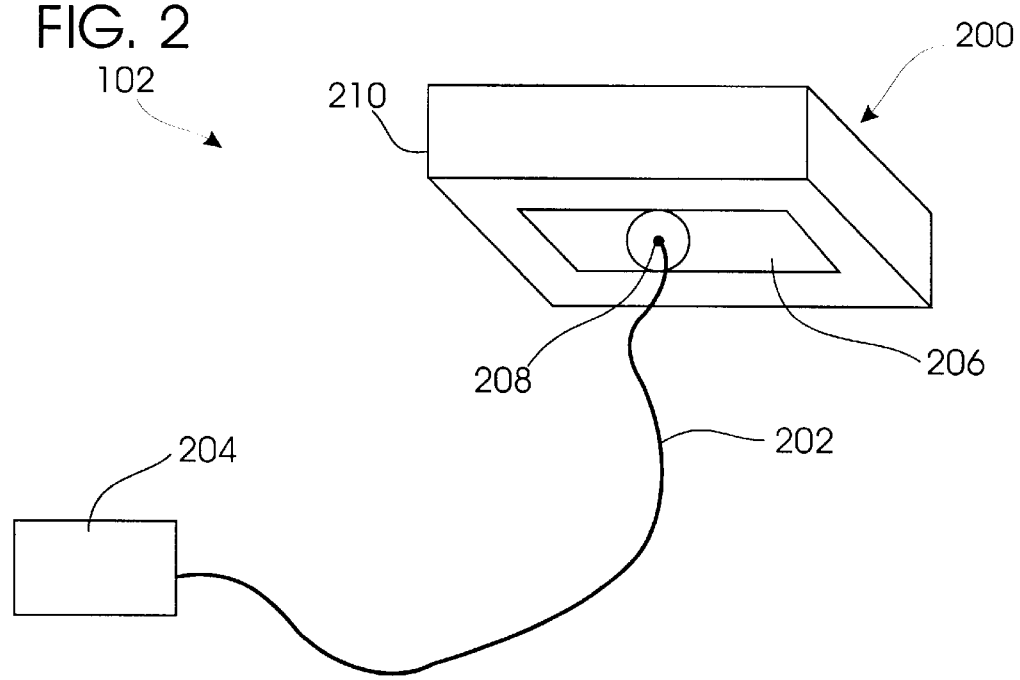
FIGS. 2 and 3 illustrate a sensor interface module with main body and external sensor which are elements of the wide area remote telemetry system shown in FIG. 1.

As shown in FIG. 2, the sensor interface module 102 can be made with a sensor interface main body 200, sensor connecting harness 202 and an external hardware sensor 204. The main body 200 consists of a sensor interface circuit board 206 with sensor connecting terminals 208 for attaching the sensor connecting harness 202 to the external hardware sensor 204. The main body 200 can be installed internally to the monitored device or can be made to fit in a small enclosure or casing 210 for external mounting on or in close proximity to the monitored device. The external hardware sensor 204 is mounted in a location suitable to the device being monitored and connected to the sensor interface circuit board 206 through the sensor connecting harness 202. As an example, in one preferred embodiment, the small enclosure or casing 210 can be made from ABS plastic, having approximate dimensions of 5"×3"×1".

Figure 3:
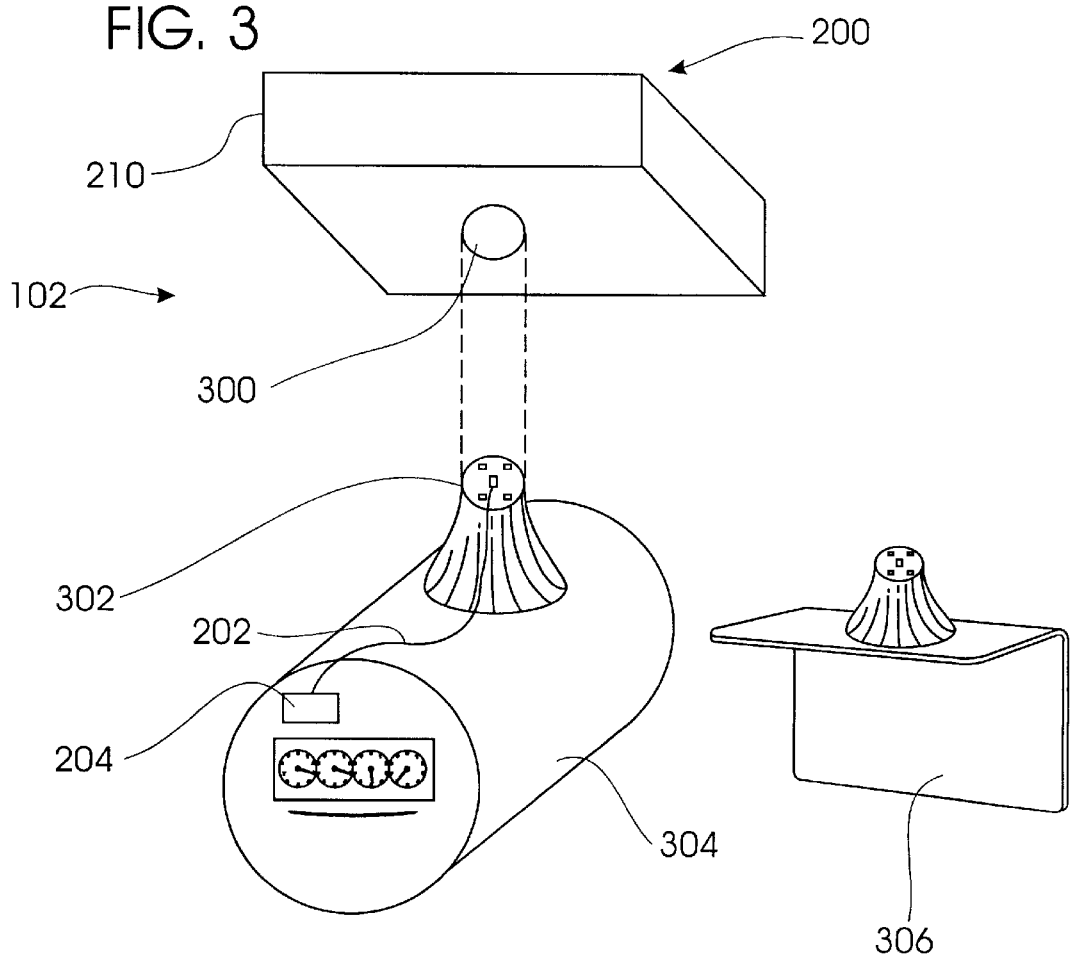

As shown in FIG. 3, an example of the preferred embodiment of one of the sensor interface modules 102 for gas meters has a female sensor harness terminal 300 molded into the casing 210 which allows for matching male sensor harness terminal 302. The matching male sensor harness terminal 202 is attached to the sensor connecting harness 202, which is attached to the external hardware sensor 204. The matching male terminal 302 is installed on, or molded into, a sensor interface meter cover 304 or sensor interface mounting adaptor 306 for the various types of devices to be monitored. In this manner, a common sensor interface main body 200 may be mounted on any type of device by a standard connection method. This greatly simplifies the design of the sensor interface modules 102 by allowing for the use of several different external hardware sensor 204 arrangements and different mounting arrangements for the sensor interface main body 200 while using a standard sensor interface main body 200.

For gas meters, a sensor interface module 102 will monitor rotation of the dials of the meter display. The small enclosure or casing 210 of the sensor interface module 102 may be mounted on the pipes or conduits surrounding the gas meter, or may be directly mounted on the meter. The sensor interface module 102 and the external hardware sensor may be integrated into the face plate of the meter to effectuate an efficient installation of the monitoring system on pre-existing meter installations.

Figure 4:
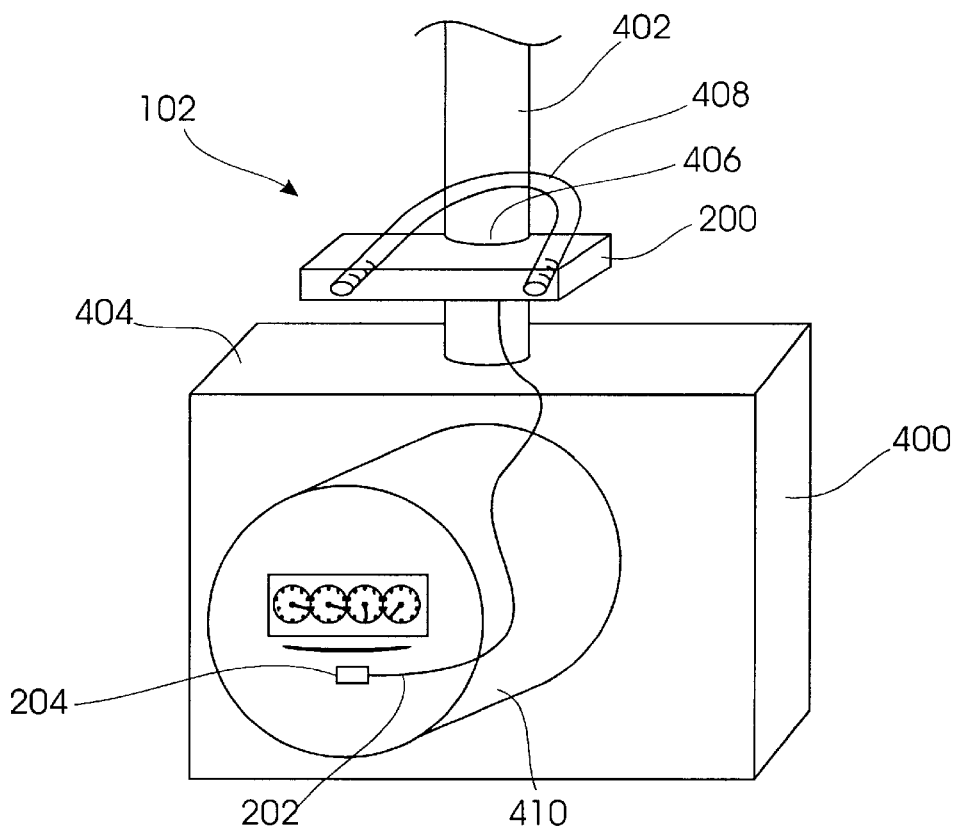
FIGS. 4, 5, 6, 7, 8, and 9 illustrate various mounting arrangements for the sensor interface module.
Figure 5:
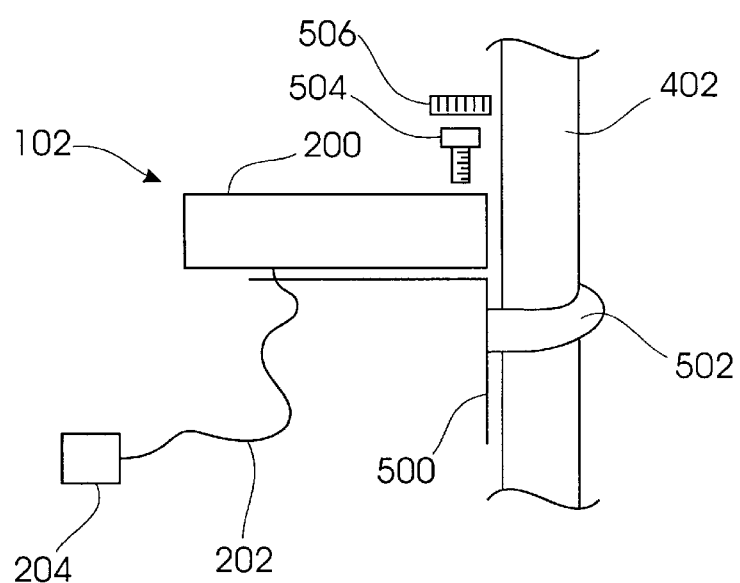

FIGS. 4 and 5 illustrate further styles of physical mounting arrangements for sensor interface modules 102 that are mounted externally to the device being monitored, such as a conventional electrical watthour meter 400 shown in FIG. 4. FIG. 4 illustrates how the sensor interface module 102 may be bolted directly to the electrical meter conduit 402 emerging from the electric meter pan 404 of a conventional electrical watthour meter 400. The sensor interface main body 200 can be molded with an indention or retaining area 406 where main body conduit mounting hardware 408, such as a threaded unbolt, washers and nuts, can be used to secure the sensor interface main body 200 to a conduit, pipe, pole, or other convenient location. As shown in this example, the sensor interface main body 200 can be bolted to the electrical meter conduit 402 emerging from the top of the electric meter pan 404, and wired through the sensor connecting harness 202 to the external hardware sensor 204 which is mounted in the conventional electrical watthour meter 400. It is preferred to run the wires within the electrical conduit for protection against external forces or weather.

As shown in FIG. 5, the mounting of the sensor interface main body 200 on the electrical conduit 402 can also be made by a sensor interface mounting flange 500. This flange 500 is connected to the electrical meter conduit 402 with sensor flange conduit mounting hardware 502. Sensor flange mounting hardware can be any type of item that may secure the sensor interface mounting flange to the conduit, such as pipe clamps, u-bolts and nuts, Velcro, or any other suitable mounting attachment. The top of the sensor interface mounting flange 500 forms the mounting base for a sensor interface main body 200 which can be attached to the mounting flange 500 by main body flange screws 504. Furthermore, the unit may be made tamper resistant by covering the heads of the flange screws 504 with tamper resistant screw caps 506. The main body 200 may then be connected through the sensor connecting harness 202 to the external hardware sensor 204.

In another preferred embodiment (not shown), the external hardware sensor 204 is mounted in a conventional electrical watthour meter 400 and the meter cover is molded to have a male connector similar to the one previously described for gas meters. This allows for a direct connection of the sensor interface main body to the external hardware sensor through the sensor connecting harness in the meter cover. The sensor connecting harness may be molded into the meter cover to protect the harness and the molded cover may also provide mounting locations for both the sensor interface main body and the external hardware sensor. In this manner, installation can be quickly accomplished by removing the old meter cover, connecting the sensor to the meter to be monitored, and reinstalling a new meter cover with attached sensor interface module which has already been programmed. This embodiment also protects the wiring connection between the external hardware sensor and the main body by molding the connections into the replacement meter cover. This eliminates long term wire fatigue and other exposure effects on the connections.

Figure 6:
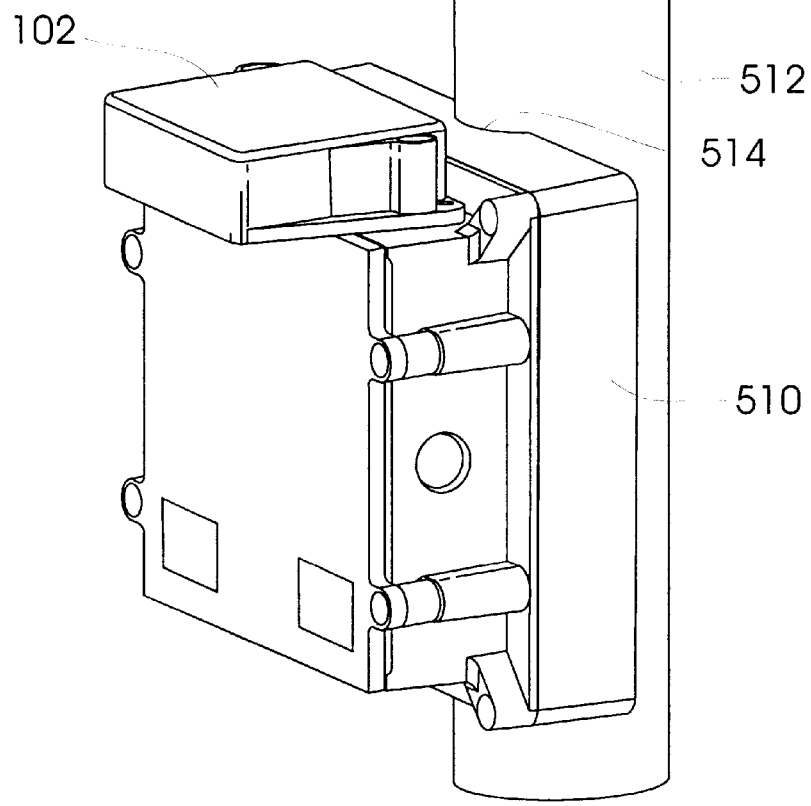
Figure 7:
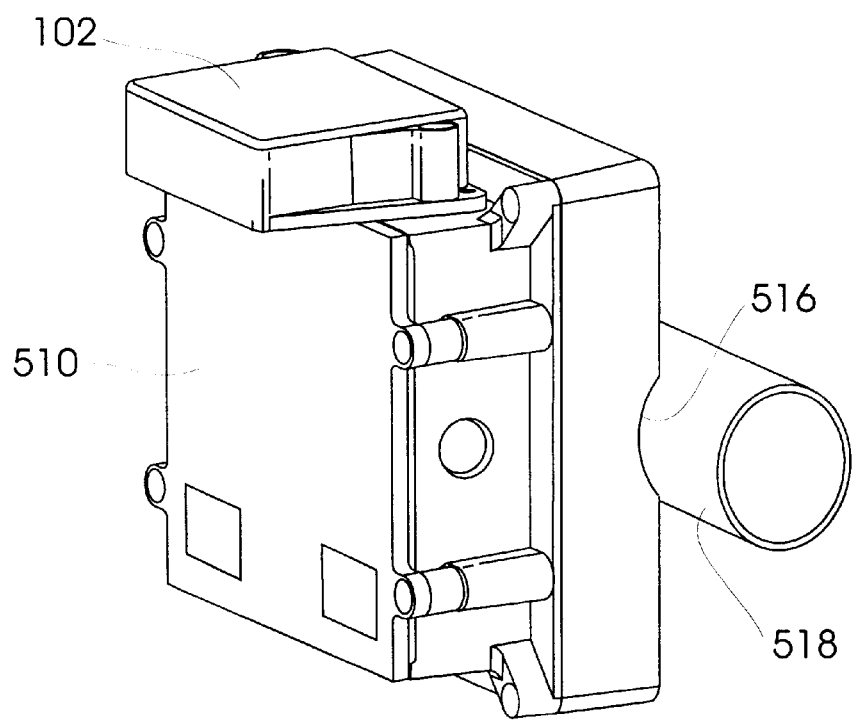
Figure 8:
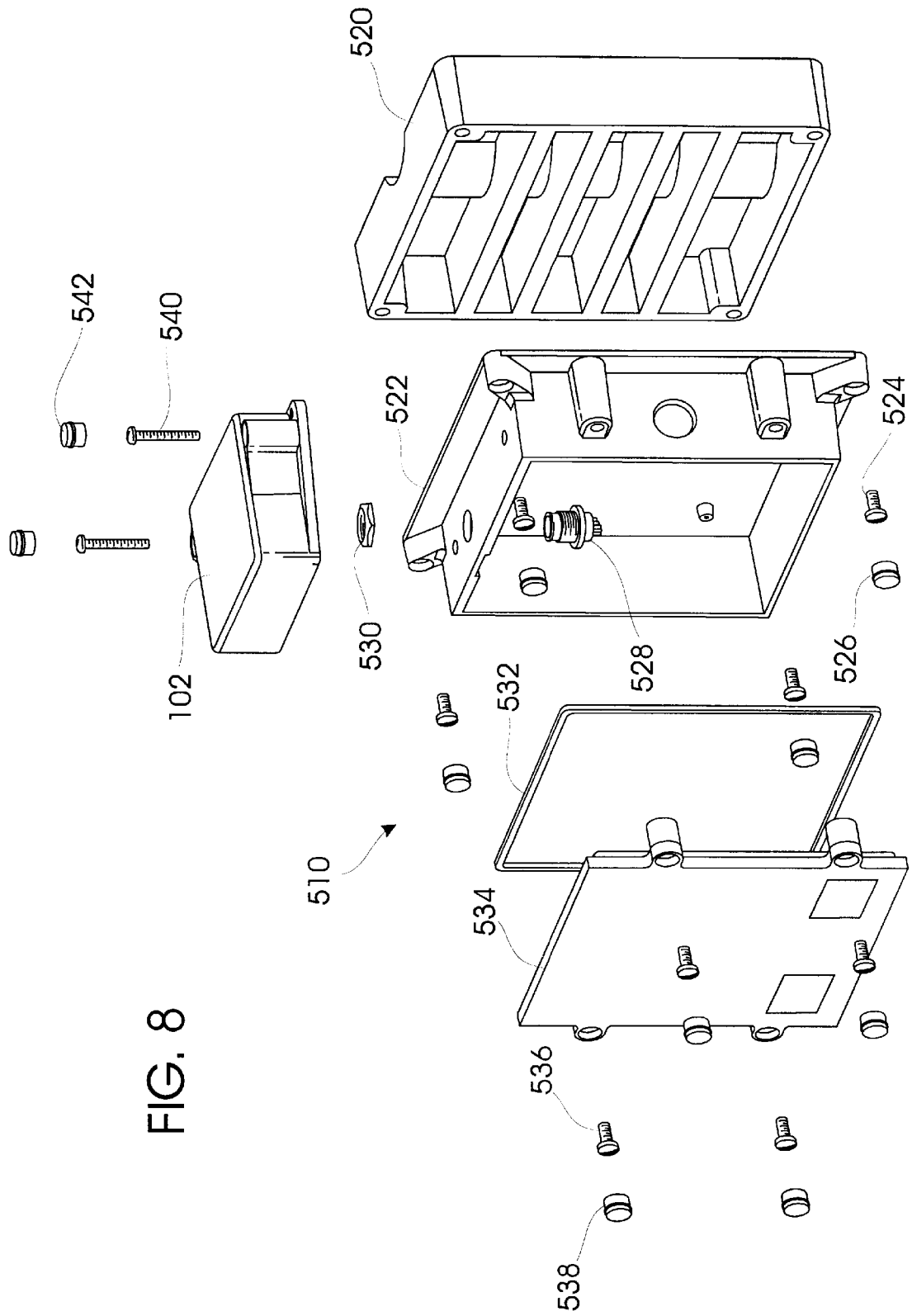

As shown in FIGS. 6, 7 and 8, the sensor interface module 102 may also be mounted on a termination enclosure 510. The termination enclosure 510 can be mounted on a vertical conduit 512 through the use of a vertical indention 514. Alternatively as shown in FIG. 7, the termination enclosure 510 may be mounted on a horizontal conduit 518 through the use of a horizontal indention 516. Angled, bent or curved indention mounting applications are also anticipated. Another method of mounting the termination enclosure 510 would be to attach it directly to a wall.

As shown in the exploded view of FIG. 8, a sensor interface module 102 may be attached to a termination enclosure 510 for mounting purposes. The termination enclosure 510 is made up of a termination enclosure base 520 and a termination enclosure main body 522. The termination enclosure base 520 is attached to the termination enclosure main body 522 through the use of base attachment bolts 524 which are sealed by tamper resisting caps 526. The termination enclosure main body 522 also houses the sensor interface connector 528 which is attached by a sensor interface connector nut 530. The termination enclosure main body 522 is sealably connected to the front cover 534 through the use of gasket seal 532. Front cover 534 is attached to the termination enclosure main body 522 through the use of cover bolts 536 which are also sealed by tamper resistant screw caps 538.

The sensor interface module 102 is attached to the termination enclosure main body 522. The sensor interface module fits over the connector 528 for connection of the external hardware sensor, power, or other such inputs. The sensor interface module 102 is attached to the termination enclosure main body 522 through the use of sensor interface mounting screws 540. Sensor interface mounting screws 540 are sealed into the sensor interface module 102 through the use of tamper resistant caps 542.

Figure 9:
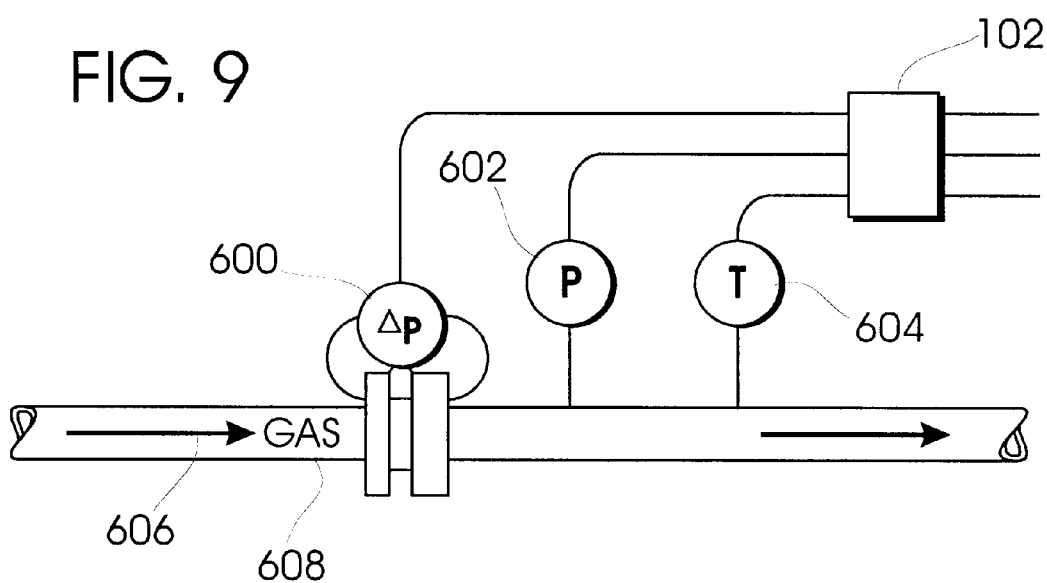

A further alternative use of the sensor interface modules is illustrated in FIG. 9. One of the sensor interface modules 102 can be connected to external hardware sensor 204 (not shown) which includes multiple sensing units as a part of the external hardware sensor. An example of these types of sensors are shown as a flow sensor 600, pressure sensor 602, and temperature sensor 604 which gather information about the flow of gas or other liquids 606 through a pipeline 608. Information may be alternatively obtained from a flow computer which is connected to an orifice meter or a turbine meter. Flow computers and meters, such as turbine meters and orifice meters, are well known. Flow computers may be connected to sensor interface modules to allow the data from the flow computer to be delivered to a data collection module. Alternatively, if the flow computer has the appropriate capabilities, the flow computer can be programmed to directly communicate with the data collection module and, thus, bypass the sensor interface module.

Another alternate use for the sensor interface modules (not shown) would be for the monitoring of digital electric meters, external corrosion control monitoring systems, automated tank level control systems, and other types of systems. Additionally, devices which have output capabilities may be capable of being directly connected to the sensor interface modules, where the device itself becomes the external hardware sensor. Another possibility is that the device may have communication capabilities that allow for a direct connection to the data collection module without requiring the use of a sensor interface module.

The sensor interface module may be designed to include meter interface connectors for all of the major residential and commercial gas meters. These connectors may be molded directly into the sensor interface main body casing, or may be accomplished through adapters or various types of sensor interface harnesses. These adaptations allow the sensor interface modules to be installed on new or existing meters and allow monitoring of the entire system or area being monitored regardless of the age of the device being monitored.

c. Hardware Sensor

Each of the sensor interface modules 102 include an external hardware sensor 204 which is capable of monitoring the desired device. Note that the word 'external', as used in describing the external hardware sensor, means external to the standard design of the sensor interface module's data acquisition and transmission capabilities. This is due to the fact that the external hardware sensors will be different for individual applications. Thus, external means external only to the common circuitry for data gathering and transmission, and not necessarily physically external to the enclosure containing the sensor interface module 102.

Figure 10:
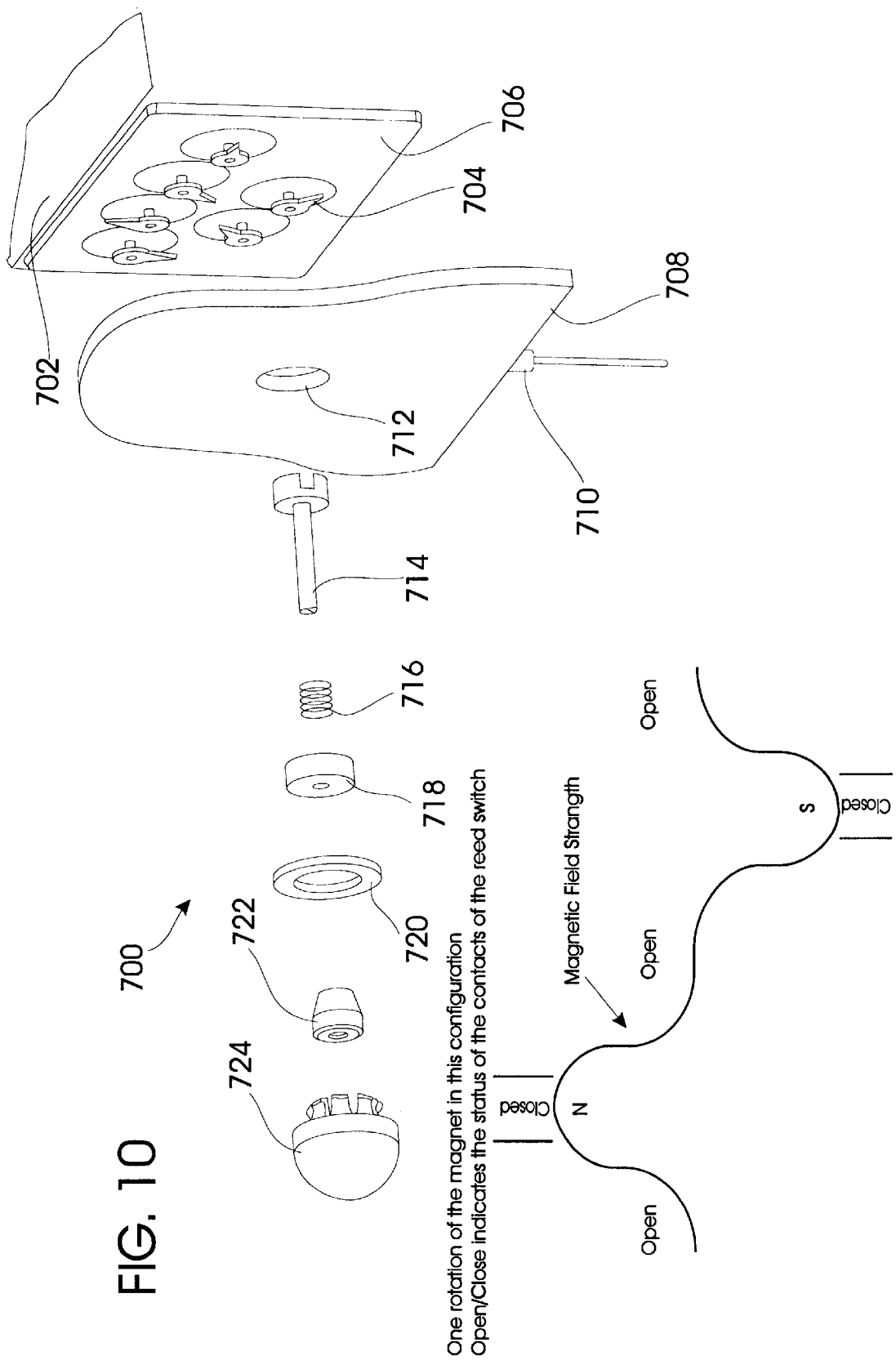
FIGS. 10, 11, and 12 illustrate exploded views of a hardware sensor for a sensor interface module for a meter for the wide area remote telemetry system shown in FIG. 1.
Figure 11:
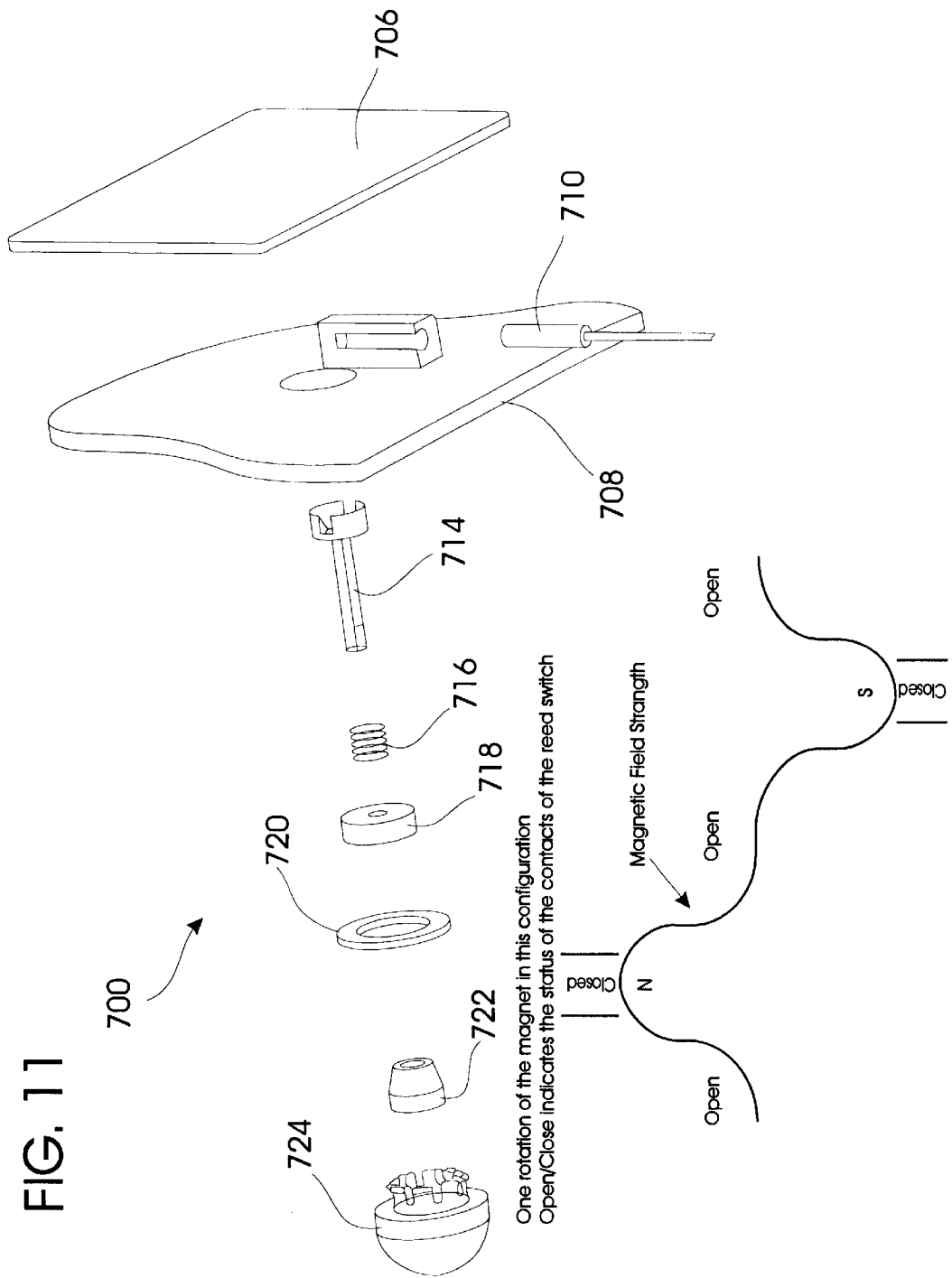

FIGS. 10 and 11 illustrate a preferred embodiment of a pulse encoder 700 which is a particular type of an external hardware sensor 204 for the sensor interface module 102. FIG. 10 illustrates an exploded view of a pulse encoder 700 mounted on a rotational dial meter 702, such as a natural gas meter, and FIG. 11 illustrates the same pulse encoder 700 viewed from an alternate perspective.

The pulse encoder 700 monitors the flow of gas through a rotational dial meter 702 by monitoring the rotation of the meter dials 704 behind the face plate 708 of the rotational dial meter 702. The meter dials 704 can be seen on the dial plate 706 behind a partial view of the face plate 708. Between the dial plate 706 and the face plate 708 is a tubular proximity sensor 710. This tubular proximity sensor 710 is a magnetic reed switch in the preferred embodiment, although any type of magnetically actuated switch could be used. Extending through an opening 712 in the face plate 708 is an encoder shaft 714. The encoder shaft fits over one of the meter dials 704 and is rotated by the rotation of the meter dial 704. The encoder shaft 714 is held in place by a surrounding spring 716 which biases the shaft against the rotating dial 704 and the circular encoder magnet 718. The encoder magnet 718 fits over the encoder shaft 714 and is secured to the shaft so that the encoder magnet 718 rotates with the rotation of the shaft 714. The surrounding spring 716 biases the rotating encoder magnet 718 against the insert 722, and holds the magnet 718 in position near the tubular proximity sensor 710. Thus, as the circular magnet 718 rotates in corresponding relationship to the meter dial 704, the magnet creates a rotating magnetic field which opens and closes the proximity sensor 710. The magnet 718 is biased against the insert 722 which is held in position by the positioning end or protective bubble 724. The protective bubble 724 is attached to the face plate 708 and the junction between the face plate 708 and the protective bubble 724 is sealed by an encoder faceplate seal 720. Thus, the pulse encoder 700 is a sealed external hardware sensor 204 which monitors the rotating meter dials 704 and sends corresponding signals through the opening and closing of the tubular proximity sensor 710.

As shown in FIGS. 10 and 11, the mounting location of the tubular proximity sensor 710 for this application is offset from the accepted mounting method for reed switches.

Figure 12:
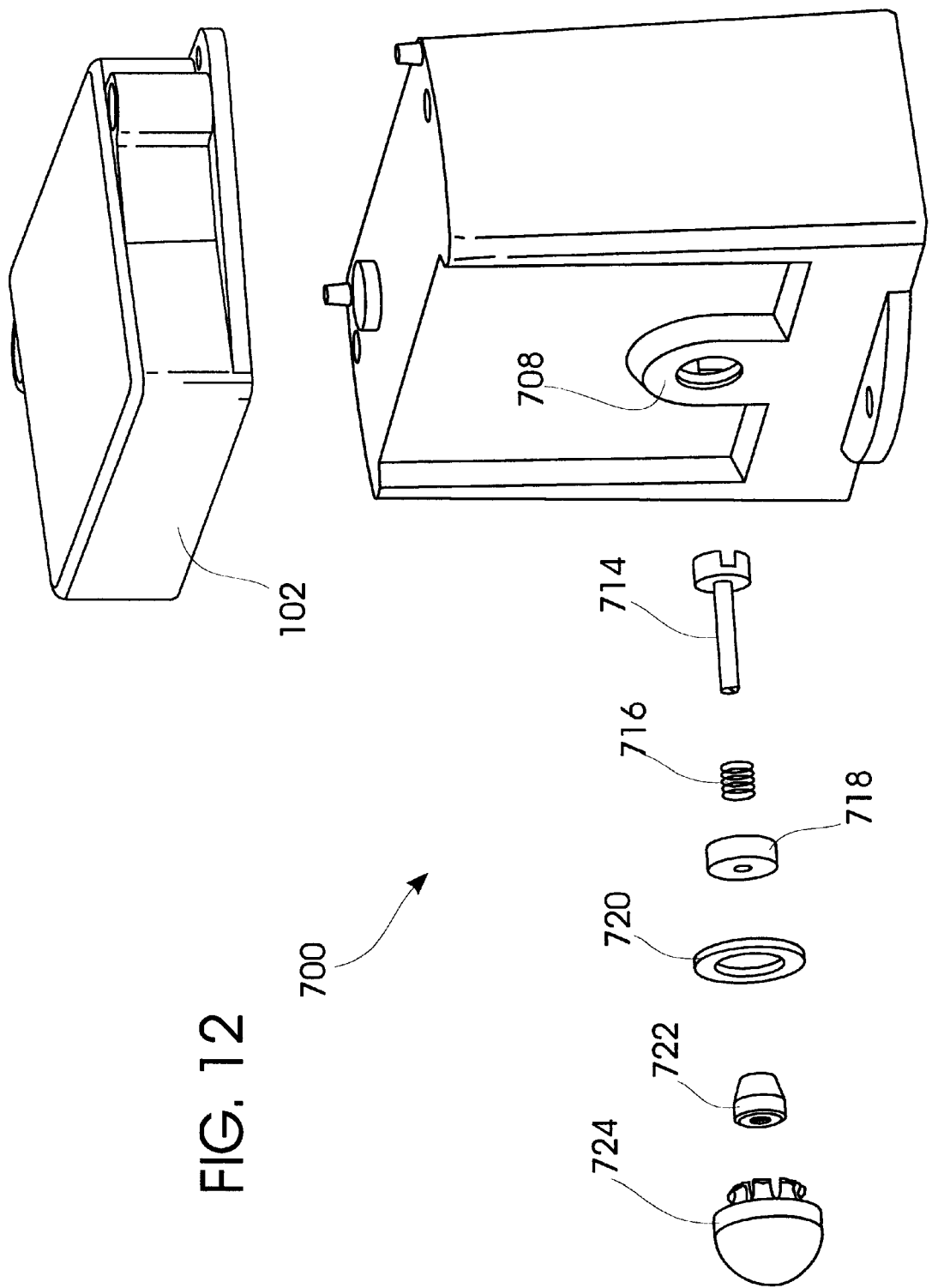
Figure 13:
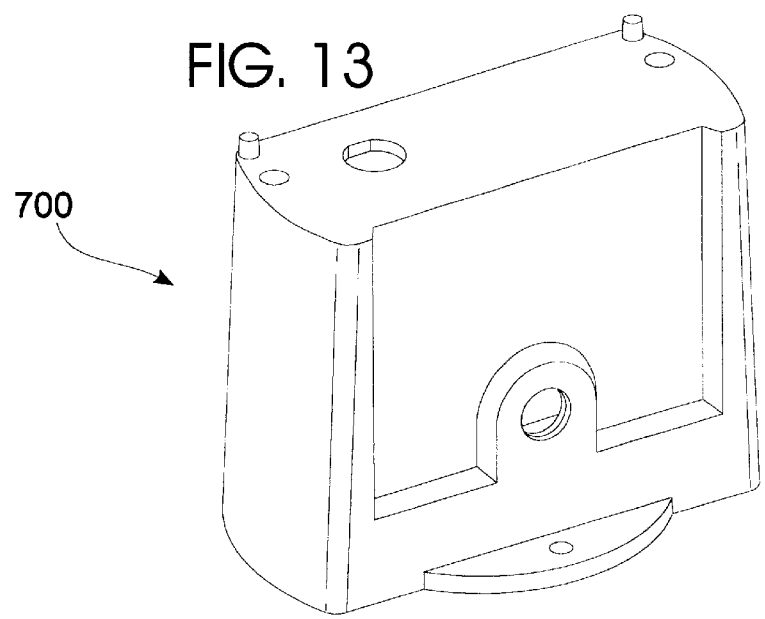

FIGS. 12 and 13 illustrate a gas meter cover for mounting a sensor interface module and a pulse encoder hardware sensor.

FIGS. 14 through 18 illustrate improved changes in the positioning of the magnetic reed switch or proximity sensor 710 and the importance of these improvements in the mounting location.

Figure 14:
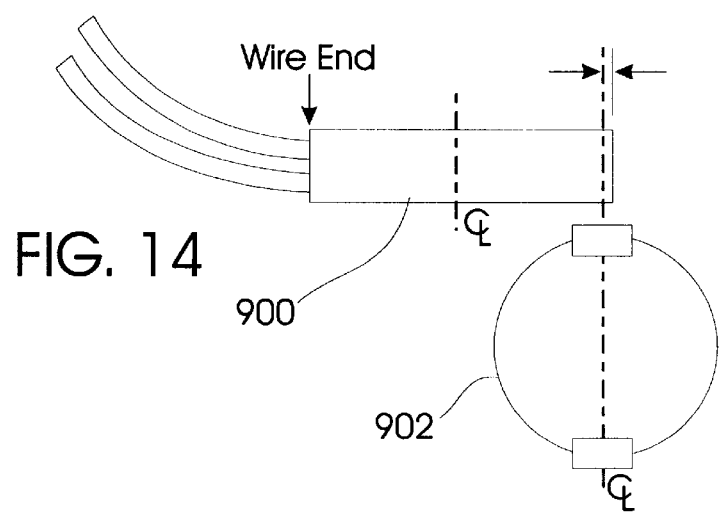
Figure 15:
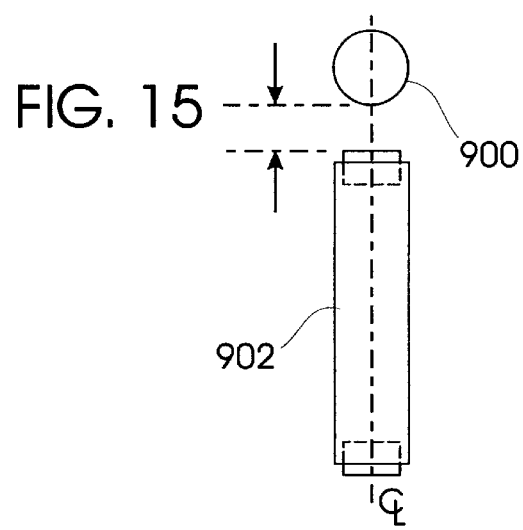
Figure 16:
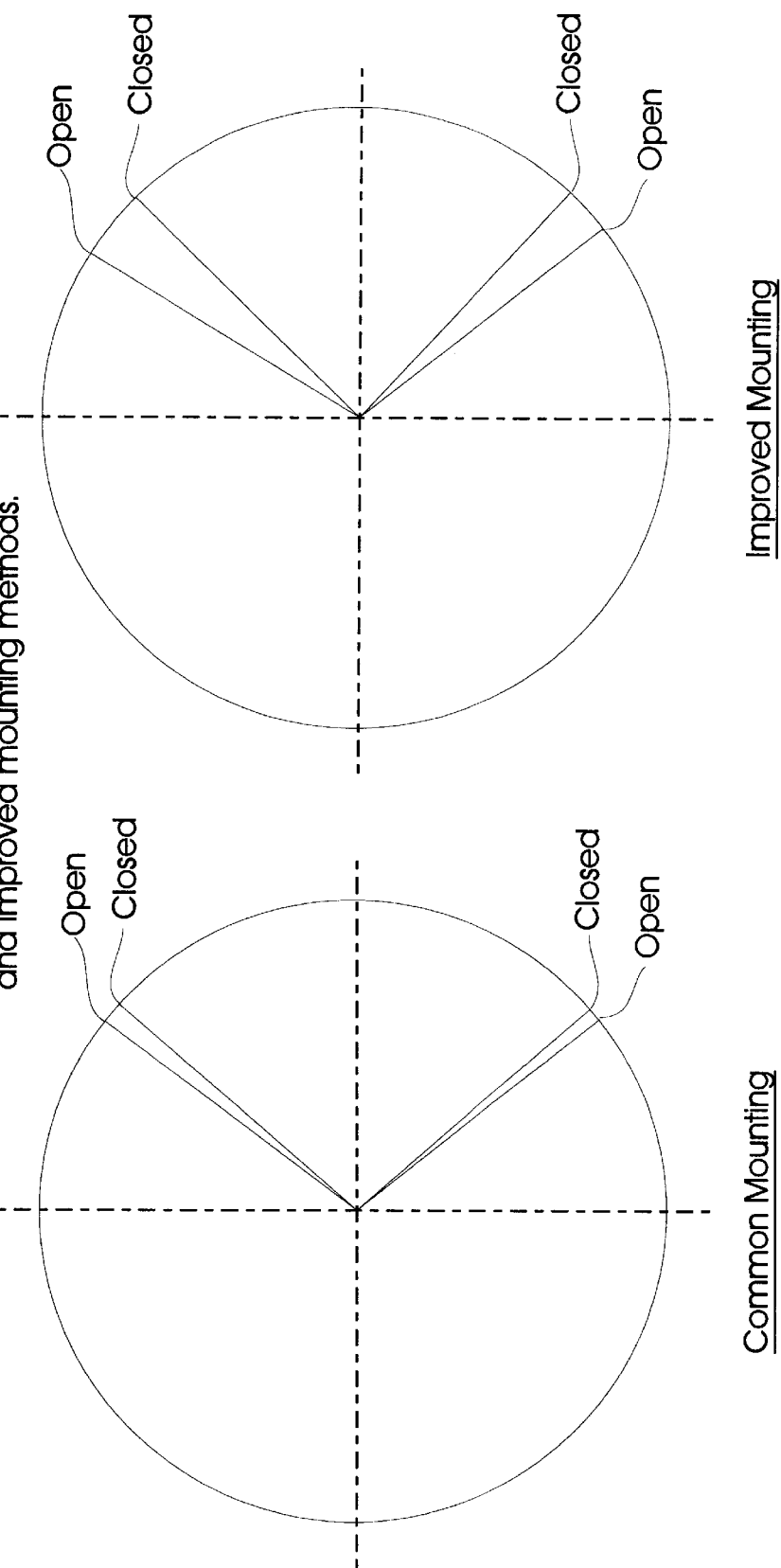

FIGS. 14 and 15 show an improved dial-type reed switch magnetic interface which aligns the magnetic proximity sensor 900 in an offset tangential relationship to the dial path and the rotation of the magnet 902. FIG. 14 illustrates an offset-center line mounting location for the reed switch. The reed switch has a center line 910 through the contact closure point of the reed switch. This center-line 910 of the reed switch is offset from the parallel centerline 912 through magnetic axis of the magnet 902. This prevents a sufficient amount of magnetic field from reaching the wire end of the reed switch and causing a reactivation of the contact closures. This becomes especially important when the meter is in temperature varying mounting locations or when mounted in vibrating conditions. An illustration of the increased distance between magnetic rotation and contact switch opening and closure points may be seen in FIG. 16. This increased distance means that the units are less susceptible to outside influences such as vibration or temperature changes. This sensor to magnet alignment was engineered in the present configuration due to the very nature of the application. The extremely slow wheel rotation makes the normal contact closure point sensitive to the vibration of the meter or device being monitored. These sensitivities, and the critical nature of consistent contact closure for proper monitoring information, required a deviation from the standard contact alignment methods, which resulted in the improvements disclosed herein. Thus, a common switch or sensor axis to magnet axis alignment would not have been sufficient.

Another improved mounting method is the reed switch alignment of FIG. 18, which provides the greatest separation between the magnet and the reed switch. This separation provides for the fastest declining magnetic field, which provides for quick release or small hysterysis between the operation and release points. When the appropriate parameters are selected, this mounting method only allows one operation of the switch per magnet passage.

In contrast to the improved mounting of FIG. 18, the improved reed switch alignment of FIG. 14 is recommended due to the performance requirements of this particular reed switch application. The alignment of FIG. 14 provides a small separation between the sensor and magnet. In addition, the motion of magnet moves along the axis of the switch and, consequently, the magnetic field declines at a slower rate. This provides a larger rotational point separation between the operation and release points.

Note that if the centerline of the switch is moved towards the centerline of the magnet axis so that they will be aligned, such as shown in FIG. 17, multiple operations of the switch will occur on each rotation of the magnet. When the centerline of the reed switch contacts is perpendicular with a bisecting polar-line across the axis of the rotation, the reed switch will be open. The reed switch will close as the magnet starts to rotate. The contacts will then open as the polar-line of the magnet approaches the parallel of the contact point centerline, and then re-close as the magnet continues to rotate. This also happens as the magnet rotates past the centerline alignment. Because counting and correcting multiple contact closures is inefficient, it is more efficient to offset the reed switch centerline from the magnet axis rotation centerline and use the mounting arrangement of FIG. 14.

Note, however, that even using the mounting configuration of FIG. 14, multiple operations are still possible if the rotational magnet is too large. Thus, the reed switch and magnet alignment need to be selected according to criteria of size, rotational motion, and the longest hysterysis available.

The alignment of FIG. 18 is also an improved mounting method which would be acceptable for this application. The improved alignment of FIG. 18 is most easily contrasted with the alignment of FIG. 17. As shown in FIG. 17, the aligned-centerline tangential orientation of the magnetic reed switch or proximity sensor 900 results in several openings and closing of the contacts of the reed switch on each rotation of the magnet 902. In this configuration, the positioning of the reed switch is critical. The design is very sensitive to the distance from the reed switch to the magnet, the sensitivity of the switch being used, the magnetic strength involved, and the tolerances are very stringent.

As shown in FIG. 18, an improved method for monitoring dial-type displays can be implemented by realigning the magnetic sensor to be perpendicular to the old style mounting arrangement, but still within the magnetic field of the magnet. This configuration arranges the magnetic fields so that the reeds in the switch will be drawn together and virtually or completely eliminates contact bounce. In this arrangement, the proximity sensor 1200 is located in a perpendicular relationship to the magnet 1202. In addition to the beneficial effects of reducing or eliminating contact bounce, this arrangement reduces the sensitivity of the reed switch to the aforementioned variables.

Other pulse encoding methods may also be used, including optical sensors designed for implementation with rotational disk electric meters that are well known in the prior art.

d. Sensor Interface Main Body

Figure 19:
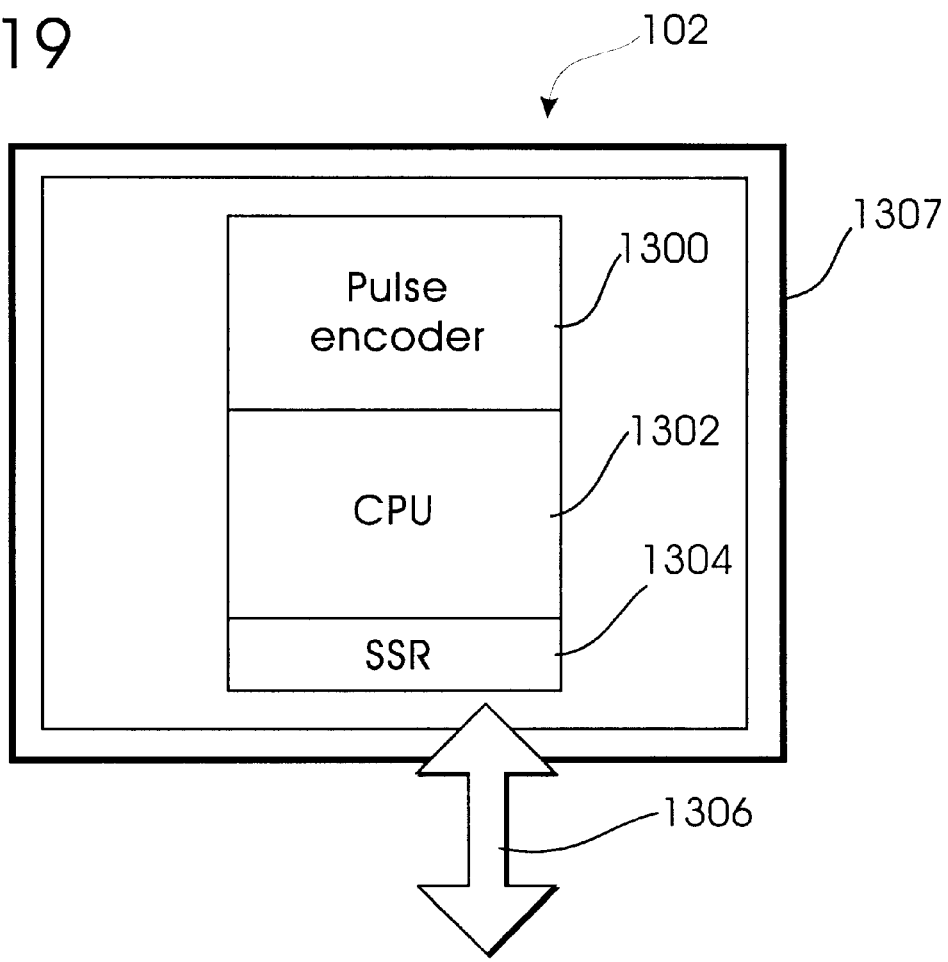
FIG. 19 illustrates a simplified block diagram for a sensor interface module.

FIG. 19 shows a simple block diagram layout of a sensor interface module designated by the numeral 102. The sensor interface module 102 contains a pulse encoder 1300, central processing unit micro-controller 1302, and spread spectrum transmitter 1304 which operate together to form transmission signal 1306. In the preferred embodiment, the hardware device sensor would be external to the housing 1307 with a connection into the pulse encoder 1300.

The sensor interface module's built-in radio frequency transmitter is designed to communicate with the data collection module to transmit information to be forwarded to the host module. A common RF (radio frequency) module will be incorporated with a microprocessor into a circuit board. The sensor interface module's processor will include different encoding devices or schemes for protecting the information that is being transmitted.

FIG. 20 is a block diagram of a sensor interface module 102 which consists of a sensor interface main body 200 (shown by dashed lines) with an internal circuit board, and a connection 1400 to an external hardware sensor 204 to receive input data, as described above.

The sensor interface module 102 includes a programmable processor micro-controller 1402 with associated code which allows for flexibility in setting user definable parameters and to accommodate upgrades to the product. The basic program function of the programmable processor micro-controller 1402 will be explained later. The micro-controller 1402 is connected to a clock 1404, which may operate in the 4 Mhz range, which provides a reference clock to a synthesizer 1406. The micro-controller 1402 also has a path to provide programming data to the synthesizer 1406. The synthesizer 1406 provides voltage to a voltage controller oscillator (VCO) 1408. The VCO 1408 also receives modulation data from the micro-controller 1402. In the preferred embodiment, the VCO is designed to operate in the range of 902 to 928 Mhz. Output from the VCO 1408 passes through a VCO filter 1410 and feeds a power amplifier 1412 which is passed through an amplifier filter 1414. In the preferred embodiment, VCO filter 1410 and amplifier filter 1414 are designed to operate with an Fc of 950 Mhz. The output of amplifier filter 1414 goes to an antenna 1416 which operates in the range of 902 to 928 Mhz in the preferred embodiment.

The unit may be powered by a long life lithium battery (not shown), for a multiple year design life and/or powered from an external source. The battery power supply allows for the connection of sensor interface modules as monitoring devices which will be unaffected by long term power disruptions, power surges, or other system variations. This long life battery also allows the system to monitor areas or items which do not have power systems readily available.

1. Overview of Processing Information From the Monitored Device

The sensor interface module 102 receives information from external hardware sensors attached to the device or devices being monitored. This information is interpreted by the module's processing system which processes the information and then transmits the processed information to a data collection module.

The system detects pulses from the external hardware sensor, refines the sensor external hardware sensor signal to eliminate any erroneous signals, accumulates the signal pulses from the external hardware sensor, interprets the information according to its internal programming, the processed information is stored into memory for future updates, and the information is transmitted to the data collection module.

The external hardware sensor signals are recorded as a cumulative value for metering systems. This cumulative value is transmitted to the data collection modules. A cumulative count ensures that any gaps in information transmission will only have a temporary effect on the overall system's information flow. If a transmission is missed, then the cumulative information from before the missed transmission and a later received transmission will allow the host module to "recover" the missed transmission information by interpolation.

The sensor interface module is programmed to set the unique identifier for the device and the frequency that it transmits to the data collection module.

The sensor interface module 102 may be programmed by a programming computer (not shown) having a program implemented on a hand held processing or personal computer type of device. At the time of programming the sensor interface module, the programming information is either immediately transferred to the host module for permanent storage, or is maintained in the programming device for a future upload to the host module. The sensor interface module has a programmable 32 bit address, with the ability to maintain a maximum pulse count of 65535 from an external input.

In a preferred embodiment, the sensor interface module is designed to transmit via a spread spectrum radio operating on a 30 kHz bandwidth. The radio uses a hopping algorithm and has a maximum transmission time of approximately 50 mS on any one frequency channel. The transmission capabilities are approximately 3 miles in a line of sight transmission. However, the useable transmission distance among buildings, trees, and other disruptions is closer to 2000 ft. In the preferred embodiment, the sensor interface module is located at a maximum distance of 600 ft. to 2000 ft. from a data collection module.

FIG. 21 shows the general layout of the transmitted information signal. The signal consists of a header, information signal, and a CRC. The header information includes a preamble and a sensor interface module identifier.

The preamble is designed to distinguish the transmitted information from spurious radio signals or background noise. The identifier information is designed to identify the specific sensor interface module's transmission that is being received, and to identify any other type of information such as meter-type, count-type or any other information specific the device being monitored. The information signal contains the data collected by the sensor interface module or the emergency code. The CRC provides a basic check-sum type signal verification code which is used to ensure that the signal transmission was correct.

As shown in FIG. 21, information is transmitted in a 32 bit address and information packet to the data collection module. This 32 bit packet includes the sensor interface module's identification and the transmitted information.

As shown in FIG. 21, the signal 1450 transmitted from the sensor interface module 102 consists of several sub-components. The sub-components include synchronization flags 1452, synchronization byte 1454, address 1456, input status 1458, counter 1460, and CRC bytes 1462. The synchronization flags 1452 consists of 65 synchronous flags, i.e. data 7EH, which will be sent out to allow the receiver to synchronize on the transmission frequency. The synchronization byte 1454 consists of one synchronization byte, i.e. data AA Hex, which will be transmitted to indicate the start of the packet. The address 1456 is a 32-bit or 4-byte sensor interface module address which is transmitted to the data collection module 110. The input status 1458 is the status of the external input other than the particular pulse count being transmitted. The status of the input is reflected in the status byte which is sent at the time of transmission. The counter 1460 is a 16-bit or 2-byte up counter which keeps track of the switch closures. In the preferred embodiment, the normal state of the input pin is active high. In this manner, the counter will increment upon a switch closure or the negative edge of the signal. CRC bytes 1462 consists of 2 bytes of CRC data which is transmitted to ensure the accuracy of the entire data transmission.

A full transmission of information consists of a three burst transmission of the packet of information. The information is transmitted initially to the data collection module. This same packet of information is then retransmitted two more times at random spacing intervals to ensure that any data corruption from other simultaneous signals is avoided on at least one of the three transmissions.

Figure 22:
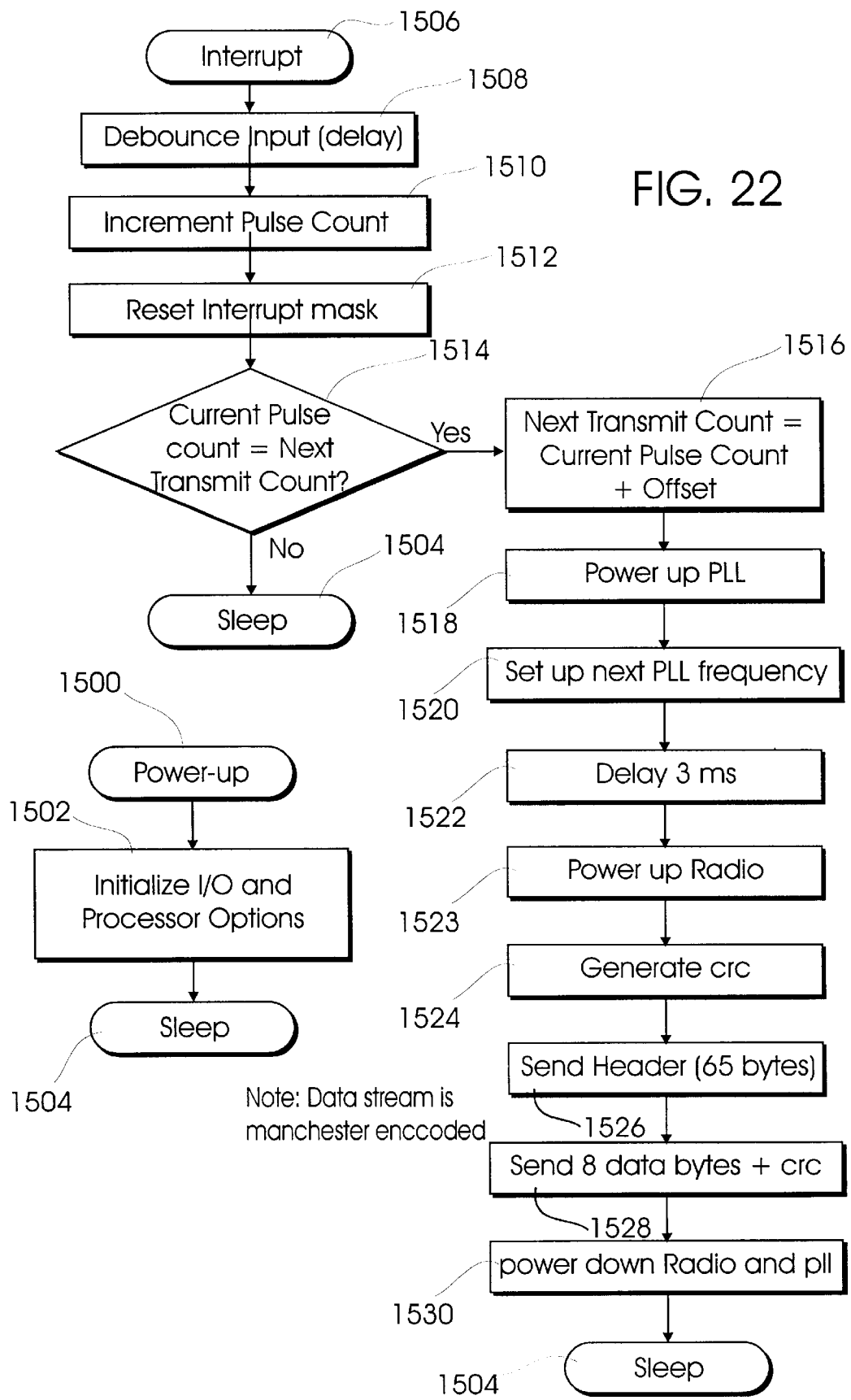
FIGS. 22 and 23 are a flow charts of the transmitter program for the sensor interface module.
Figure 23:
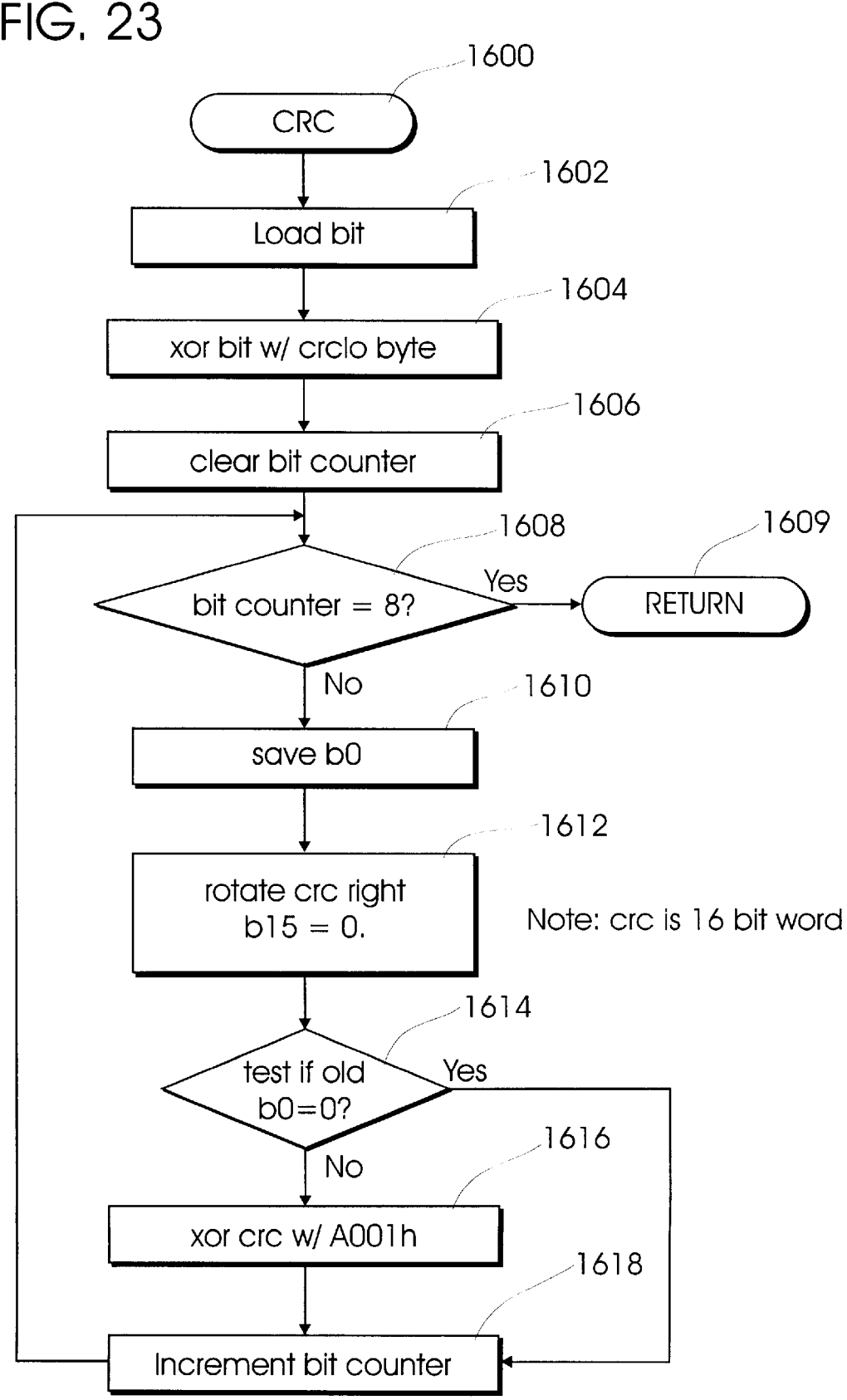

FIGS. 22 and 23 illustrate a flow chart of the transmitter program function of the sensor interface module.

In a preferred embodiment, the sensor interface module will transmit to the data collection module at pre-defined intervals based on the number of inputs received from the hardware sensor. This transmission method can extend the battery life of the unit by transmitting only the amount of information needed. This amount is programmed into the unit.

By following the flow charts in FIGS. 22 and 23, one can see the flow of the program controlling the sensor interface module. On initial power-up 1500, the program will run an initialization routine 1502. The initialization routine will check for programming input, initialize all necessary input and output parameters and set all of the appropriate processor options. After initialization 1502, the processor will power down to the sleep mode 1504 where the system will wait for the generation of an interrupt.

When the information reaches a specified value or other appropriate parameter, an interrupt 1506 is generated which partially wakes the system to increment the pulse count. Once the interrupt 1506 is detected by the system, the input is debounced 1508 by allowing for a delay in reading the input, and then the pulse count is incremented 1510. The system then resets the interrupt mask 1512 to watch for another interrupt 1506, and checks to see if the current pulse count is equal to a next transmit count 1514. If the incremented pulse count does not meet the transmit count requirements, the system returns to a sleep mode 1504 to await the next interrupt 1506.

If the incremented pulse count does meet the transmit count requirements, the system creates a new next transmit count 1516 by adding the current pulse count and the offset amount to generate the new next transmit count and stores this information as the next transmit count for use on the next interrupt. The system then powers up the phase locked loop (PLL) 1518 and sets up the next PLL frequency 1520. The system then waits 1522 for the PLL to stabilize. In the preferred embodiment, the approximate delay for stabilization is a around 3 mS. The system then powers up the radio 1523 and generates the cyclic redundancy check (CRC) 1524 which can be used as signal verification information after the transmission is received. The CRC will be described further following this discussion. The system then transmits the sensor interface module information in a Manchester encoded signal. The system first sends the header information 1526, followed by the data bytes and the CRC. In the preferred embodiment, the header information is approximately 65 bytes of information and the data bytes are approximately 8 bytes of information. The CRC can be effectively implemented with a 2 byte information stream. After transmitting the header, data bytes, and CRC information, the system powers down the radio and PLL 1530 and then goes to sleep 1504 to wait for the next interrupt.

As shown in FIG. 23, the CRC program uses a right rotation exclusive-OR (xor) algorithm to encode the signal for the checksum value. The CRC is a polynomial code obtained from the message bits by passing them through a feedback shift register containing a number of xor gates. This type of code is generally suitable for detecting burst errors occurring in the communication signal transmission.

The CRC subroutine initializes the subroutine 1600. The CRC program then loads the data for CRC verification 1602, loads the xor bit with the CRC lo byte 1604, and clears the bit counter 1606. At this point the program begins a loop that will run until the CRC sum is fully generated. The program looks to the count to see if it has generated a full signal 1608. If the program has generated a full signal then the subroutine will end and control will return to the main basic program 1609. If the subroutine has not finished generating a full signal, then the subroutine will save the least significant bit of the current CRC 1610 and rotate the CRC right with a most significant bit equal to zero to create a new CRC value 1612. The program then tests the saved least significant bit to see if it is equal to zero 1614. If the saved least significant bit is equal to zero then the program will increment the bit counter 1618 and return to the start of the loop. If the saved least significant bit is not equal to zero then the program will first perform an xor function on the CRC with another signal 1616, such as A001h, and will then increment the bit counter 1618 and return to the start of the loop.

2. Transmit Information to the Data Collection Module

Figure 24:
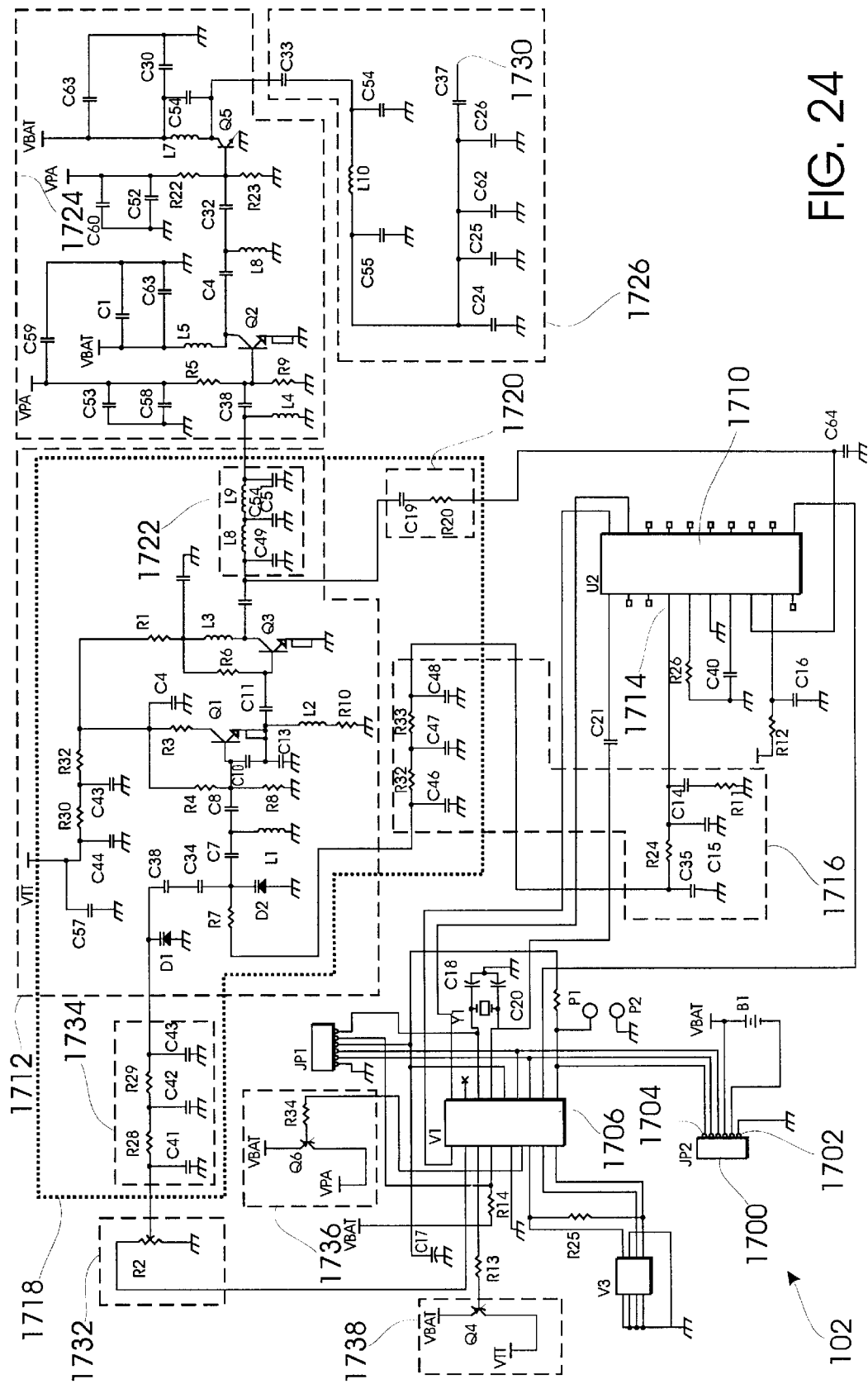
FIG. 24 illustrates a schematic diagram of a transmitter design for the sensor interface module.

FIG. 24 is a schematic diagram of the transmitter for the sensor interface module 102. The system generally performs as follows. While in "sleep" mode, the sensor interface module's micro-controller 1702 will monitor switch closures on pins 1702 and 1704 of connector 1700. These switch closures will be accumulated in a data packet the size of which can be programmed. Generally, the size of the data packet is programmed at the time the unit is installed in the field.

After a data packet has been collected, the data will be transmitted to a data collection module or other device using Frequency Shift Keying (FSK) modulation. The transmission may be on any one of twenty-five different frequency channels ranging from 902 to 928 Mhz and in the preferred embodiment will transmit for approximately 35 mS. After a packet of data has been transmitted, the sensor interface module will return to "sleep" mode and collect another packet of data. The above process will then be repeated (at a different frequency) once a complete data packet has been collected. The preferred embodiment will efficiently use the channel spectrum by using all of the 25 transmit frequency channels before repeating any transmission frequency. In the preferred embodiment, the sensor interface module will be in the sleep mode for at least one second to conserve battery power. This will also guarantee that any given frequency will not be used again for approximately 25 seconds.

The clock 1708 provides a reference clock for the synthesizer 1710 and the micro-controller 1706. The preferred embodiment uses a 4 MHz crystal type oscillation clock. The output of the synthesizer 1710 will provide the tune voltage for the voltage controlled oscillator 1712 (shown in dashed lines). The micro-controller 1706 will program the dividers in the synthesizer to values that will select the appropriate frequency. The output 1714 of the synthesizer 1710 will pass through filter 1716 and will provide the tune voltage for the Voltage Controlled Oscillator (VCO) 1718. The output of the VCO 1718 will provide feedback through a filter 1720 for the synthesizer 1710 and will also feed the power amplifier 1724 through a low pass filter 1722. The output of the power amplifier 1724 then passes through filter 1726 and feeds the antenna 1730. In the preferred embodiment, the antenna is etched onto the circuit board.

Serial data from the micro-controller-synthesizer process passes through a variable resistor 1732 and a low pass filter 1734 to the VCO 1712. This signal then modulates the VCO 1712. The variable resistor 1732 sets the frequency deviation of the output frequency.

While in "sleep" mode, the micro-controller 1702 powers down the VCO 1712 by stopping power flow through transistor switches 1736 and 1738.

A connector 1740 is used as interface for "on board" programming of the micro-controller 1706 through serial data transfer. Connector 1740 also allows for the battery to be disconnected until the unit is installed.

The following is a tabular or format listing the minor elements used in the sensor interface module schematic of FIG. 24.

| Item # | Qty. | Ref. Desig. | Description | Package | Value | Rating |
|---|---|---|---|---|---|---|
| 1 | 1 | B1 | Battery, Lithium | "C" cell | | 3.6 V |
| 2 | 11 | C1, C3, C4, C19, C30, C39, C40, C41, C46, C52, C53 | Capacitor, Ceramic | 603 | 47 PF | 16 V |
| 3 | 1 | C6 | Capacitor, Ceramic | 603 | 5.6 PF | 16 V |
| 4 | 4 | C7, C9, C25, C54 | Capacitor, Ceramic | 603 | 3.9 PF | 16 V |
| 5 | 1 | C8 | Capacitor, Ceramic | 603 | 4.7 PF | 16 V |
| 6 | 1 | C10 | Capacitor, Ceramic | 603 | 2.2 PF | 16 V |
| 7 | 5 | C11, C24, C26, C61, C64 | Capacitor, Ceramic | 603 | 2.2 PF | 16 V |
| 8 | 1 | C13 | Capacitor, Ceramic | 603 | 1.0 PF | 16 V |
| 9 | 3 | C14, C16, C17 | Capacitor, Ceramic | 603 | 0.1 UF | 16 V |
| 10 | 1 | C15 | Capacitor, Ceramic | 603 | 0.01 UF | 16 V |

-continued

| Item # | Qty. | Ref. Desig. | Description | Package | Value | Rating |
|---|---|---|---|---|---|---|
| 11 | 1 | C18 | Capacitor, Ceramic | 603 | 27 PF | 16 V |
| 12 | 1 | C20 | Capacitor, Ceramic | 603 | 22 PF | 16 V |
| 13 | 6 | C21, C32, C43, C48, C55, C56 | Capacitor, Ceramic | 603 | 3.3 PF | 16 V |
| 14 | 1 | C33 | Capacitor, Ceramic | 603 | 8.2 PF | 16 V |
| 15 | 1 | C35 | Capacitor, Ceramic | 603 | 1000 PF | 16 V |
| 16 | 4 | C36, C38, C58, C62 | Capacitor, Ceramic | 603 | 0.5 PF | 16 V |
| 17 | 2 | C37, C50 | Capacitor, Ceramic | 603 | 2.7 PF | 16 V |
| 18 | 4 | C42, C44, C45, C47 | Capacitor, Ceramic | 603 | 10 PF | 16 V |
| 19 | 4 | C49, C51, C59, C63 | Capacitor, Ceramic | 603 | 1.8 PF | 16 V |
| 20 | 2 | C57, C60 | Capacitor, Ceramic | 603 | 1.5 PF | 16 V |
| 21 | 1 | D1 | Varactor | SOT-23B | | |
| 22 | 1 | D2 | Varactor | SOT-23B | | |
| 24 | 1 | JP2 | Connector, Interface | | | |
| 25 | 1 | L1 | Inductor, SMD | 805 | 2.7 NH | 300 mA |
| 26 | 1 | L2 | Inductor, SMD | 603 | 68 NH | 300 mA |
| 27 | 1 | L3 | Inductor, SMD | 603 | 15 NH | 300 mA |
| 28 | | | | | | |
| 29 | 2 | L5, L10 | Inductor, SMD | 603 | 8.2 NH | 300 mA |
| 30 | 1 | L6 | Inductor, SMD | 603 | 12 NH | 300 mA |
| 31 | 1 | L7 | Inductor, SMD | 603 | 4.7 NH | 300 mA |
| 32 | 2 | L8, L9 | Inductor, SMD | 603 | 6.8 NH | 300 mA |
| 34 | 1 | Q1 | Transistor, SMD | SOT-143D | | |
| 35 | 1 | Q2 | Transistor, SMD | SOT-143D | | |
| 36 | 1 | Q3 | Transistor, SMD | SOT-143D | | |
| 37 | 2 | Q4, Q6 | Transistor, SMD | SOT-23 | | |
| 38 | 1 | Q5 | Transistor, SMD | SOT-89 | | |
| 39 | 5 | R1, R3, R12, R30, R31 | Resistor, SMD (Chip) | 603 | 10 | |
| 40 | 1 | R2 | Potentiometer, 1-turn | SMDPOT5 | 20K | |
| 41 | 2 | R4, R11 | Resistor, SMD (Chip) | 603 | 6.8K | |
| 42 | 1 | R5 | Resistor, SMD (Chip) | 603 | 3.6K | |
| 43 | 5 | R6, R7, R14, R24, R34 | Resistor, SMD (Chip) | 603 | 10K | |
| 44 | 1 | R8 | Resistor, SMD (Chip) | 603 | 18K | |
| 45 | 2 | R9, R35 | Resistor, SMD (Chip) | 603 | 4.7K | |
| 46 | 5 | R10, R28, R29, R32, R33 | Resistor, SMD (Chip) | 603 | 180 | |
| 47 | 2 | R13, R23 | Resistor, SMD (Chip) | 603 | 1K | |
| 48 | 1 | R15 | Resistor, SMD (Chip) | 603 | 2M | |
| 49 | 1 | R20 | Resistor, SMD (Chip) | 603 | JUMP | |
| 50 | 1 | R22 | Resistor, SMD (Chip) | 603 | 2.0K | |
| 51 | 1 | R26 | Resistor, SMD (Chip) | 603 | 100K | |
| 52 | 1 | U1 | IC, SMD | SMD18D | | |
| 53 | 1 | U2 | IC, SMD | SOJ-20 | | |
| 54 | 1 | U3 | IC, SMD | SO-8 | | |
| 55 | 1 | Y1 | Crystal | HC49 | 4 MHz | |

The following is a tabular format of the specifications for the preferred embodiment sensor interface module.

| | |
|---|---|
| Pulse Input | Frequency DC up to 5 KHz, form A contact |
| Radio frequency range | 902 to 928 MHz |
| Modulation type | Frequency hopping spread spectrum |
| Data rate | 16.1 Kbps |
| Radio Propagation | 3 miles clear line of sight 600 to 2000 feet under expected application conditions |
| Operating temperature | −40° C. to 85° C. |
| Power requirements | Voltage 2.7 to 3.6 V @ 140 mA on transmit - provided by onboard Lithium Inorganic battery |
| Battery life estimates | 10 years with transmit intervals greater than 10 minutes. |
| Transmission power | 100 mW |
| Packaging Options | Rugged, environmentally sealed, tamper proof enclosure with built-in. Cover may be either hermetically sealed or screw closed with tamper proof screws. |
| Field Configuration | Initial meter value and data transmission intervals. Hand held device with an RS-232 interface required; Palm Pilot version is available. |

2. The Data Collection Module a. Overview

The data collection module boxes are weatherproof enclosures that house data collection electronics. RF input signals in the range of 902 Mhz to 928 Mhz are received through the horizontally polarized antenna and routed to the receiver module. The receiver module hops the 25 pre-set frequencies looking for a RF signal modulated with a particular format. Once a valid signal is identified, the receiver stops hopping and decodes the entire data packet which is passes along to CPU module for collection and evaluation. The receiver and the CPU modules are connected by a motherboard that also holds power regulation circuitry. At predetermined times, the CPU relays data accumulations out of the box by means of a MOTOROLA™ pager (VAIL50 with external antenna) and the second antenna that protrudes through the top of the box. An RS-232 port is available on the motherboard for field programming. Power for the electronics comes from 110V AC, 60 Hz by way of a power cord.

In one preferred embodiment, the communication module uses a MOTOROLA™ 68CH11 central processing unit, 32K of ram, 64K to 1 meg of eprom, and 144K of flash. The flow computer module uses a Rosemont™ 2055 with HART protocol signal. The differential pressure range is approximately 0–10 to 0–250 in water. The gauge pressure range is 0–80 to 0–2000 psig. The isolator material is 316 sst, the fill fluid is silicon, the flame style/material is co-planar/sst, the drain/vent material is sst, the O-ring is glass-filled tfe, the process temperature is rtd and cable optional, the transmitter housing is polyurethane-covered aluminum, the terminal block is standard block and optional transient protected block, and the software functionality is an averaging method; flow dependent time waited formulaic averaging, compressibility method; AGA report number 8/API NPNS Chapter 14.2, Variable Logging Per API21.1 In the spread spectrum radio is an LSDR200 with TCIP/IP path management module, packaged with a communications module.

Returning to a consideration of FIG. 1, the data collection module 110 provides the information transmission connection between the sensor interface module 102 and the network connection 116 to the host module 122. The data collection module 110 is a local, intelligent, data concentrator residing at or near the location of the sensor interface modules 102. The data collection module 110 acts as the focal point of all the information which is collected from the sensor interface modules 102 within a monitored area such as a customer's premise and transmits this information to the host module 122 over standard communication systems 118.

Figure 25:
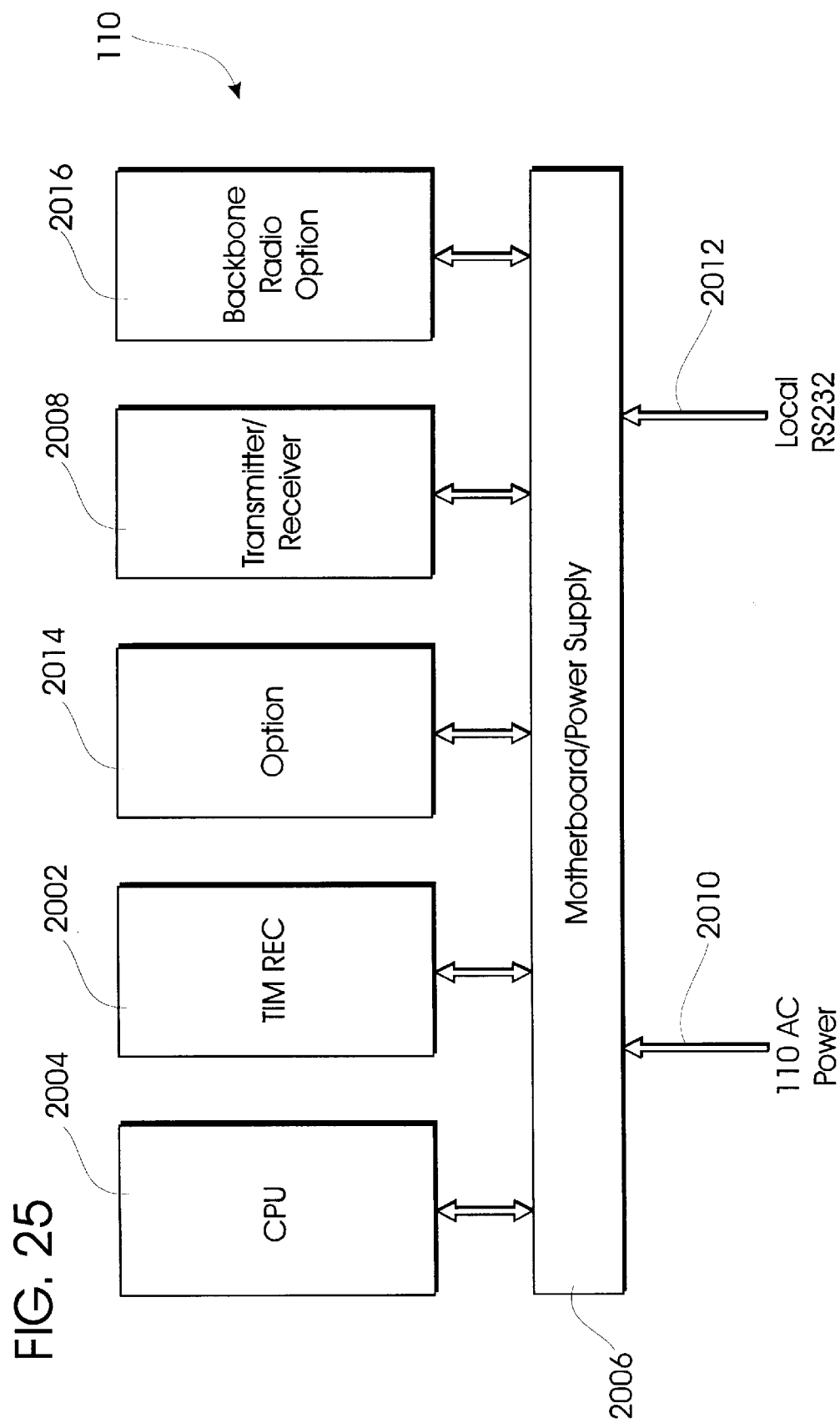
FIG. 25 is a block diagram of a data collection module which is a part of the wide area remote telemetry system of the present invention.

FIG. 25 is a block diagram of a data collection module 110. The data collection module 110 includes a radio frequency receiver 2002 to receive signals from the sensor interface module 102, a central processing unit information processor 2004 with associated firmware, a motherboard/power supply with battery backup 2006, and a transmitter/receiver 2008. The data collection module may also include optional items 2014 such as a modem device and can also include alternate communication systems such as a backbone radio option 2016. The motherboard 2006 is normally powered by standard 110 Volt 60 Hz alternating current shown at arrow 2010. An optional solar powered unit that provides 12VDC output can also be used. An RS-232 serial port shown at arrow 2012 is available on the motherboard 2006 for field programming.

Figure 26:
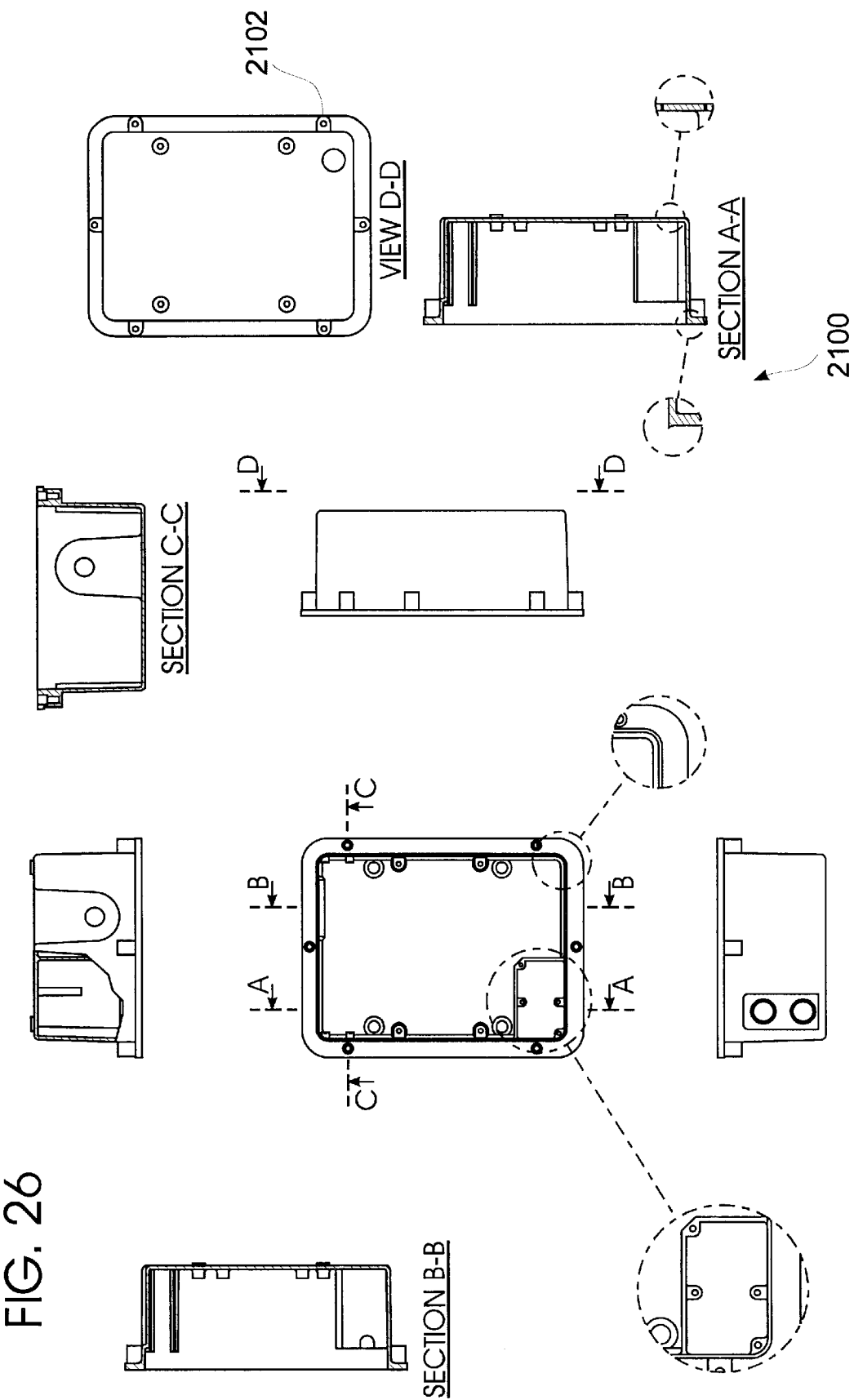
FIGS. 26, 27, and 28 are a schematic view of the mounting enclosure for a data collection module.
Figure 27:
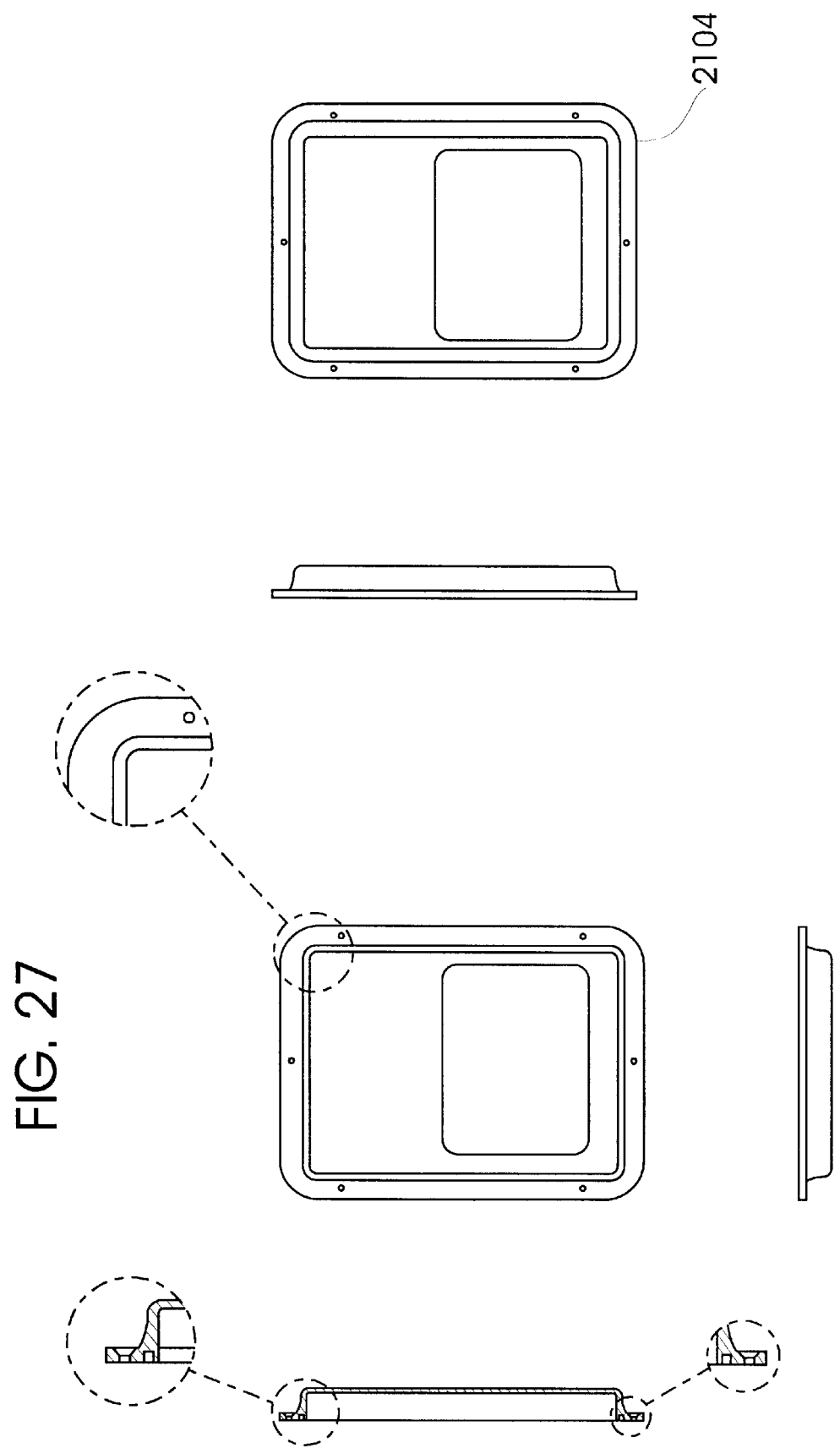

A preferred embodiment of the housing enclosure 2100 for the data collection module 110 is shown in the sectional views of FIGS. 26 and 27 The enclosure 2100 is made up of a data collection base 2102 and a data collection cover 2104. FIG. 26 shows the data collection base, and FIG. 27 shows the data collection cover 2104. The enclosure 2100 is weather tight to protect the data collection module 110 from the elements. A chassis 2200 fits within the housing enclosure 2100 and supports the components which are attached by fasteners in the data collection module 110 as shown in FIG. 28.

The data collection module 110 may also be integrated into other devices, such as meters, or housed in a NEMA 4X enclosure with approximate dimensions of 8"×6"×4". RF input signals are received through an antenna and routed to the receiver module. The data collection module enclosure may be attached to the side of a house, inside a small business, or in other suitable locations. A suitable location is one which allows for receiving sensor interface module information and connection to transmission systems for communication with the host module.

Figure 28:
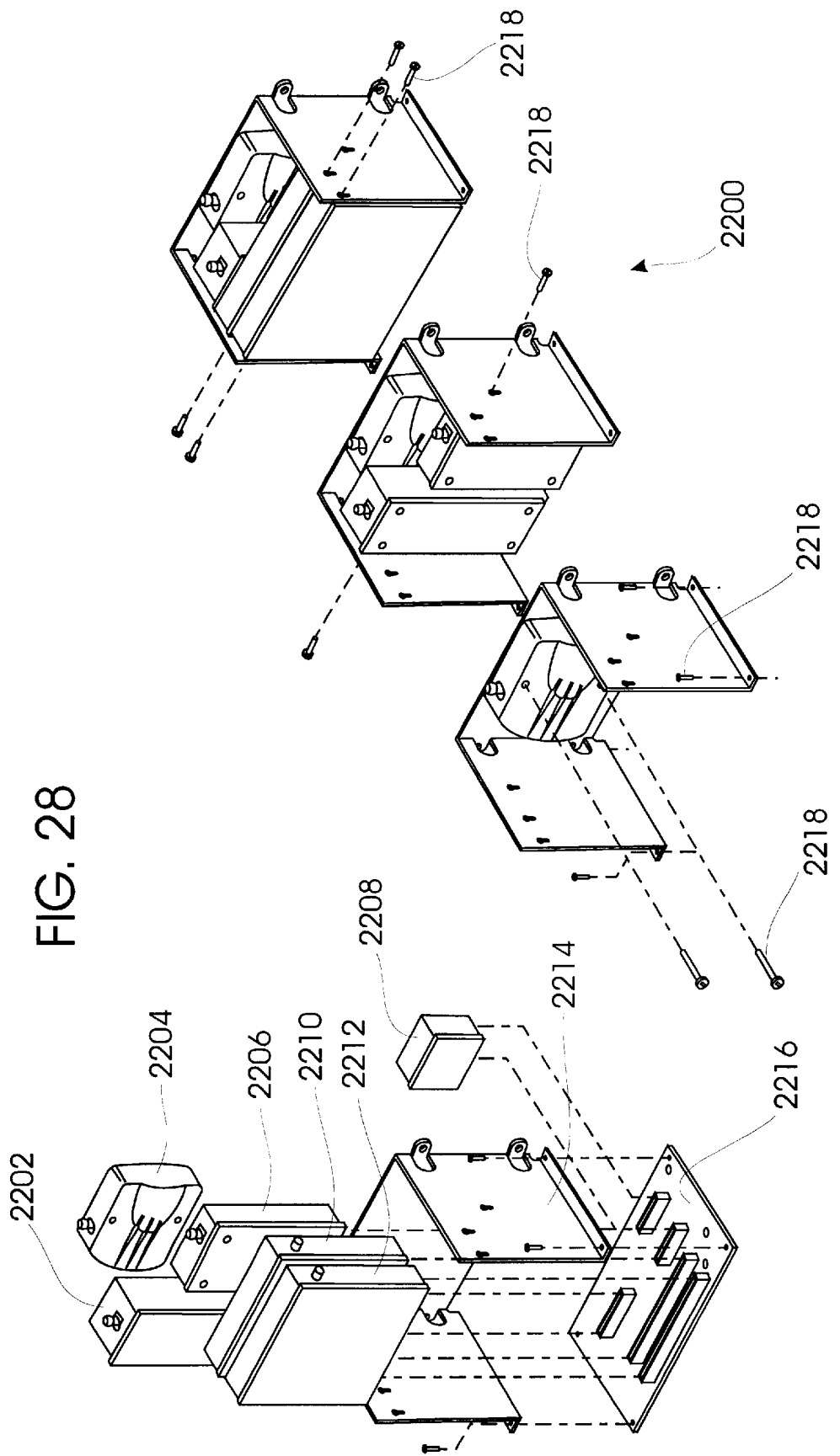
Figure 29:
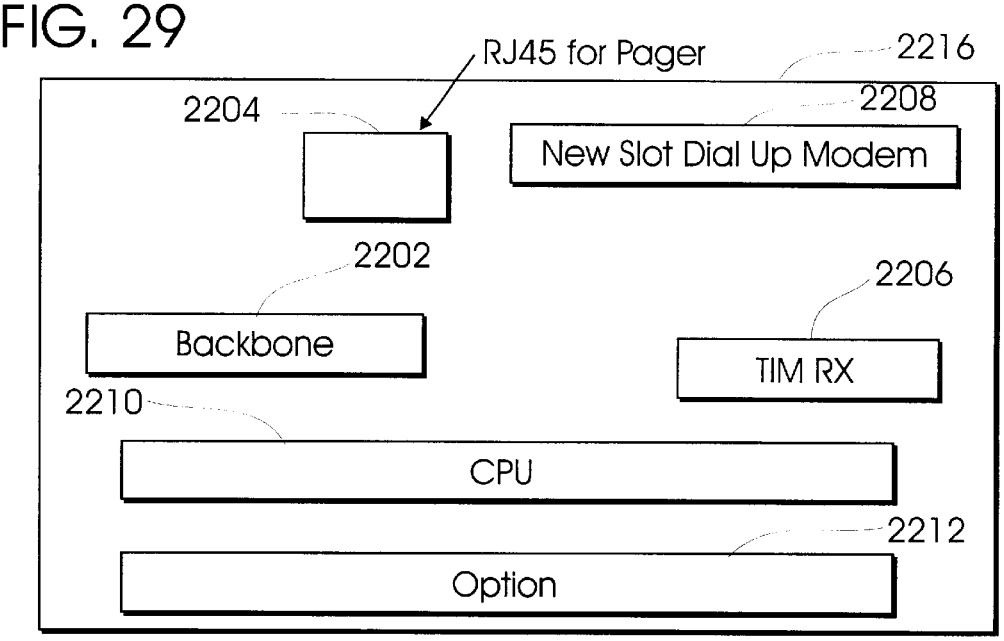
FIG. 29 is a schematic diagram for a motherboard mounting arrangement for a data collection module.

As shown in FIGS. 28 and 29, the general layout of a data collection motherboard 2216 may be seen. The data collection motherboard 2216 is the base support board for a spread spectrum backbone radio 2202, pager 2204, receiver 2206, central processing unit (CPU) 2210, modem 2208, and other optional items 2212.

The motherboard 2216, spread spectrum radio 2202, pager 2204, receiver 2206, CPU 2210, modem 2208, and option 2212 are all attached together in a secure mounting by a motherboard frame 2214. Each of these items is attaches by appropriate connectors 2218.

Figure 30:
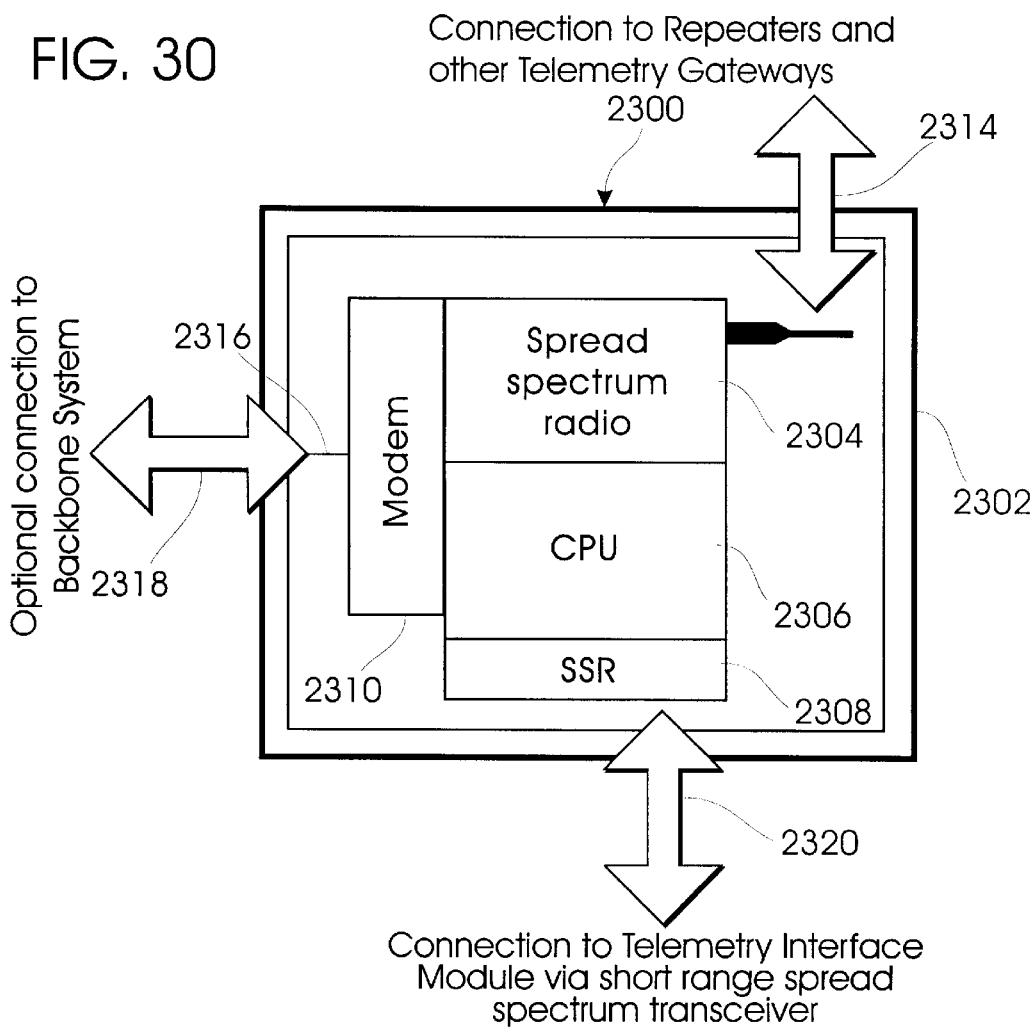
FIG. 30 is a block diagram of a data collection module.

FIG. 30 shows a simplified schematic layout of data repeater module which is generally designated by the numeral 2300. The data collection module 2300 includes a housing 2302 which minimally contains a central processing unit 2306 and a spread spectrum receiver/radio 2308. The spread spectrum receiver/radio 2308 is used to receive or transmit signals 2320 to sensor interface modules. The housing 2302 may optionally contain a spread spectrum radio 2304 with connected antenna to transmit and receive signals 2314 to and from repeater modules 2300, data collection modules 110, or a host module 122. Another optional communication method may be implemented by a connected modem 2310 which is hardwired through connection 2316 to transmit and receive signals 2318 from the backbone system communication to a host module.

Figure 31:
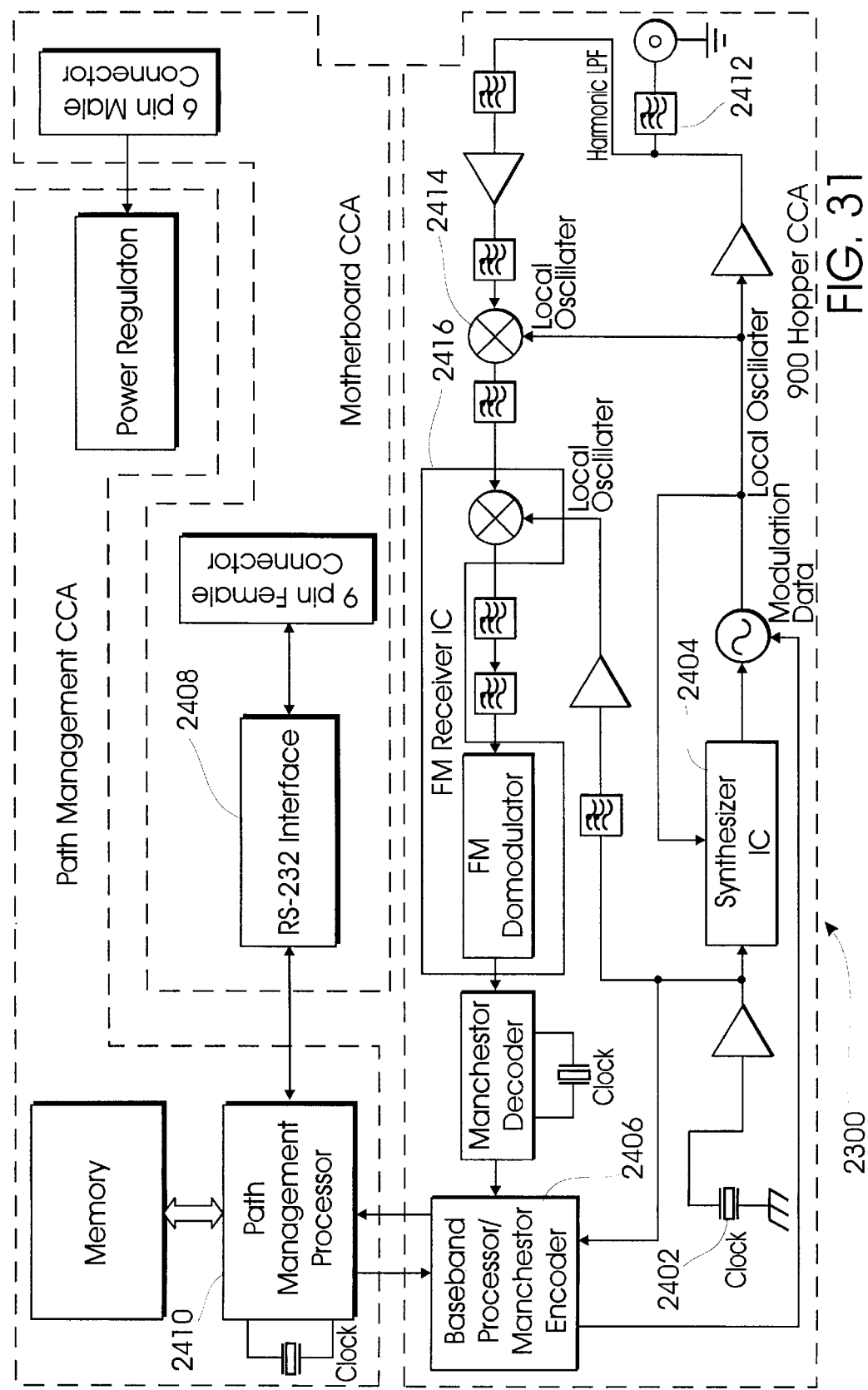
FIG. 31 is a block diagram of a receiver of the data collection module.

FIG. 31 is a block diagram of the configuration of the data repeater module 2300. When in the receive mode, the 900 Mhz transceiver will continuously scan a frequency band of 902 to 928 Mhz searching for a radio frequency signal. If a radio frequency signal is detected, the transceiver will lock on to this signal and demodulate it.

A 24 Mhz crystal will provide a reference clock 2402 for a synthesizer 2404 and baseband processor 2406.

For transmission, digital data is received via an RS-232 port 2408 located on the motherboard. This data is then sent to a path management processor 2410. When the management processor 2410 has received enough data and is ready to transmit, it sends the data to the baseband processor 2406 prior to decoding and modulating.

The received radio frequency signal is passed through low pass filter 2412 and then down converted to 61.3 Mhz as shown at 2414. This signal is then passed to FM receiver 2416 which includes an FM demodulator and then to the baseband processor 2406.

Figure 32:
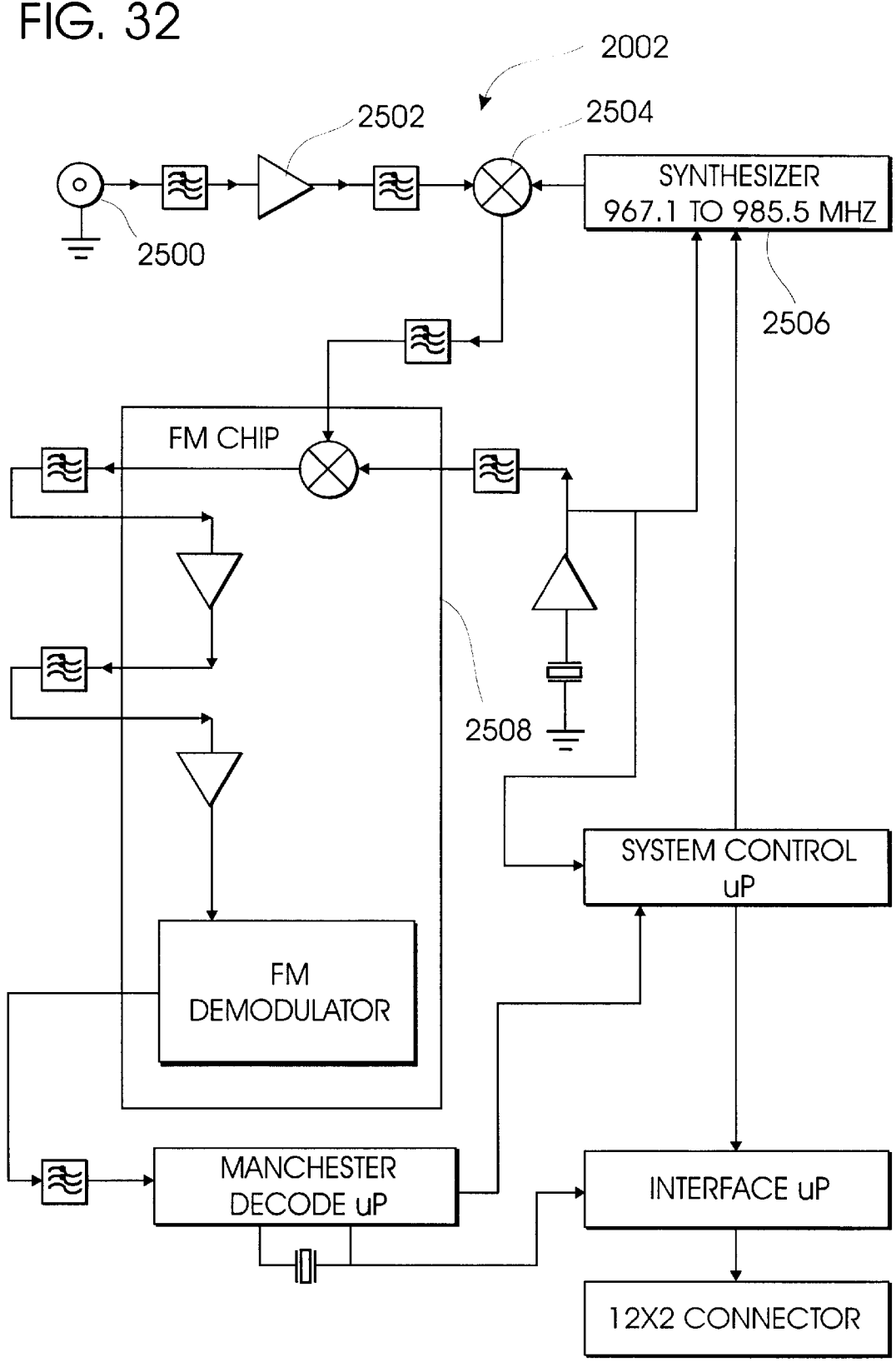
FIG. 32 is a flow chart of the receiver of the data collection module.

FIG. 32 is a block diagram of the receiver 2002 for the data from the sensor interface modules located in the data collection module 110. The receiver 2002 is a frequency-hopping receiver which continuously hops through 25 specific frequencies, stopping just long enough at each frequency to determine whether valid data is being received. If valid data is detected, the receiver stays on frequency long enough to receive the entire packet. An input signal enters the receiver through a connector 2500, then passes through an amplifier 2502 and to a mixer 2504. A synthesizer 2506 includes a voltage controller oscillator. An FM chip 2508 includes an FM demodulator.

Figure 33:
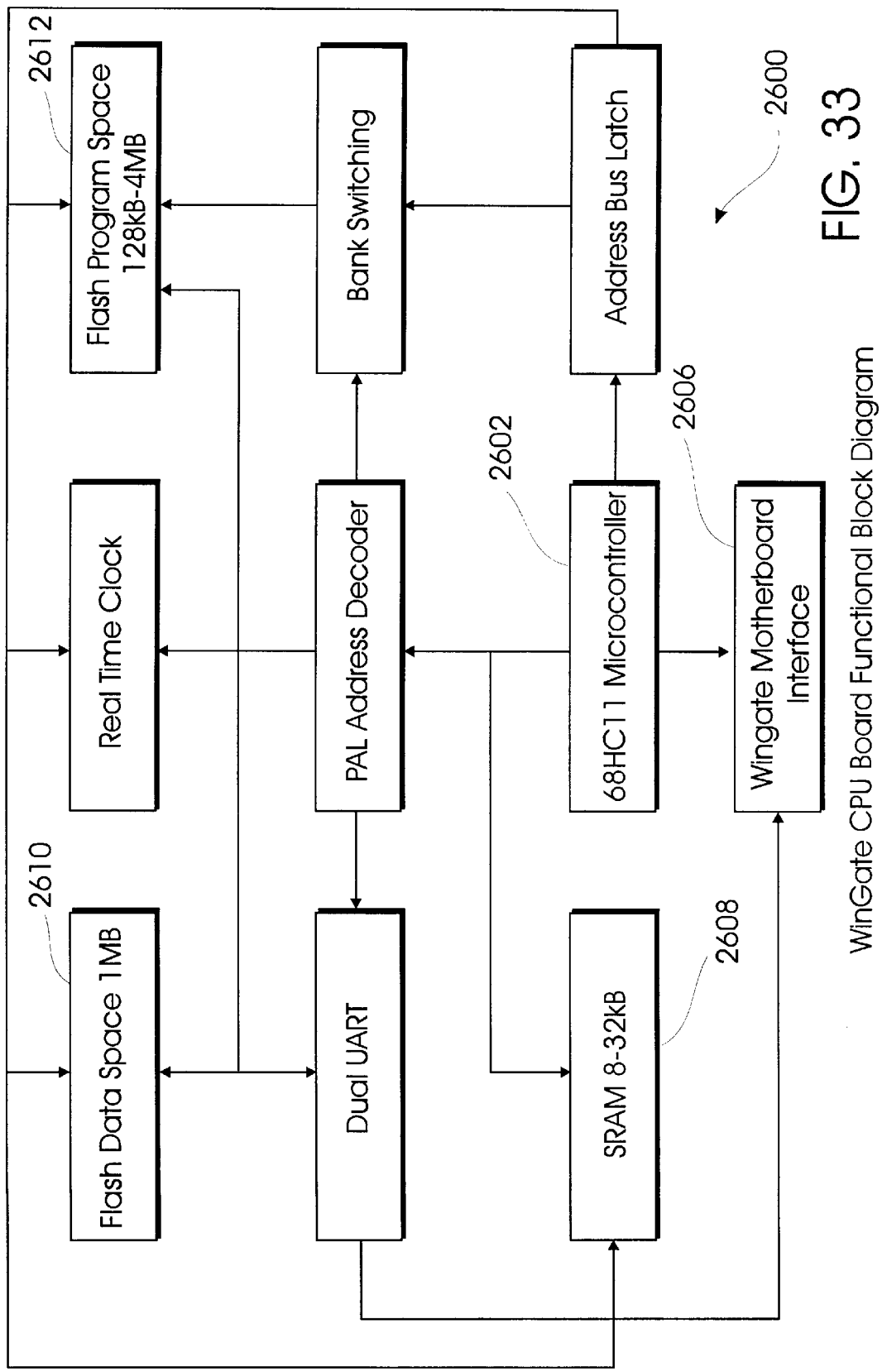
FIG. 33 is a block diagram for the central processing unit of the data collection module shown in FIG. 25.

FIG. 33 is a block diagram of the central processing unit 2600 of the data collection module 110. A microcontroller 2602 is connected to the motherboard 2216 (not shown) through an interface 2606. The CPU 2600 includes random access memory 2608. Flash data space 2610 and flash program space 2612 are also provided.

Figure 34:
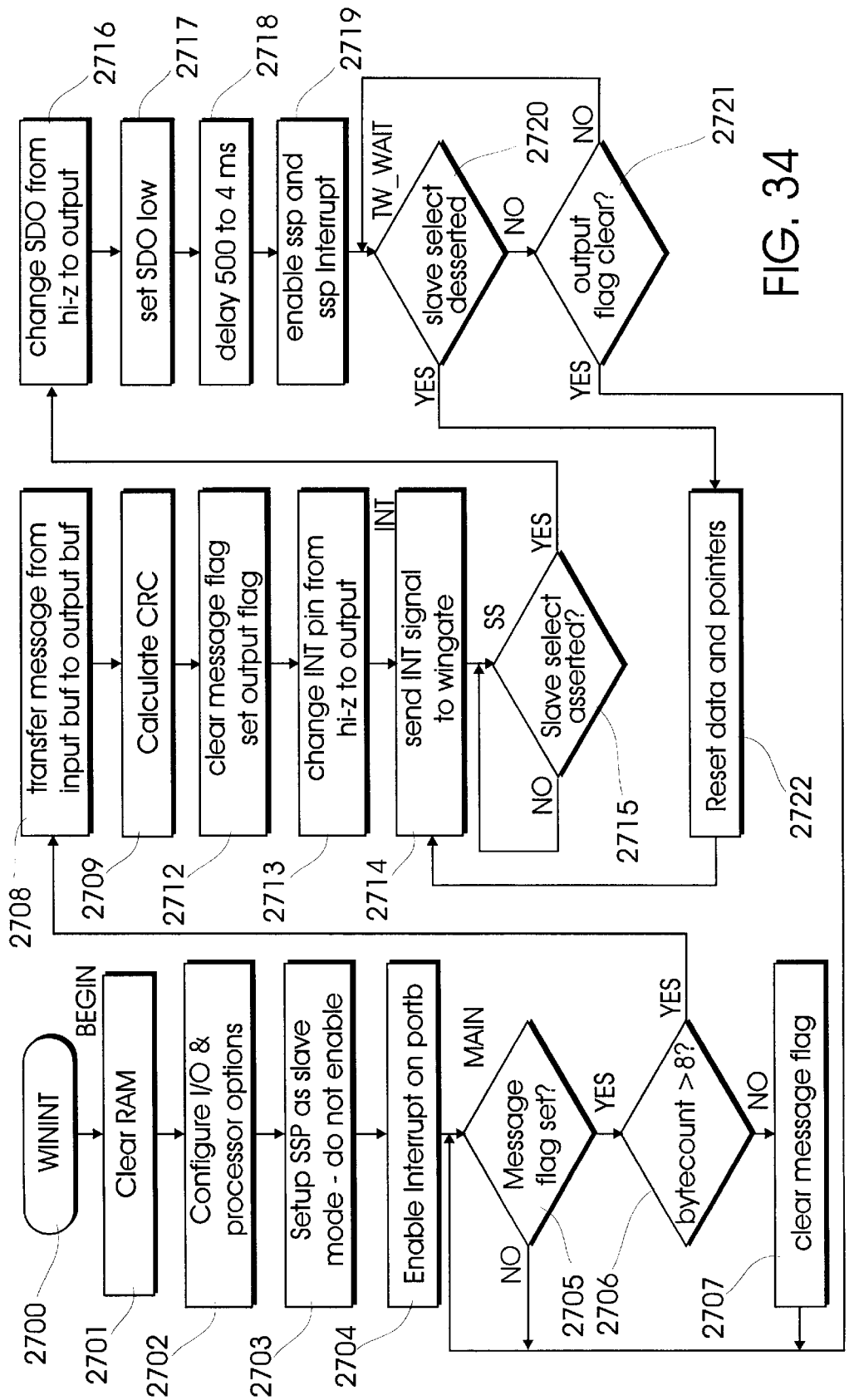
FIG. 34 is a process flow diagram for the operation of the sensor interface module receiver in the data collection module.

FIG. 34 is a process flow diagram for the operation of the sensor interface module receiver 2002 in the data collection module 110. The program first initializes the hardware 2700 and then clears the random access memory 2701. The program then configures input and output operations and the processor options 2702. The program also sets up the slave select pointer as being in slave mode, thus the receiver controller is not yet enabled 2703, and then enables the interrupt controller on portb 2704. This interrupt flag will be set when a valid message is received from the receiver microprocessor. The program then waits to see if the message flag has been set 2705. The program will hold in a checking loop at this point to see if the message flag has been set.

Once the message flag interrupt has been set 2705, the program will check to see if the necessary number of bytes have been sent 2706 with the message. If the necessary number of bytes have not been sent 2706 then the program will clear the message flag 2707 and return to the waiting loop to check to see if the message flag has been set 2705.

If the correct number of bytes have been received 2706, then the message is transferred from the input buffer to the output buffer 2708. Note that at this point only the message is transferred. The CRC and the synchronization byte are stripped from the message packet. The program will then calculate the CRC 2709, clear the message flag and set the output flag 2712, change the interrupt pin 2713, and send the interrupt signal to the data collection controller 2714 to try and assert control over the data collection controller. The program will then hold in a loop until the slave select has been asserted 2715 and the program has control over the data collection controller. Once the slave select has been asserted 2715 the program will change SDO from hi-z to output 2716. The program then sets the SDO low 2717, delays an appropriate amount of time 2718, and then enables both the slave select pointer and slave select pointer interrupt 2719.

The program checks to see if the data collection controller de-asserts the slave select 2720. If the data collection controller de-asserts the slave select then the signal was not properly sent out and so the program resets the data and pointers 2722, and generates another interrupt signal to the data collection controller 2714 to start the transfer process of the signal to the data collection controller all over again.

If, however, the slave select has not been de-asserted 2720, the program will then check to see if the output flag has been cleared 2721. If the output flag has not been cleared 2721 then the program will return to waiting to see if the slave select has been de-asserted at 2720. If the output flag has been cleared then the program will return to waiting for the next message to be sent 2705.

Figure 35:
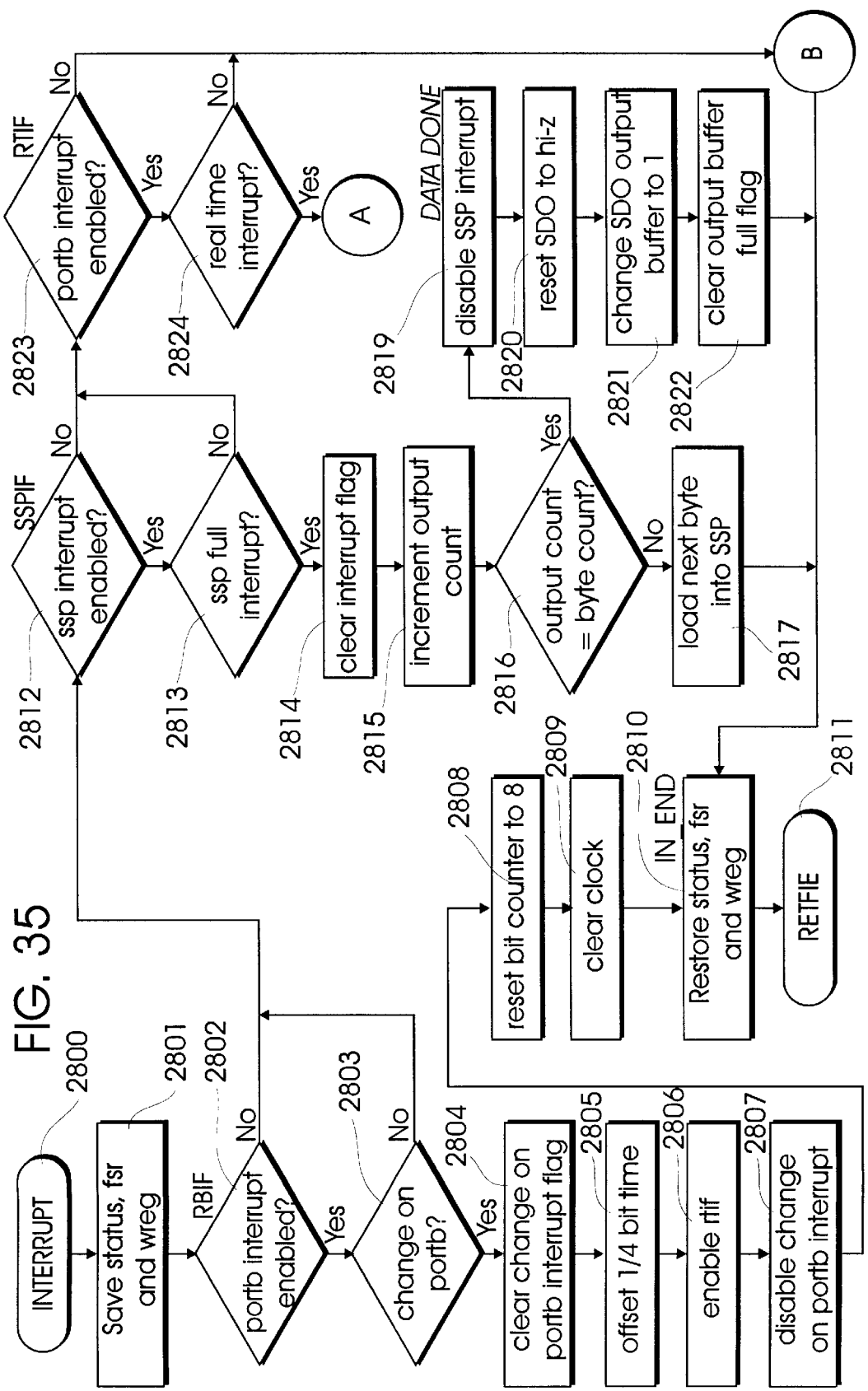
FIGS. 35 and 36 are flow charts of the microprocessor program for the data collection module.
Figure 36:
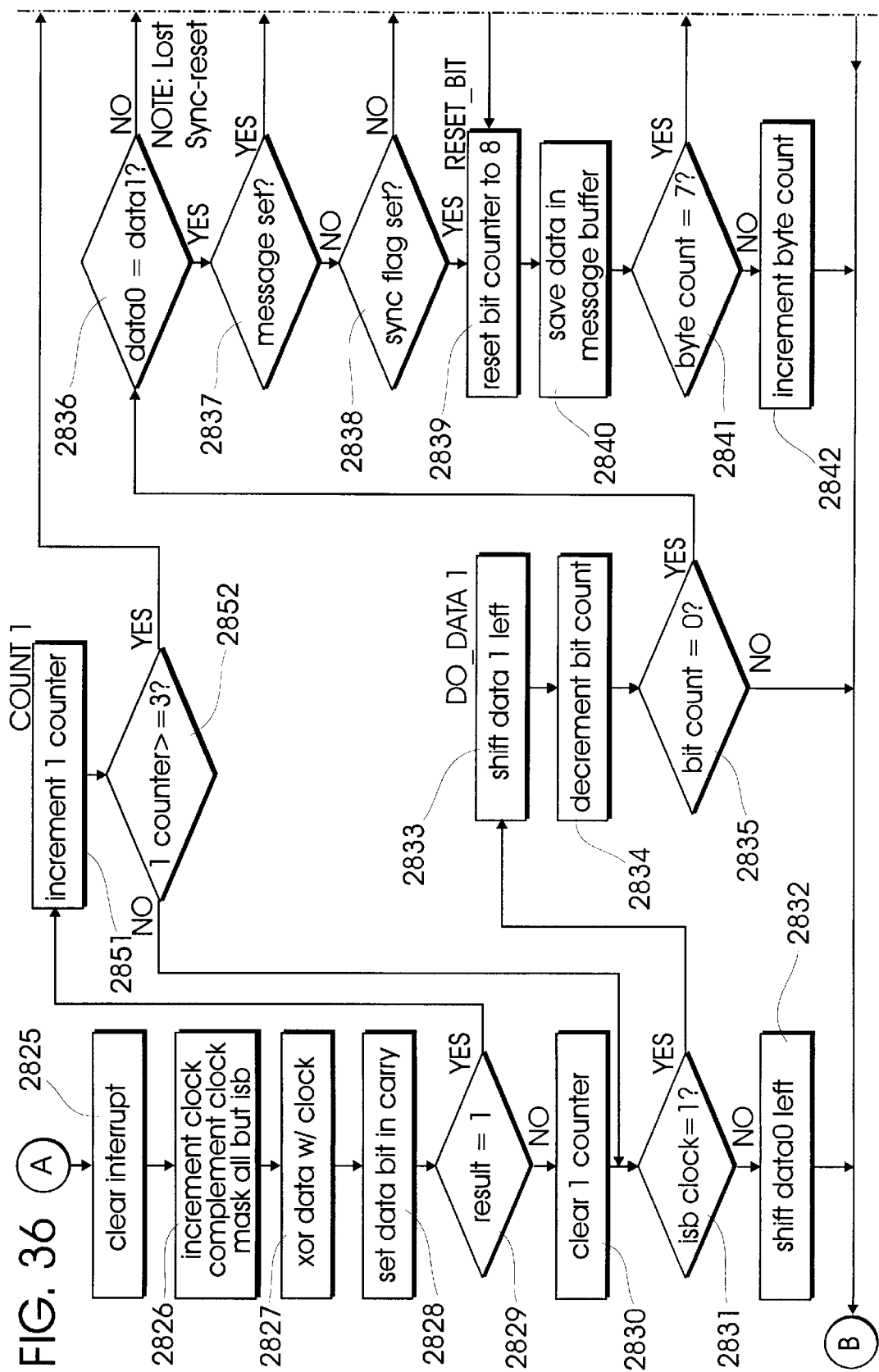
Figure 36A:
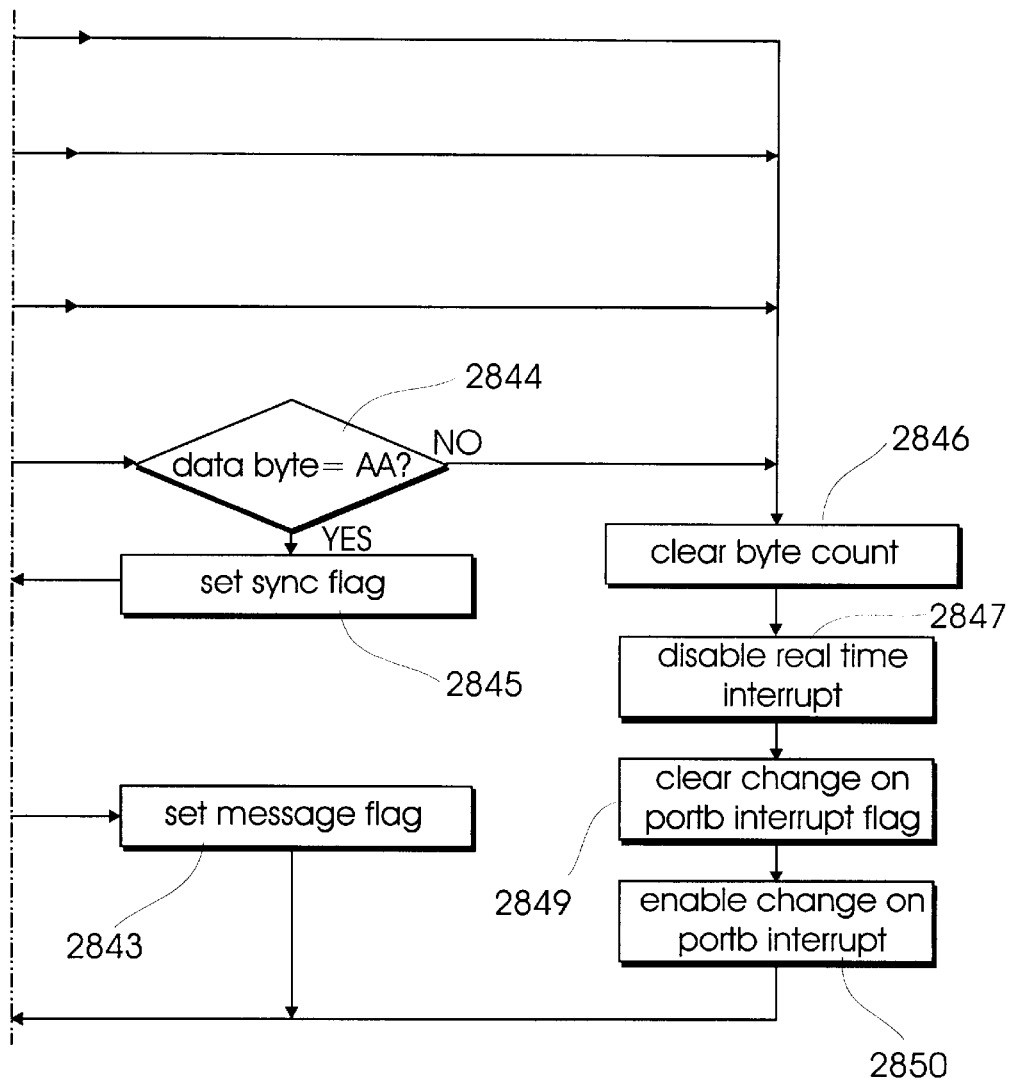
Figure 36B:
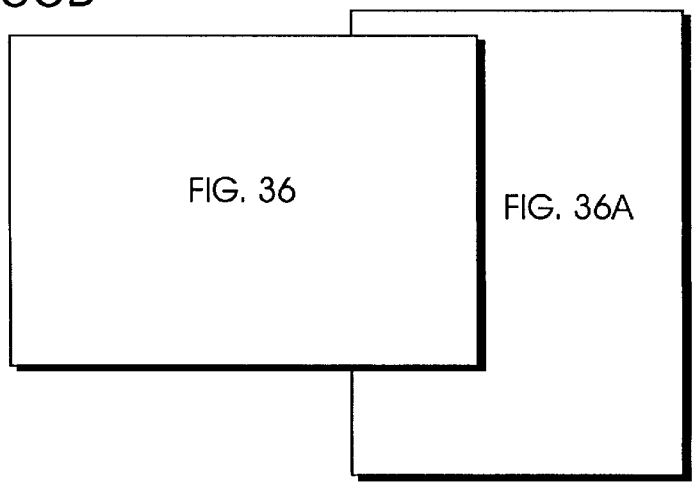

FIGS. 35 and 36 are flow charts of the microprocessor program for the data collection module 110. Once an interrupt has been generated for the microprocessor 2800 the program will save its current status, fsr, and wreg 2801. The program will then check to see if the portb interrupt has been enabled 2802. If the portb has been enabled, then the program will check to see if there has been a change in the information on portb 2803. If there has been a change on portb 2803, then the program will clear the change on the portb interrupt flag 2804. The program then offsets ¼ bit time 2805 and enables the real time interrupt flag 2806. The program will then disable any change from portb interrupt 2807 and reset the bit counter to eight 2808. The program then clears the clock 2809 and restores the status, fsr and wreg 2810. The program then goes to RETFIE 2811.

If the portb interrupt has not been enabled 2802 then the program will check to see if the ssp interrupt has been enabled 2812. Note that if portb interrupt has been enabled 2802, but there has not been a change on portb 2803, then the program will also go to check to see if the ssp interrupt has been enabled 2812.

If the slave select port interrupt has been enabled 2812 the program will then check to see if the slave select port full interrupt has been enabled 2813. If the slave select port full interrupt 2813 has been enabled then the program will clear the interrupt flag 2814, increment the output count 2815, and move on to check to see if the output count equals the byte count 2816.

If the output count does not equal the byte count 2816 the program will load the next byte into the slave select port 2817 and move on to restore the status, fsr, and wreg 2810 and continue with the program.

If the output count does equal the byte count 2816 then the program will disable the slave select port interrupt 2819, reset SDO to hi-z 2820, change SDO output buffer to one 2821, and clear the output buffer full flag 2822. The program will then continue on to restore the status, fsr and wreg 2810 and continue with the program.

If the SSP interrupt is not enabled 2812 or the SSP interrupt is enabled 2812 but the SSP full interrupt is not enabled 2813, then the program will go to check to see if portb interrupt is enabled 2823.

If the portb interrupt is not enabled then the program will move onto restoring the status, fsr and wreg 2810 and continue with the program.

If the portb interrupt is enabled 2823, then the program will check to see if real time interrupt is enabled 2824. If the real time interrupt is not enabled 2824 then the program will continue to restore status, fsr and wreg 2810 and continue with the program.

If the real time interrupt 2824 is enabled then the program will move on to clear the interrupt 2825. As shown in FIGS. 35 and 36 the program continues from circle "A" on FIG. 35 to circle "A" on FIG. 36 after the real time interrupt 2824 has been checked. The program will then increment clock complement clock mask all but lsb 2826, and xor data with the clock 2827. The program will then set data bit in carry 2828, and check to see if the result equals one 2829.

If the result does not equal one 2829, then the program will clear 1-counter 2830 and then check to see if the lab clock equals 1 2831. If the lab clock does not equal one 2831, then the program will shift the data-0 left 2832. The program will then continue on to restore status, fsr, and wreg 2810 and continue with the program.

If the lsb clock does equal one 2831, then the program will move on to shift data 1 left 2833 and then decrement bit count 2834. The program will then check to see if the bit count equals zero 2835.

If the bit count does not equal zero 2835, then the program will return to restore status, fsr, and wreg 2810 and continue with the program.

If the bit count does equal zero 2835, then the program will check to see if data-0 equals data-1 2836.

If data-0 equals data-1 2836, then the program will move on to check to see if the message is set 2837.

If the message is not set 2837, then the program will move on to see if the synchronization flag is set 2838.

If the synchronization flag is set 2838 then the program will move on to reset bit counter to eight 2839 and save data in message buffer 2840. The program will then check to see if the byte count equals seven 2841.

If the byte count does not equal seven 2841, then the program will increment the byte count and return to restore status, fsr, and wreg 2810 and continue with the program.

If the byte count does equal seven 2841, then the program will set the message flag 2843 and return to restore status, fsr, and wreg 2810 and continue with the program.

If the synchronization flag is not set 2838, then the program will check to see if the data byte equals AA hex 2844.

If the data byte equals AA hex 2844, then the program will set the synchronization flag 2845 and move on to reset the byte counter to eight 2839 and continue with the program.

If the data byte does not equal AA hex 2844, then the program will move to clear the byte count 2846 and disable the real time interrupt 2847. The program will then clear change on portb interrupt flag 2849 and enable change on portb interrupt 2850. The program will then restore status, fsr, and wreg 2810 and continue with the program.

If the message is set 2837, then the program moves on to clear the byte count 2846 and continue with the program.

If data-0 not equals data-1 2836, then the program moves on to clear the byte count 2846 and continued with the program.

If result equals one 2829, then the program increments 1-counter 2851 and checks to see if 1-counter was >=three 2852.

If 1-counter is not >=three 2852, then the program moves on to check to see if the lsb clock equals one 2831 and continues with the program.

If 1-counter is >=three 2852, then the program moves on to clear the byte count 2846 and continues with the program.

Thus, the microcontroller monitors and controls several flags and the input and output of information within the data collection controller system.

Figure 37:
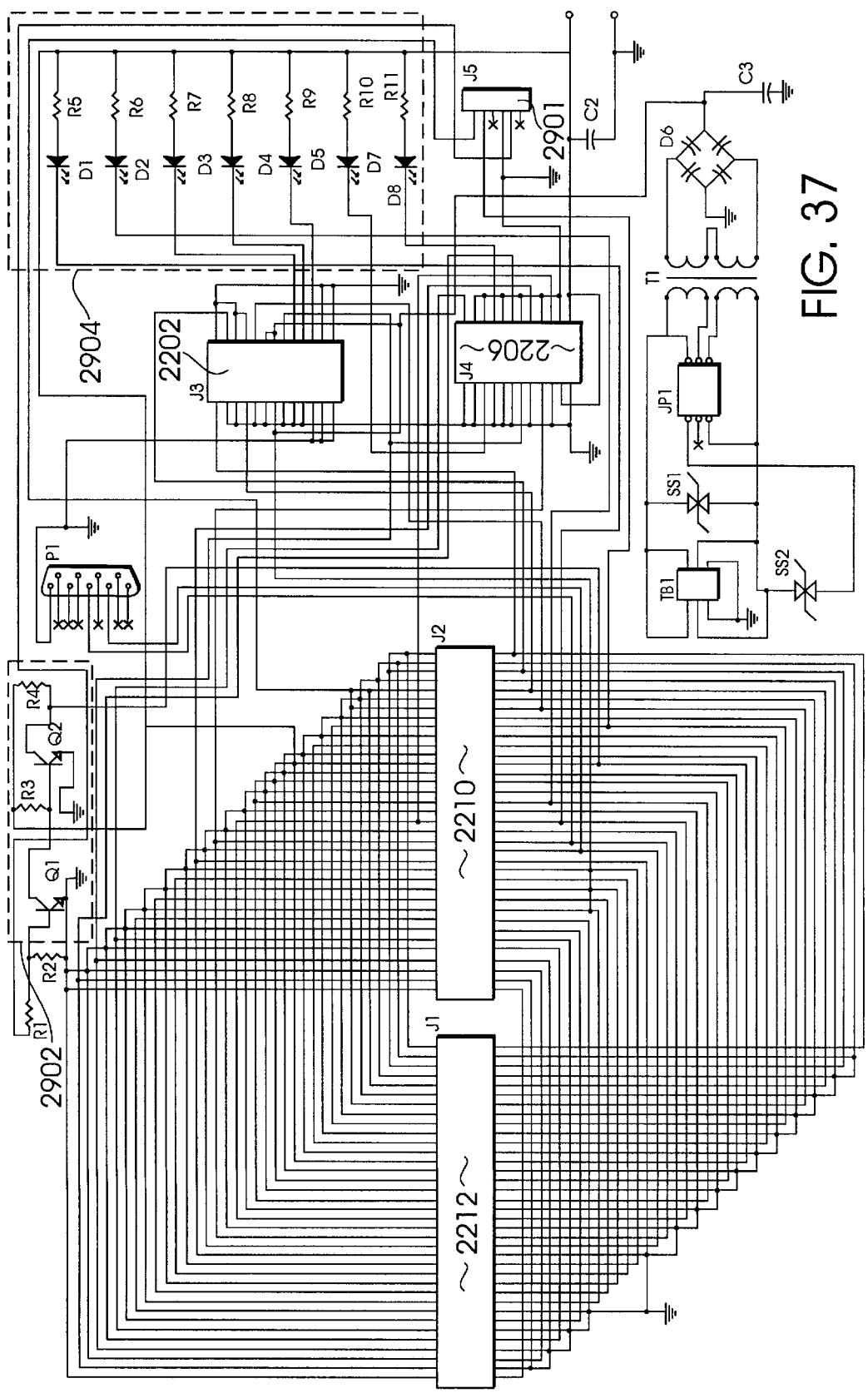
FIGS. 37, 38, 39, 40, 41, and 42 are schematic diagrams of a data collection module.

FIG. 37 is a schematic diagram of the motherboard 2216 which includes connectors for configuration options 2212, for the CPU 2210, for a router module 2202, for the receiver module 2206, an RJ11 jack 2901, transistors 2902 and light emitting diodes 2904. In general, the data collection module works by following a simple routine. While in receive mode, the 900 Mhz Transceiver will continuously scan the frequency band of 902 and 928 Mhz searching for a RF signal. If a RF signal is detected, the transceiver will lock on to this signal, demodulate it, Manchester decode the data, and send this data to an RS-232 port. If a RF signal is not detected, this unit will collect data packets via an RS-232 port, Manchester encode the data, and transmit this data on 1 of 50 different frequency channels ranging from 902 to 928 Mhz. This transmission will use FSK (Frequency Shift Keying) modulation and will transmit for approximately 180 msec. After a packet of data has been transmitted, the transmitter will return to receive mode and start scanning again for a RF signal. The unit will also start collecting another transmit data packet. The above process will then be repeated (at a different frequency) once a complete data packet has been collected. All 50 transmit frequency channels will be used before any given frequency is repeated.

FIGS. 38, 39, 40, 41, and 42 illustrate schematic diagrams of a transceiver design for the data collection module.

Figure 40:
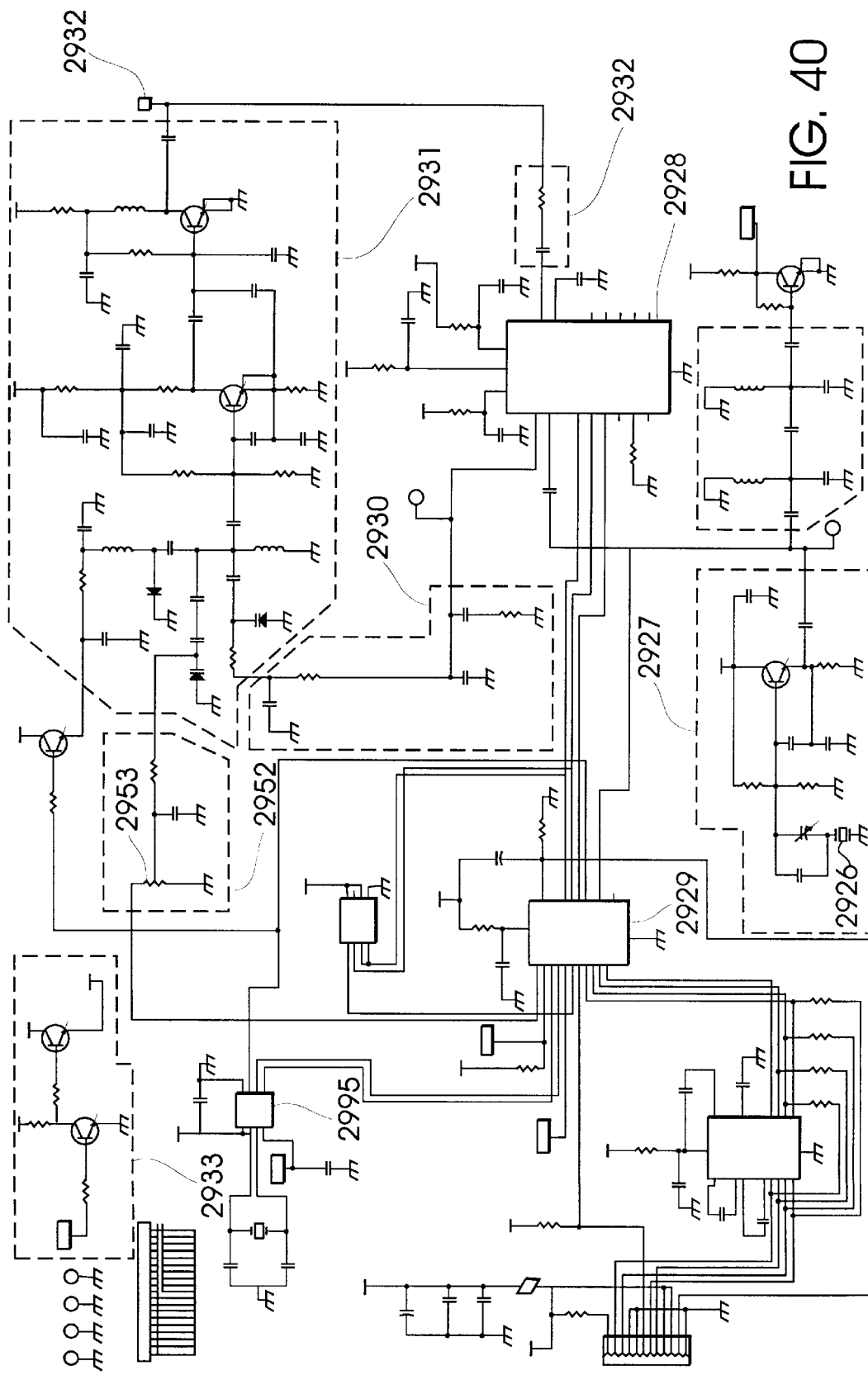

FIG. 40 shows how the synthesizer is implemented. The 24 Mhz crystal 2926 will provide a reference clock for the synthesizer IC 2928 and the baseband processor 2929. The bandpass processor 2929 will program the dividers in the synthesizer IC 2928 to values that will select the appropriate frequency. The output of the synthesizer IC 2928 (pin 6) will pass through a synthesizer filter 2930 and will provide the tune voltage for the Voltage Controlled Oscillator (VCO) 2931. The output of the VCO 2931 will provide the feedback through VCO filter 2932 for the synthesizer IC 2928 (pin 11) and will also provide a Local Oscillator (LO) 2932 for the receiver and the transmitter.

Figure 38:
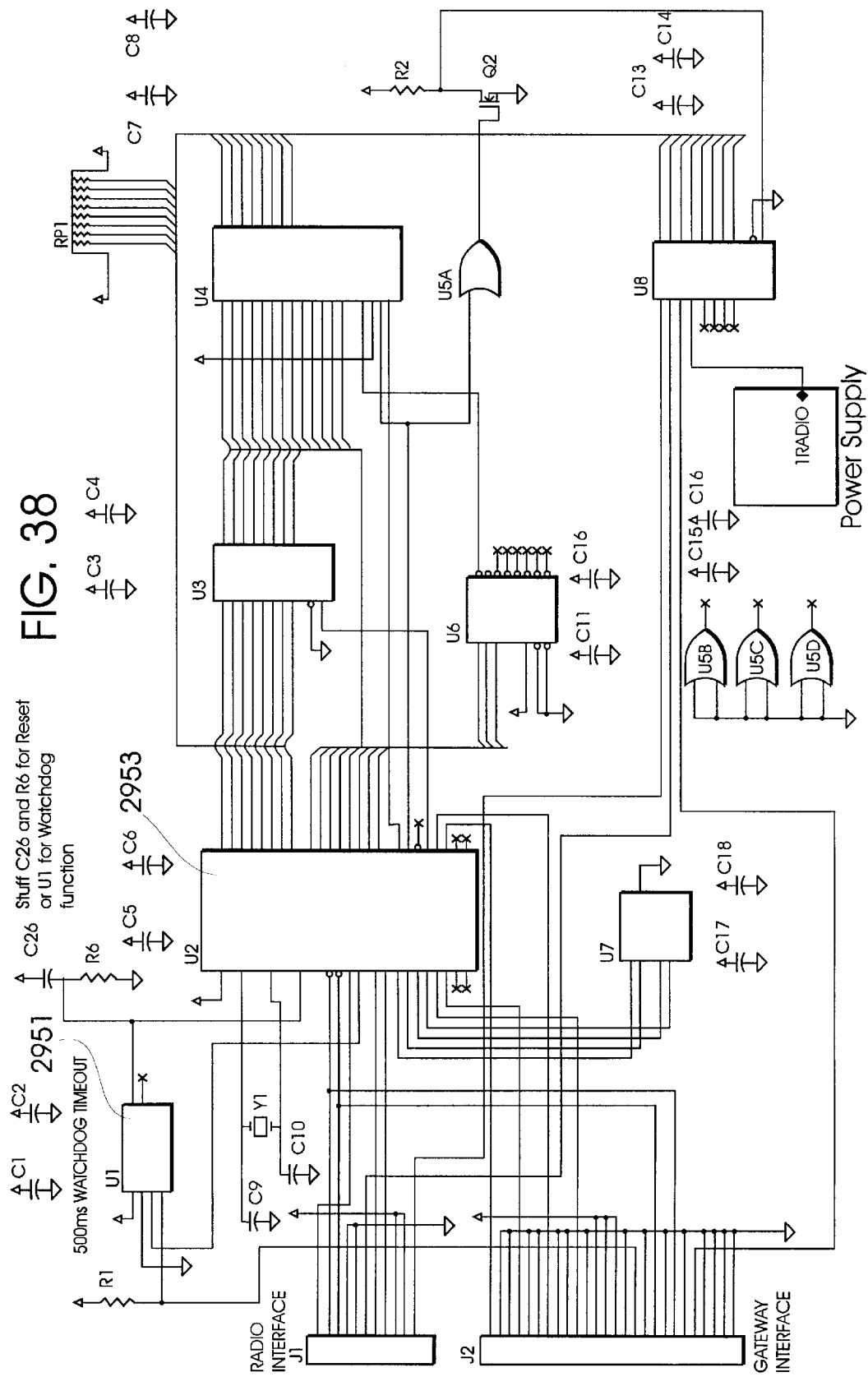

FIGS. 38, 39, 40, 41, and 42 show how the transmitter is implemented. As shown in FIG. 38, digital data is received via an RS-232 port connected by the motherboard data controller 2951. This data is then sent to the path management processor 2953 which controls all receive and transmit functions of the transceiver. When the management processor has received enough data and is ready to transmit, it sends the data to the baseband processor 2929, as shown in FIG. 40. The baseband processor 2929 manchester encodes the data and sends this data to the VCO 2931 via deviation adjuster 2952. This signal then modulates the VCO 2931. A variable resistor 2953 in the deviation adjuster 2952 sets the frequency deviation of the VCO 2931 output. This output is then fed to the input of the power amplifier 2940 shown in FIG. 41.

Figure 41:
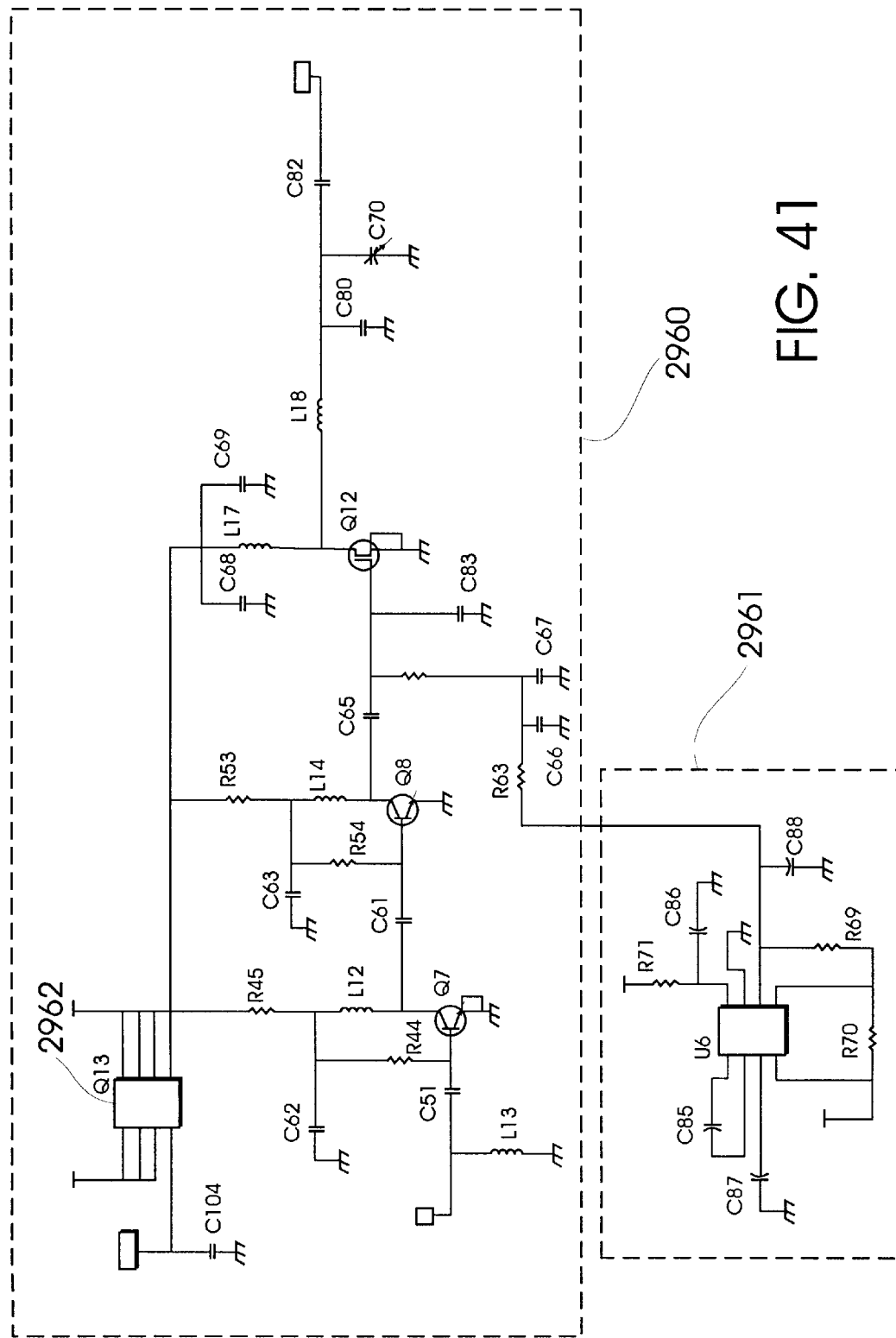

FIG. 41 shows a schematic diagram of the power amplifier and the negative bias voltage supply. The power amplifier 2960 requires a negative bias voltage which is supplied by negative bias voltage supply 2961.

Figure 42:
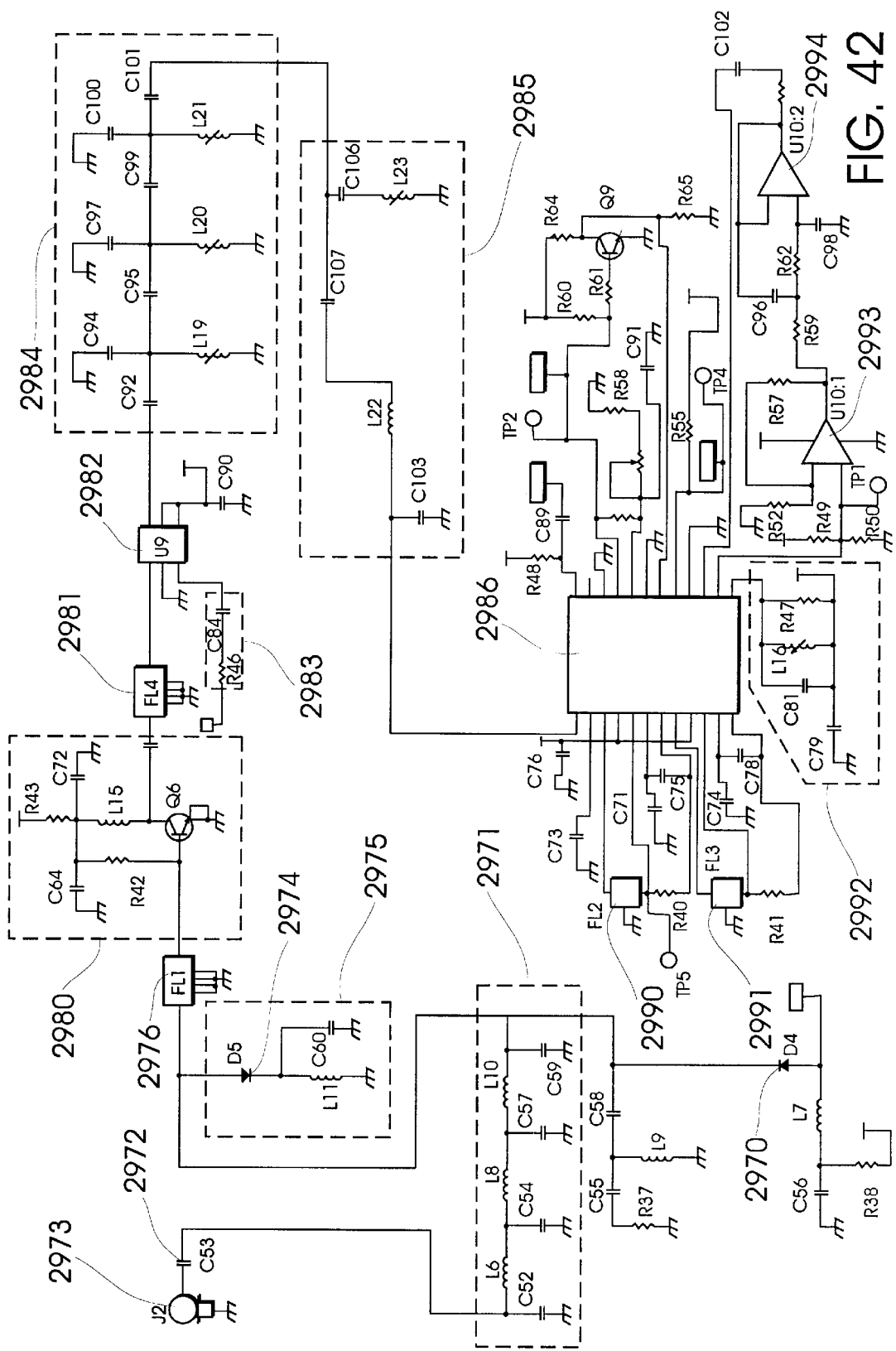

As shown in FIG. 42, the output of the Power Amplifier 2960 passes through diode-4 2970 and signal filter 2971. The output is then AC coupled by coupler 2972 and is fed to antenna 2973. A DC bias voltage is applied to diode-4 2970 and diode-5 2974 when the transceiver is placed in transmit mode. This allows the transmitted signal to pass through diode-4 2970 and on to the output circuitry. Signal block 2975 and a quarter-wave length stripline provide a RF short to ground at the input to the receiver front end. This is to protect the receiver front end from the high output power of the transmitter.

When the Transceiver is in the transmit mode, all the receiver circuitry is powered down by receiver switch 2933 shown in FIG. 40 and all the transmitter circuitry is powered up by transmitter switch 2962, shown in FIG. 41.

The received RF signal enters antenna 2973, is AC coupled by coupler 2973 and is low-pass filtered by signal filter 2971. This signal passes through bandpass filter-1 2976, amplifier 2980, bandpass filter-2 2981, and is down-converted to 61.3 Mhz by down-converter 2982. The LO for the down-conversion is provided by the synthesizer via LO filter 2983. This IF signal (61.3 Mhz) then passes through bandpass filter-3 2984 and then passes through notch filter 2985. This IF signal is then down-converted to a second IF (10.7 Mhz) by down-converter-2 2986.

Returning to FIG. 40, the 2nd LO for down-converter-2 2986 is provided from the third harmonic of 24 Mhz crystal 2926 that passed through 3rd harmonic filter-1 2940 and 3rd harmonic amplifier-1 2941. This signal is then used in FIG. 42 where this second IF is passes through harmonic bandpass filter-2 2990, harmonic amplifier-2 (internal to A3-U8), harmonic bandpass filter-3 2991 and then goes to a FM discriminator. The discriminator is adjusted with the tank circuitry 2992. The output of the discriminator passes though buffer 2993 and buffer lowpass filter 2994. This filtered baseband signal is then fed into a data slicer and TTL level data is output and the schematic returns to FIG. 40.

As shown in FIG. 40, the data passes through Manchester decoder 2995 and is sent to baseband processor 2929, and then to the path management processor 2953. This processor then transmits digital data over the RS-232 port 2950.

When the Transceiver is in the receive mode, all the receiver circuitry is powered up by receiver switch 2933, shown in FIG. 40, and all the transmitter circuitry is powered down by transmit switch 2962, shown in FIG. 41.

Figure 43:
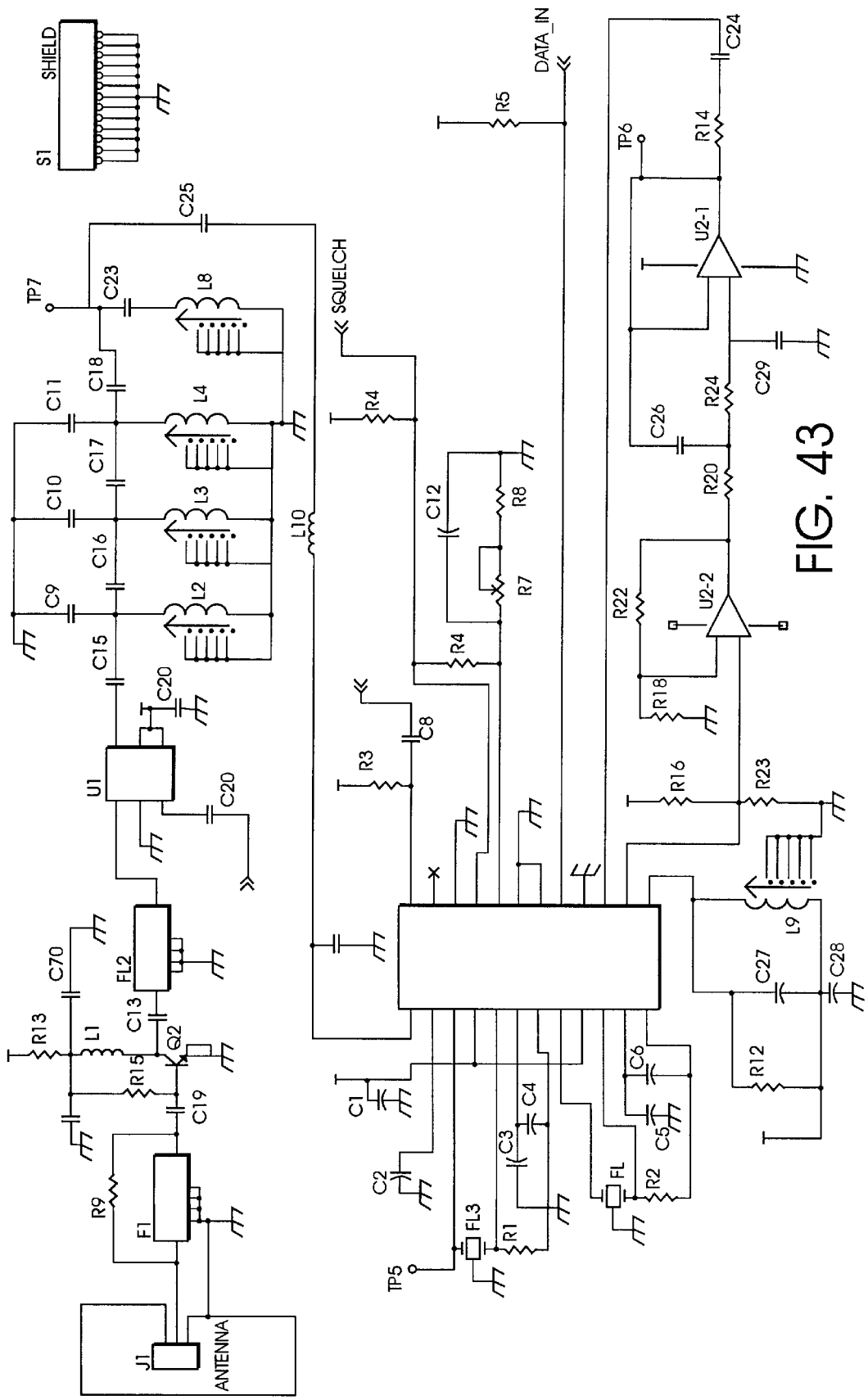
FIG. 43 shows a schematic diagram of a sensor interface module receiver.

FIG. 43 shows a schematic diagram of a sensor interface module receiver. The sensor interface module receiver for the data collection module is a frequency-hopping receiver. It continuously hops through the 25 specific frequencies it has memorized, stopping just long enough at each frequency to determine whether valid data is being received. If valid data is detected, the receiver stays on frequency long enough to accept the entire packet of data, then it continues hopping.

The receiver detects frequency-modulated, manchester-encoded, digital signals using dual down-conversion architecture. On board processors decode and verify that the data is good before passing it to a motherboard through a 24-pin (12×2) connector. Power and control signals are also passed to the receiver through this connector.

An input signal enters the receiver through a female SMA connector. The signal passes through a SAW bandpass filter, an amplifier based on Q2, and another SAW bandpass filter. The signal next passes through a first mixer. The Local Oscillator (1st LO) for this mixer comes from the synthesizer which provides frequencies from 967.1 Mhz to 985.5 Mhz. The Intermediate Frequency (IF) from this mixture is 61.3 Mhz. This IF passes through a four-section bandpass filter before entering the FM Demodulator chip.

The synthesizer consists of a Voltage Controlled Oscillator (VCO) and a Phase Locked Loop (PLL) chip. Oscillations come from a varactor and a single-loop, air-core inductor. The VCO output is buffered before being sent to the mixer or fed back to the PLL chip. A serial control word sent from microcontroller to the PLL chip sets the synthesizer frequency. The reference frequency for the PLL is 24 Mhz.

The 1st IF of 61.3 Mhz enters a second mixer on the FM chip. A 2nd LO of 72 Mhz is derived from the third harmonic of the 24 Mhz crystal oscillator that services the PLL and microcontrollers. The output of the mixer is at 10.7 Mhz. This 2nd IF then passes through a narrowband ceramic filter, an on chip amplifier, another ceramic filter, and back on chip to a limiting amplifier. The final stage is a demodulation using an off chip tuned circuit. The demodulated data signal is then lowpass filtered by an off chip op-amp circuit before passing on to the microcontrollers.

There are three controllers on the receiver. The first one takes the demodulated data stream and decodes the Manchester formatting. The decoded data passes along to a controller which controls the PLL hopping and performs the verification of the bit stream to determine if it is valid data.

Figure 39:
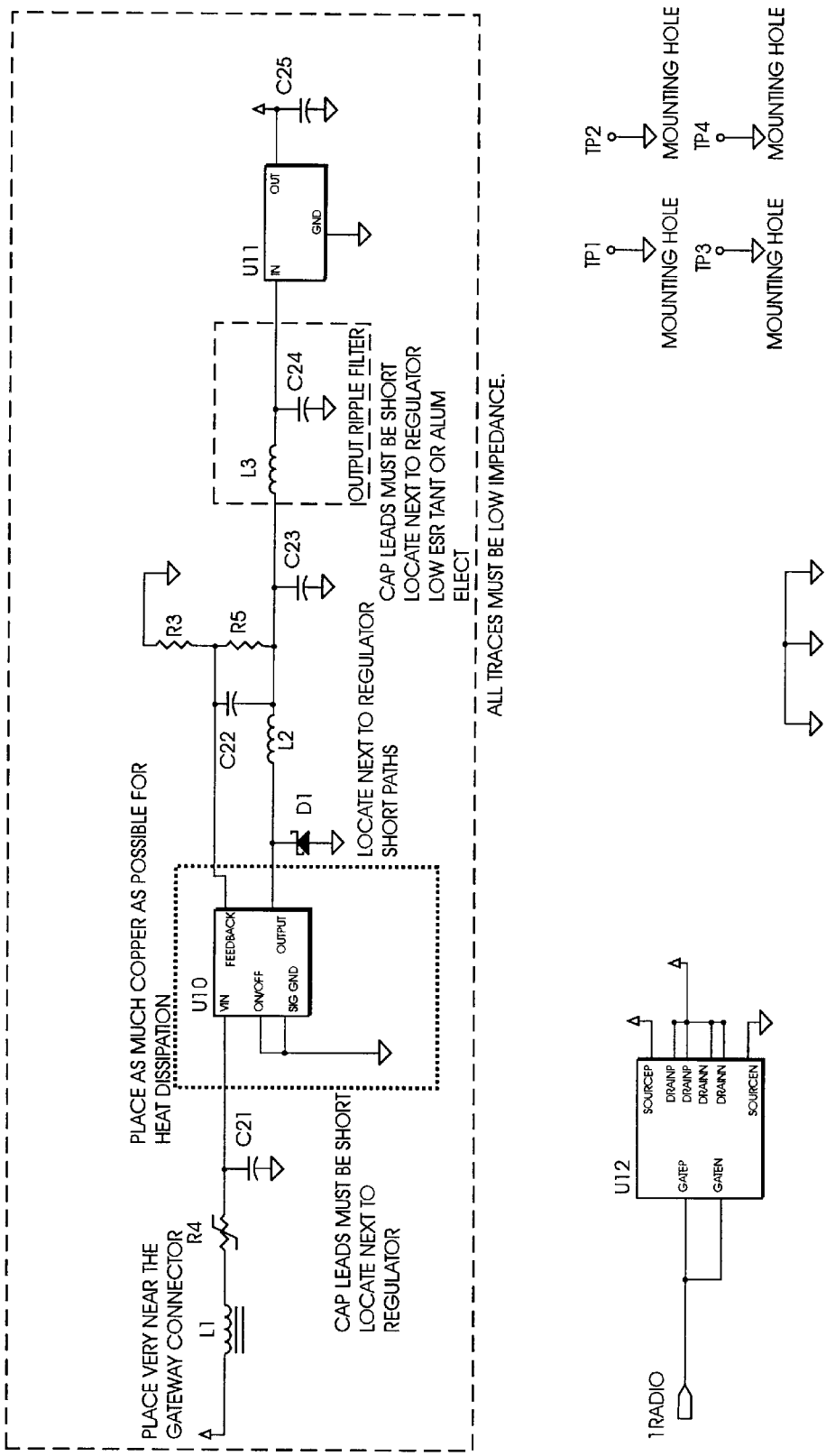

The following is a table of values for the schematic diagram shown in FIGS. 38 and 39.

| Item # | Ref. Desig. | Description | Package | Value | Rating | Tot % |
|---|---|---|---|---|---|---|
| 1 | C1, C3, C5, C7, C11, C13, C15, C17 | .1 uF | 603 | .1 uF | | +10% |
| 2 | C2, C4, C6, C8, C12, C14, C16, C15 | .01 uF | 603 | .01 uF | | +10% |
| 3 | C9, C10 | 22 pF | 603 | 22 pF | | +5% |
| 4 | C21 | 22 OuF 35 V | NACZ | 22 OuF 35 V | 35 V | 20% |
| 5 | C22 | 4.7 nF | 1206 | 4.7 nF | 50 V | +10% |
| 6 | C23 | 33 OuF 25 V | NACZ | 33 OuF 25 V | 25 V | 20% |
| 7 | C24 | 100 uF 16 V | TAJD | 100 uF 16 V | 16 V | |
| 8 | C26, C25 | 10 uF 16 V | TAJD | 10 uF 16 V | 16 V | 10% |
| 9 | D1 | MBRS360T3 | SMC | MBRS360T3 | 60 V 3 A | |
| 10 | J1 | CON12 | IDC12 | CON12 | | |
| 11 | J2 | CON26 | IDC26R | CON26 | | |
| 12 | L1 | NCB1612K480TR | 1612 | NCB1612K480TR | | |
| 13 | L2 | 100uH.9A | DS5022 | 100uH.9A | .9A | |
| 14 | L3 | 22uH2A | IHSM | 22uH2A | 2A | |
| 15 | Q2 | BSS123 | SOT-23F | BSS123 | | |
| 16 | RP1 | EXB-A10P103J | EXB | EXB-A10P103J | | |
| 17 | R1, R2, R6 | 10K | 603 | 10K | | 10% |
| 18 | R3 | 1K | 603 | 1K | | 1% |
| 19 | R4 | SMD200 | SMD200 | SMD200 | | |
| 20 | R5 | 3.82K | 603 | 3.82K | | 1% |
| 21 | TP1, TP2, TP3, TP4 | Mounting Hole | TPAD | Mounting Hole | | |
| 22 | U1 | DS1232S | SOL-16 | DS1232S | | |
| 23 | U2 | AT89C52-16JC | PLCC44 | AT89C52-16JC | | |
| 24 | U3 | 74HC373 | SOL-20 | 74HC373 | | |
| 25 | U4 | LH5168N-10L | SMD28B | LH5168N-10L | | |
| 26 | U5 | 74HC32 | SO-14 | 74HC32 | | |
| 27 | U6 | 74HC138 | SO-16 | 74HC138 | | |
| 28 | U7 | AT93C66-10SI | SO-8 | AT93C66-10SI | | |
| 29 | U8 | 74HC374 | SOL-20 | 74HC374 | | |
| 30 | U10 | LM2595S-ADJ | TO-263-5 | LM2595S-ADJ | | |
| 31 | U11 | MIC2940A-5.OBU | TO-263 | MIC2940A-5.OBU | | |
| 32 | U12 | SI4539DY | SO-8 | SI4539DY | | |
| 33 | Y1 | 14.7456 MHz | XTALS | 14.7456 MHz | | |
| 34 | U2 | Socket | PLCC44 | | | |

The following is a table of values for the schematic diagram shown in FIGS. 40, 41, and 42.

| Item # | Qty. | Ref. Desig. | Description | Package | Value | Rating | Tot % |
|---|---|---|---|---|---|---|---|
| 1 | 1 | U6 | Inductor, SMD | 5 MM Coil | 1 uH | | |
| 2 | 4 | L19, L20, L32, L23 | Inductor, SMD | 5 MM Coil | 330 nH | | |
| 3 | 2 | FL2, FL3 | Filter | 10.7 Cerfilt | 10.7 MHz | | |
| 4 | 9 | C38, C43, C44, C69, C71, C73, C74, C75, C78 | Capacitor, Ceramic | 603 | 0.01 uF | 16 v | NPO 5% |
| 5 | 16 | C1, C6, C7, C8, C9, C10, C11, C12, C22, C25, C27, C37, C66, C76, C79, C102 | Capacitor, Ceramic | 603 | 0.1 uF | 16 v | NPO 5% |
| 6 | 4 | C21, C24, C95, C99 | Capacitor, Ceramic | 603 | 0.5 pF | 16 v | NPO 5% |
| 7 | 2 | C28, C42 | Capacitor, Ceramic | 603 | 1 pF | 16 v | NPO 5% |
| 8 | 1 | C41 | Capacitor, Ceramic | 603 | 1.2 pF | 16 v | NPO 5% |

-continued

| Item # | Qty. | Ref. Desig. | Description | Package | Value | Rating | Tot % |
|---|---|---|---|---|---|---|---|
| 9 | 1 | C29 | Capacitor, Ceramic | 603 | 1.8 pF | 16 v | NPO 5% |
| 10 | 5 | C26, C32, C34, C35, C36 | Capacitor, Ceramic | 603 | 2.2 pF | 16 v | NPO 5% |
| 11 | 4 | C52, C59, C61, C77 | Capacitor, Ceramic | 603 | 2.7 pF | 16 v | NPO 5% |
| 12 | 2 | C30, C83 | Capacitor, Ceramic | 603 | 3.9 pF | 16 v | NPO 5% |
| 13 | 3 | C54, C57, C105 | Capacitor, Ceramic | 603 | 4.7 pF | 16 v | NPO 5% |
| 14 | 2 | C51, C103 | Capacitor, Ceramic | 603 | 5.6 pF | 16 v | NPO 5% |
| 15 | 3 | C33, C39, C60 | Capacitor, Ceramic | 603 | 6.8 pF | 16 v | NPO 5% |
| 16 | 4 | C65, C89, C92, C101 | Capacitor, Ceramic | 603 | 8.3 pF | 16 v | NPO 5% |
| 17 | 1 | C48 | Capacitor, Ceramic | 603 | 10 pF | 16 v | NPO 5% |
| 18 | 2 | C94, C100 | Capacitor, Ceramic | 603 | 12 pF | 16 v | NPO 5% |
| 19 | 1 | C13 | Capacitor, Ceramic | 603 | 15 pF | 16 v | NPO 5% |
| 20 | 2 | C97, C106 | Capacitor, Ceramic | 603 | 18 pF | 16 v | NPO 5% |
| 21 | 1 | C93 | Capacitor, Ceramic | 603 | 27 pF | 16 v | NPO 5% |
| 22 | 3 | C4, C5, C18 | Capacitor, Ceramic | 603 | 33 pF | 16 v | NPO 5% |
| 23 | 19 | C2, C16, C19 | Capacitor, Ceramic | 603 | 47 pF | 16 v | NPO 5% |
| 24 | 1 | C98 | Capacitor, Ceramic | 603 | 68 pF | 16 v | NPO 5% |
| 25 | 1 | C23 | Capacitor, Ceramic | 603 | 100 pF | 16 v | NPO 5% |
| 26 | 1 | C96 | Capacitor, Ceramic | 603 | 150 pF | 16 v | NPO 5% |
| 27 | 1 | C107 | Capacitor, Ceramic | 603 | 180 pF | 16 v | NPO 5% |
| 28 | 2 | C17, C81 | Capacitor, Ceramic | 603 | 220 pF | 16 v | NPO 5% |
| 29 | 1 | C72 | Capacitor, Ceramic | 603 | 560 pF | 16 v | NPO 5% |
| 30 | 3 | C20, C90, C91 | Capacitor, Ceramic | 603 | 1000 pF | 16 v | NPO 5% |
| 31 | 4 | C47, C55, C58, C80 | Capacitor, Ceramic | 603 | NI | 16 v | NPO 5% |
| 32 | 2 | L14, L18 | Inductor, SMD | 603 | 1.5 nH | | 5% |
| 33 | 1 | L13 | Inductor, SMD | 603 | 5.6 nH | | 5% |
| 34 | 1 | L12 | Inductor, SMD | 603 | 8.2 nH | | 5% |
| 35 | 1 | L15 | Inductor, SMD | 603 | 10 nH | | 5% |
| 36 | 4 | L1, L5, L7, L11 | Inductor, SMD | 603 | 68 nH | | 5% |
| 37 | 1 | L9 | Inductor, SMD | 603 | NI | | 5% |
| 38 | 4 | R35, R5, R15, R66 | Resistor, SMD (Chip) | 603 | 1K | | 5% |
| 39 | 2 | R57, R65 | Resistor, SMD (Chip) | 603 | 0 Ohm | | 5% |
| 40 | 1 | R51 | Resistor, SMD (Chip) | 603 | 1.8M | | 5% |
| 41 | 1 | R54 | Resistor, SMD (Chip) | 603 | 3K | | 5% |
| 42 | 3 | R2, R18, R19 | Resistor, SMD (Chip) | 603 | 4.7K | | 5% |
| 43 | 1 | R22 | Resistor, SMD (Chip) | 603 | 8.2K | | 5% |
| 44 | 7 | R3, R10, R27, R30, R31, R67, R71 | Resistor, SMD (Chip) | 603 | 10 Ohm | | 5% |
| 45 | 11 | R1, R9, R11, R14, R16, R17, R20, R24, R48, R55, R60 | Resistor, SMD (Chip) | 603 | 10K | | 5% |
| 46 | 1 | R44 | Resistor, SMD (Chip) | 603 | 11K | | 5% |
| 47 | 2 | R25, R32 | Resistor, SMD (Chip) | 603 | 18K | | 5% |
| 48 | 1 | R45 | Resistor, SMD (Chip) | 603 | 22 Ohm | | 5% |

-continued

| Item # | Qty. | Ref. Desig. | Description | Package | Value | Rating | Tot % |
|---|---|---|---|---|---|---|---|
| 49 | 6 | R26, R42, R58, R59, R62, R68 | Resistor, SMD (Chip) | 603 | 33K | | 5% |
| 50 | 1 | R13 | Resistor, SMD (Chip) | 603 | 39K | | 5% |
| 51 | 1 | R28 | Resistor, SMD (Chip) | 603 | 47 Ohm | | 5% |
| 52 | 1 | R69 | Resistor, SMD (Chip) | 603 | 51K | | 5% |
| 53 | 2 | R34, R43 | Resistor, SMD (Chip) | 603 | 56 Ohm | | 5% |
| 54 | 1 | R63 | Resistor, SMD (Chip) | 603 | 100 Ohm | | 5% |
| 55 | 5 | R12, R33, R49, R50, R70 | Resistor, SMD (Chip) | 603 | 100K | | 5% |
| 56 | 2 | R29, R36 | Resistor, SMD (Chip) | 603 | 180 Ohm | | 5% |
| 57 | 2 | R21, R56 | Resistor, SMD (Chip) | 603 | 390 Ohm | | 5% |
| 58 | 3 | R40, R41, R46 | Resistor, SMD (Chip) | 603 | 430 Ohm | | 5% |
| 59 | 2 | R23, R38 | Resistor, SMD (Chip) | 603 | 470 Ohm | | 5% |
| 60 | 9 | R4, R6, R7, R8, R37, R47, R52, R61, R64 | Resistor, SMD (Chip) | 603 | NI | | 5% |
| 61 | 2 | L3, L4 | Inductor, SMD | 1008 | 330 nH | | 10% |
| 62 | 1 | L22 | Inductor, SMD | 1008 | 680 nH | | 10% |
| 63 | 1 | BD1 | Ferrite Bead | 1206 | CL3216U | | |
| 64 | 1 | R53 | Resistor, SMD (Chip) | 1206 | 5.6 Ohm | | 5% |
| 65 | 3 | C3, C14, C88 | Cap Tant SMT | 1510 | 10 uF | 16 V | |
| 66 | 1 | L2 | Inductor Aircoll 50 ID | | 5 nH | | |
| 67 | 1 | POT1 | Resistor Pot SMT | B Pot | 50K | | |
| 68 | 3 | C85, C86, C87 | Cap Tant SMT | 1206 | 1 uF | 16 V | |
| 69 | 1 | C70 | Cap Var | | JR060 | | |
| 70 | 1 | C15 | Cap Var | | JR300 | | |
| 71 | 4 | L6, L5, L10, L17 | Cap Coll | | 8 nH | | 5% |
| 72 | 1 | U3 | DIP IC | Dip20 | AT89C2051 | | |
| 73 | 2 | FL1, FL4 | Filter, Saw | FJ Saw BPF | BPF | | |
| 74 | 1 | J1 | Connector | IDC12 | | | |
| 75 | 1 | S1 | Shield | LT SHIELD | | | |
| 76 | 5 | Q4, Q5, Q6, Q7, Q11 | Transistor, SMD | | NE68139 | | |
| 77 | 1 | J2 | Connector | SMA Edge | SMA Female | | |
| 78 | 1 | U4 | SMT IC | SO-8 | NI | | |
| 79 | 1 | U6 | SMT IC | SO-8 | MAX853 | | |
| 80 | 1 | U10 | SMT IC | SO-8 | TLC272 | | |
| 81 | 1 | Q13 | | SO-8 | TPS1101D | | |
| 82 | 1 | U2 | SMT IC | SO-8W | 12C508 | | |
| 83 | 1 | U1 | SMT IC | SO-16 | MAX202 | | |
| 84 | 1 | U5 | SMT IC | SOJ-20 | MC145191F | | |
| 85 | 1 | U8 | SMT IC | SOJ-24 | MC13156 | | |
| 86 | 1 | Q9 | Transistor, SMD | SOT-23 | NI | | |
| 87 | 3 | Q1, Q3, Q10 | Transistor, SMD | SOT-23 | MMBT3904 | | |
| 88 | 1 | Q2 | Transistor, SMD | SOT-23 | MMBT3906 | | |
| 89 | 3 | D3, D4, D5 | Diode, SMD | SOT-23 | SMP1321-01 | | |
| 90 | 1 | Q8 | | SOT-89 | NE46134 | | |
| 91 | 1 | Q12 | Var Cap | SOT-223 | CLY10 | | |
| 92 | 1 | U9 | | TO6/NEC | UPC2758T | | |
| 93 | 2 | D1, D2 | Varactor | | SMV1204-35 | | |
| 94 | 1 | X1 | Crystal, SMD | | 4 MHz | | |
| 95 | 1 | X2 | Crystal, SMD | | 24 MHz | | | b. Method of Operation

The data collection module 110 receives information from the sensor interface modules 102 or directly from wired inputs (status, analog) connected to other external devices, and then processes, stores and transmits the information on to the host module or directly to other systems through a serial port. The data collection module 110 may also be configured to display information locally.

1. Receiving Information From the Sensor Interface Module

The data collection modules 110 collect information from a plurality of different sensor interface modules. One-way transmission from the sensor interface module 102 to the data collection module 110 is preferred because frequent updates to the data collection module provide an adequate time resolution for potential demand reads while allowing the overall system costs to be significantly less than a two-way communication system. In addition, significant power savings can be obtained in the sensor interface modules 102 by utilizing a one-way transmission system between the sensor interface module 102 and data collection module 110. This one-way transmission is acceptable because the sensor interface module 102 transmits at user configurable thresholds.

Other applications may require two-way transmission, such as monitoring and control of lights, security monitoring devices, utility disconnect actions, utility outage reporting, or other control functions.

2. Processing Information From Sensor Interface Module

Information from the sensor interface module 102 is decoded and processed in the data collection module 110 and prepared for transmission to the host module 122. The processor dynamically builds a table that stores the information received from each of the interface modules. Information is grouped by the unique identifier assigned to each individual sensor interface module. This information is further grouped based on the time interval that defines the resolution of the collected information that will be transmitted to the host module. Time synchronization of the data collection module is provided through the host module or the commercial network.

For example, if fifteen minute usage information is desired, then the data collection module will collect all information received from the sensor interface module during a 15 minute interval, take the most current cumulative reading (discard previous readings), and put that information into a packet to be transmitted to the host module.

Information received from new sensor information modules that have not been configured in the host module, will still be processed by the data collection module and transmitted on to the host module. The host module will identify any new sensor information modules and prompt the system user for the required configuration information.

If reports from different data collection modules include some of the same sensor information modules, then the host module will assign one data collection module as primary and all others bearing the same sensor module as secondary.

If the data collection module is assigned primary status for a particular sensor interface module, then the data collection module will transmit information from the new sensor interface module to the host module. Because a data collection module receives information from multiple sensor interface modules, the data collection module can have primary status for some sensor interface modules and secondary status for others. The data collection module will store all of the information received from any sensor interface module. In this manner, a data collection module which has secondary status for a sensor interface module can report information on that sensor interface module if the primary status data collection module is unable to report the information to the host module.

If the data collection module is assigned secondary status for a specific sensor interface module, then the data collection module will not normally report information from that sensor interface module to the host module. The secondary data collection module will only report information from that sensor interface module if specifically polled for that information by the host module.

The memory system of the data collection module 110 is a maintained information-overwrite system. Information that is placed into memory is maintained until overwritten by new information. The data collection module uses a rolling information storage method to maintain information for extended periods while maximizing the system resources. New information that is received from sensor interface modules is written over the oldest information for that module.

The data collection module maintains a variety of information within its memory for the system use. The data collection module maintains the most current information from the sensor interface modules, as well as the recent history, and stores the information for transmission to the host system. For example, in typical electrical utility monitoring cases, the kWH will be accumulated on an hourly basis and peak demand will be determined in 15 minute interval windows. These values are stored for a subsequent retransmission to the host module. The customer can select the data transfer rate that is appropriate to their billing and monitoring system requirements.

The data collection module can also collect information for alarm conditions. Examples of alarm conditions are low battery status and tamper alarms.

3. Processing Information for Local Display

In one embodiment, the data collection module 110 also has the capability to locally display the information contained in its memory. The data collection module 110 maintains the most current information from the sensor interface modules, as well as the recent history, and calculates the energy consumption and peak demand on a predetermined time slot for local display. These values are stored for local display and for possible transmission to the host module upon request.

4. Transmitting Information to Host Module

Data is transmitted to the host module through the transmitter/receiver or other modem device of the data collection module 110. The data collection module 110 concentrates the data collected from the sensor interface modules 102, and uploads the information to the host module on a periodic time basis, at a preset time, or in response to a demand from the host module. Alarm conditions are immediately transferred to the host module.

The communications between the host module and the data collection module is designed to be two-way and interactive. This allows for the data retrieval to be near real-time. Designed response time is approximately 30 seconds from the host module's poll time to the response from the data collection module.

The transmission from the data collection module 110 to the host module may be by means of any number of various systems including Narrow band PCS, Broadband PCS, WPCS, CDPD, cable modems, a phone line with Internet packet data, or other information transmission systems.

In the embodiment described herein, a transmitter/receiver is employed. Other options include delivery through a two-way serial port (RS232) to third party host devices. The data collection module is designed to be adaptable to various information transmission networks and to be upgradeable to new information transmission systems which can support the information flow from the sensor interface modules to the host module.

Another embodiment of the present overall system is the use of the sensor interface modules combined with the data collection module to collect information for customer subsystems where the information is not actually transmitted over a commercial network to a host module. An example of this configuration would be for use on a gas meter system. In this instance, the sensory interface modules are mounted on gas meter index covers and acquire pulse data and transmit it to the data collection module. The data collection module may be located inside a third party data concentrator or in its own weatherproof enclosure. The third party device is connected to the data collection module via an RS-232 communications port which is configured to emulate the data concentrators native communication protocol. The data collection module server thus provides data collection, protocol conversion, and emulation of the third party's data collection scheme such that the data collection module is transparent to the third party data concentrator. In this configuration the third party data concentrator would pull the data collection module using its native protocol. Each data collection module would be able to support up to 32 sensor interface modules. The data collection module can be implemented as a single board solution which is designed to be installed inside the third party communications equipment. And the data collection module can be configured over the serial length from the third party data concentrator.

5. The Data Collection Module as a Data Repeater

If the data collection module is used in remote areas, access to network connections to the host may be few and far between. Thus, it may be necessary for the data collection module to receive information from both sensor interface modules and from other data collection modules and transmit this information towards a data collection module which is connected to the host module through a network system. When the data collection module is used in this manner it is also called a data repeater module.

In one embodiment, the data repeater module is designed to interface with high pressure gas equipment for the monitoring of remote gas line transmission system locations. The data repeater module system uses spread spectrum radio transmission to transmit information in an Internet protocol (IP) stack to get to an Internet or communication line for transmission to the host module. In this manner, each module of the data repeater module system will receive a packet of information and relay the information down the line until it gets to a data collection module with host module transmission capability. The host-module-connected data collection module, or root data collection module, will transmit the information to the host module. The data repeater module can perform both the functions of a standard data collection module in gathering information from sensor interface modules, and perform the repeater functions to get the information to a connected data collection module for transmission over any of a number of the commercial transmission systems for data.

Figure 44:
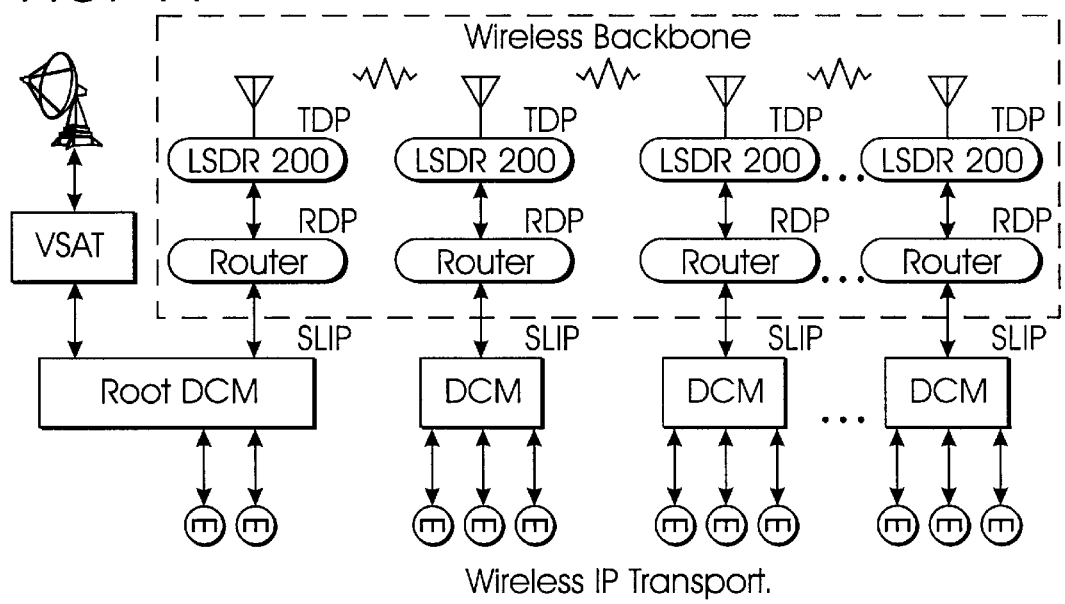
FIG. 44 shows a schematic diagram of the overall data repeater system, called a Wireless Radio Backbone (WRB).

FIG. 44 shows a schematic diagram of the overall data repeater system, called a Wireless Radio Backbone (WRB). The WRB is a wireless radio Serial Line Internet Protocol (SLIP) transport which was designed for bi-directional communication between data collection module processors. Each data collection module has a processor which talks to a router which talks to a radio which transmits and receives signals. Some of the key issues surrounding the WRB will be discussed herein. The following gives general system requirements and specifications for setting up a WRB.

Communications Module

| | |
|---|---|
| CPU: | Motorola 68CH11 |
| RAM: | 32K |
| EEPROM: | 64K to 1M |
| FLASH: | 144K |
| Memory mapping: | PAL |
| I/O control: | PAL |
| Calendar/clock: | 10 year battery-backed RTC |
| Watchdog: | COP |
| Headers: | SPI bus (qty. 2) used for expansion boards Serial ports (qty. 4 + 1) |
| Enclosure: | NEMA 4X with padlock (may vary depending on solar power needs) |
| Power requirements: | 1 amp at 9–16 vdc (25 vdc max) |
| Environmental: | −40 to +85° C. operating at 95% humidity non-condensing |

Flow Computer Module

| | |
|---|---|
| Rosemount 2055 with HART protocol signal | |
| Differential pressure range | 0–10 to 0–250 in $H_2O$ |
| Gauge pressure range | 0–80 to 0–2000 psig |
| Isolator material | 316SST |
| Fill fluid | Silicon |
| Flange style/material | Coplanar/SST |
| Drain/vent material | SST |
| O-Rig | Glass-filled TFE |
| Process temperature | RTD & cable optional |
| Transmitter housing | Polyurethane-covered aluminum |
| Terminal block | Standard block & optional transient protected block |
| Approvals | Factory Manual explosion proof, Factory Mutual intrinsically safe |
| Software functionality | Averaging method: Flow dependent time weighted formulaic averaging Compressibility method: AGA Report No. 8/API MPMS Chapter 14.2, variable logging per API 21.1 |

Spread Spectrum Radio Module

LSDR 200 with TCIP/IP Path Management Module, packaged with Communications Module
System Requirements

| | |
|---|---|
| LSDR 200 | 89C2051 processor 2k bytes of ROM 128 bytes of onboard RAM 512 bytes of non-volatile RAM |
| PMM 200 | 89C52 processor 8k bytes of ROM 256 bytes of onboard RAM 8k bytes of external RAM 512 bytes of non-volatile RAM |
| IP datagram | Min size = 576 bytes (512 bytes of data plus 64 bytes overhead) Max size = 4096 bytes |

Each node in the Radio Backbone (WRB) consists of a 900 mhz Low Speed Data Radio (LSDR 200) and a 8052 based Path Management Module (PMM 200) or router. The router receives SLIP datagrams via a 9600 baud UART from the host data collection module processor interface, fragments them for switched transport, and sends them to another data collection module processor via other radios and routers.

Serial Line Internet Protocol (SLIP) is an encapsulation protocol for point-to-point, serial transport of IP diagrams. SLIP defines a sequence of characters that frame IP packets on a serial line. An END (0xC0) character starts and ends a SLIP packet. In addition, any internal END character is replaced with the character sequence ESC, ESC_END, (0xDBDC) and any internal ESC (0xDB) character is replaced with the character sequence ESC, ESC_ESC (0xDBDD).

IP transports (and hence the WRB) do not guarantee delivery of datagrams; however, they make the best effort they can to deliver the data. Although there are re-tries and time-outs between radios, problems in transport such as unreachable destination or re-assembly timeouts are not reported in the source IP address. Upper-layer protocols, such as TCP, should be used to build guaranteed delivery services on top of the WRB.

The WRB subnet is assigned a unique 32-bit IP address. The root data collection module processor acts as a firewall to all other data repeater module processors and data collection module routers on the wireless backbone subnet. Each data repeater module processor and router has a unique internal, Class C subnet IP address. The first three bytes of the subnet IP address are the same for all data collection modules in the subnet. The last byte selects either a data collection module processor (even byte) or a data collection module router (odd byte). All IP addresses for a data collection module in a WRB subnet are even with the next odd address being assigned to the associated router. This means there can be a maximum of 128 data collection module processors and 128 data collection module routers in a WRB subnet. A LSDR 200 radio passes the even and odd address packets to the router. The root data collection module processor is assigned a default IP address such that any unknown addressed packet is automatically sent to the default address.

The IP Destination Address (DA) and the Total Length (TL) are the only parts of an IP datagram that are used by a WRB router. All other fields such as fragment flags (DF and MR), time to live (TTL), header checksum, source IP address, security, record route, and Internet time stamp are the responsibility of the sender and receiver.

IP datagrams are fragmented into smaller units by the root-router for wireless transport by the LDSR 200 radios. These radios are also referred to as "900 mhz radios," "hopping transceivers," "gateway transceivers," "backbone radios," or more commonly, "900 mhz hoppers." The LDSR 200 radios have limited resources and operate under strict FCC regulations which necessitate smaller datagram communication protocols, namely, Radio Data Protocol (RDP) and Transmission Data Protocol (TDP). It is the responsibility of the destination router to re-assemble the fragmented original datagram.

The Total Length field of an IP datagram contains the length, in bytes, of the IP header and data. The maximum size of an IP datagram is 65,535 bytes. However, a sequence byte is used to keep track of fragmented packets on the backbone and thus, the maximum WRB IP datagram length is 4096 bytes (16×256).

The data collection module router is also known as a Path Manager Module (PMM). The PMM or Router operates in three modes. Mode 0 receives/sends SLIP datagrams between host interfaces according to the internal routing table. Mode 1 receives/sends stream data between host interfaces using the last sent IP address router path. Mode 2 receives/sends character lines also using the last sent IP address. The routing table is held in the router non-volatile RAM (NVRAM) and is used to move RDP packets from router A to router B using other router/radios if necessary. Router table entries can come from any of three sources, namely 1) a router IP command packet, 2) an external hookup with a laptop, or 3) remembering the path of a received RDP packet.

IP packets addressed directly to a router or PMM (ie: the last byte of the IP address odd) are commands or interrogation packets for the router. A command mode is available in router stream mode (mode 1) when a designated byte stream/timing is detected by the router.

Router configurations in the NVRAM can be changed directly with a special cable and a laptop computer via a special program. When the router detects a NVRAM change, it automatically reconfigures itself.

If a non-WRB subnet IP addressed packet appears on the backbone, the packet is routed to the root data collection module processor at the default subnet IP address.

Data Repeater Module Processor

Data repeater module processors communicate using SLIP encapsulated Internet Protocol (IP) datagrams. The Radio Backbone (RB) uses the SLIP protocol for input and output data to the RB Path Management Module. An IP datagram from a data collection module processor is sent to its router (via SLIP) for transport to the destination router and its data collection module processor. Only the 16-bit Total Length and 32-bit Destination Address fields of an IP datagram are used by the router. The following shows the general IP protocol for data repeater module communications.

```
<-------------------------------32 bits------------------------------>
0    Version/1HL    Type of Service              Total Length
4                   Identification         O/DF/MF/ Fragment Offset
8    TTL            Protocol               Header Checksum
12                          Source Address
16                       Destination Address
20                         Options/Padding
24                              Data
```

| Field | Description | Length | Index |
|---|---|---|---|
| Version/IHL | | 1 | 0 |
| Type of Service | | 1 | 1 |
| Total Length | Total Length of the IP datagram | 2 | 2 |
| Identification | | 2 | 4 |
| O/DF/MF/Fragment Offset | | 2 | 6 |
| TTL | | 1 | 8 |
| Protocol | | 1 | 9 |
| Header Checksum | | 2 | 10 |
| Destination Address | Destination IP Address | 4 | 12 |
| Options/Padding | | 4 | 16 |
| Data | | | 20 |

Path Management Module

A Path Management Module/Router is the gateway to the WRB. A router operates as an SLIP backbone (mode 0) or as a byte stream, point to point link (modes 1 & 2). In mode 0, a SLIP datagram is received by the router from the host interface and broken into sequenced Radio Data Protocol packets (RDP) for transport to another router via the LSDR radios. Such a transfer may involve many router/radio nodes.

IP datagrams are completely encapsulated in the data fields of RDP packets. The sequence byte allows for up to 16 packets or fragments to be transported for a single IP datagram. This translates to a maximum IP datagram length of 4096 bytes (16×256) that can be transported by the RB subnet.

Each router maintains a routing table to get IP datagrams from point A to point B using other LSDR 200 radios if necessary. Each router has a unique Class C subnet IP address which is used to change and interrogate configuration parameters. In addition, an external port is available such that a laptop computer can be connected to the router and with special software, be able to configure the non-volatile configuration RAM (NVRAM). When the router detects a change in the NVRAM, it reconfigures itself automatically.

The router communicates to the host interface through a 9600 baud UART. The router communicates to the LSDR 200 radio interface with RTS and CTS handshaking. In mode 0, the router expects a RDP acknowledgement packet back from the destination router when a complete RDP packet has been received. If the transfer was successful, the internal packet is thrown away. Otherwise, because of an unsuccessful acknowledgement or a timeout, the RDP packet will be re-sent up to the configurable retry count.

The routing tables are held in the router non-volatile RAM and are used to move RDP packets from router A to router B using other router/radios if necessary. Router table entries can come from any of three sources, namely 1) a router IP command packet, 2) an external hookup with a laptop, or 3) recording the path of a received RDP packet.

The following shows Normal and Acknowledge radio data protocol (RDP) packets.

| Sync Word | Destination | Src. | ID | Cmd | Hop | nRts | Routes | Seq | Len | Data | CkSm | |
|---|---|---|---|---|---|---|---|---|---|---|---|---|
| CFA3593E 4 | XX XX XX XX 4 | XX 1 | XX 1 | 00 1 | XX 1 | XX 1 | 15 bytes 0–15 | XX 1 | XX 1 | 255 bytes 0–255 | XX 1 | 16 to 286 bytes |

| Sync Word | Destination | Src | ID | Cmd | CkSm | |
|---|---|---|---|---|---|---|
| CFA3593E 4 | XX XX XX XX 1 | XX 1 | XX 1 | FX 1 | XX 12 bytes | |

| Field | Description | Length |
|---|---|---|
| Sync Word | (0-CFA3593E) 4-byte sequence used to detect start of RDP Packet. To sync up, precede this pattern with 290 0x7E's | 4 |
| Destination | 4 byte IP address. If RB subnet address, then the first 3 bytes are the subnet address while the last byte is a data collection module address (even) or a router address (odd) | 4 |
| Src | 1 byte source subnet address | 1 |
| ID | Packet number (incremented for every different packet) | 1 |
| Cmd | 0x00 --> Mode 0 IP packet.<br>0x01 --> Mode 1 character packet.<br>0x02 --> Mode 2 line packet.<br>Note: add 4 for each retry (ie. 0x04 is 1st retry for IP packet, 0x08 is 2nd, etc.)<br>0x80 --> Set radio IP address (use Destination).<br>0x81 --> Perform radio self check.<br>0xFD --> Timeout.<br>0xFE --> Error in Packet transmission.<br>0xFF --> Packet delivered. (Acknowledge) | 1 |
| hop | Current packet hop count (hop = 0 means arrived) | |
| nRts | Number of route bytes to follow | 1 |
| Routes | Route path for RDP packets. The last byte is the source address. The RDP destination is in the Destination field. The first byte is the next destination. | 0–15 |
| Seq | The first nibble (0–15) plus one is the RDP packet number. The second nibble (0–15) plus one is the total number of RDP packets. | 1 |
| | The length of the data field in the RDP packet. | 1 |
| Data | The data transferred by RDP packets. If the packet destination is even, then the data is an IP fragment. If the destination is odd, the packet is router data. | 0–255 |
| CkSm | Checksum byte. | |

The following shows a listing of RDP commands.

| Cmd | Description | Length | Radio/pmm | Radio/rx |
|---|---|---|---|---|
| 0x00 | Mode 0 IP packet | 16–286 | Send | Check |
| 0x01 | Mode 1 character packet | 16–286 | Send | Check |
| 0x02 | Mode 2 line packet | 16–286 | Send | Check |
| 0x80 | Set radio IP address (use Destination) | 12 | Set IP address | |
| 0x81 | Perform radio self test. | 12 | Perform check | Perform self test |
| 0xFD | Timeout | 12 | Send | Check |
| 0xFE | Error in Packet transmission | 12 | Send | Check |
| 0xFF | Packet delivered. (Acknowledgement) | 12 | Send | Check |

PMM Monitor Mode

The PMM on power up, waits 10 seconds for a <CR> to enter a monitor mode. If it receives any other character from the host interface or times out, the NVRAM variables are loaded and it enters normal routing mode.

PMM Commands

When a RDP packet is addressed to a PMM module (odd IP address), the data is interpreted as commands.

Figure 45:
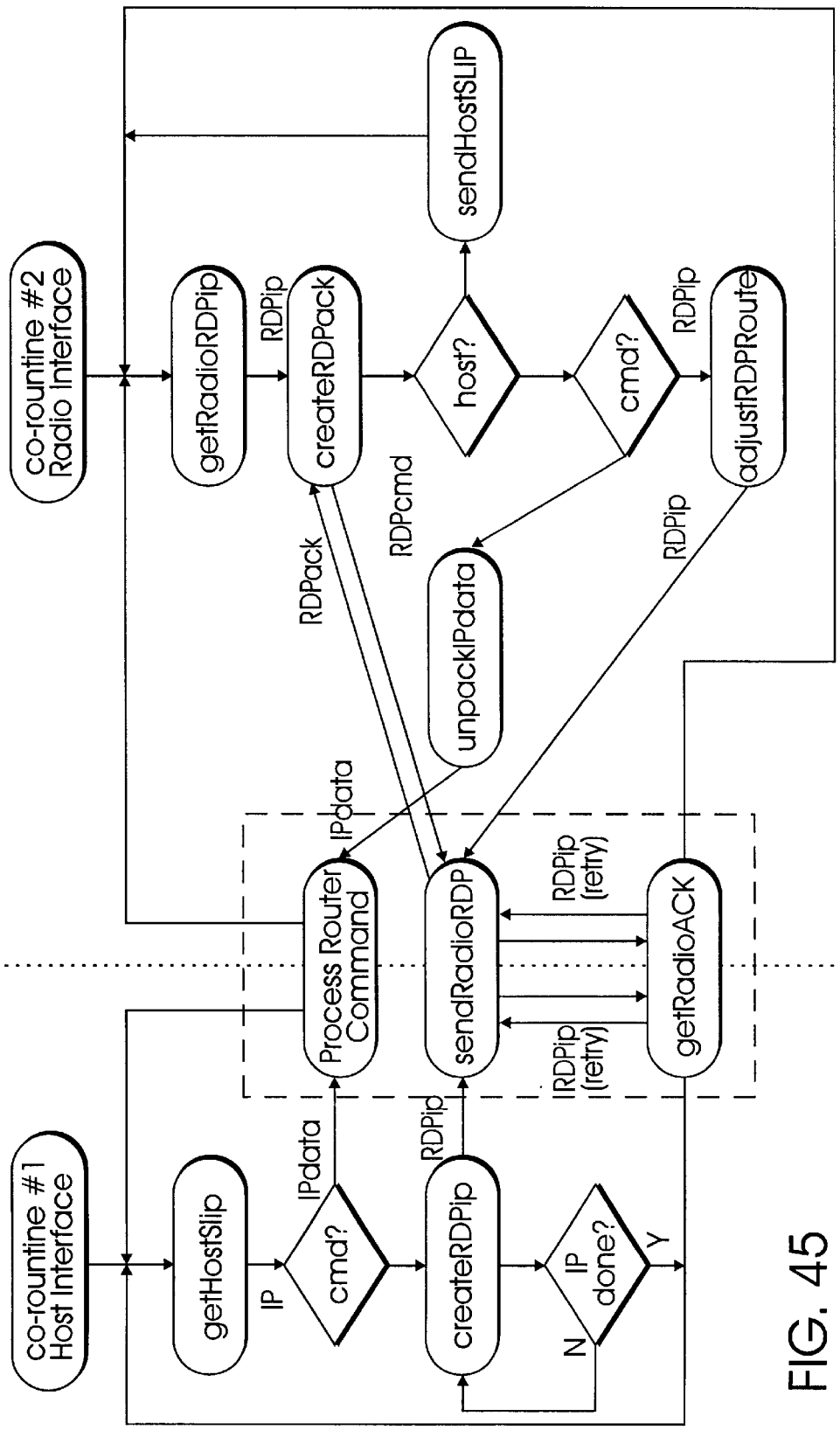
FIG. 45 shows a schematic view of the PMM software design.

FIG. 45 shows a schematic view of the PMM software design.

PMM Errors

Error rates in the PMM either due to time-outs or re-tries are tallied and visually displayed on the PMM error LED as a blink rate. The blink rate and correspsonding current number of errors per hour are listed below. The blink rate is updated every five minutes.

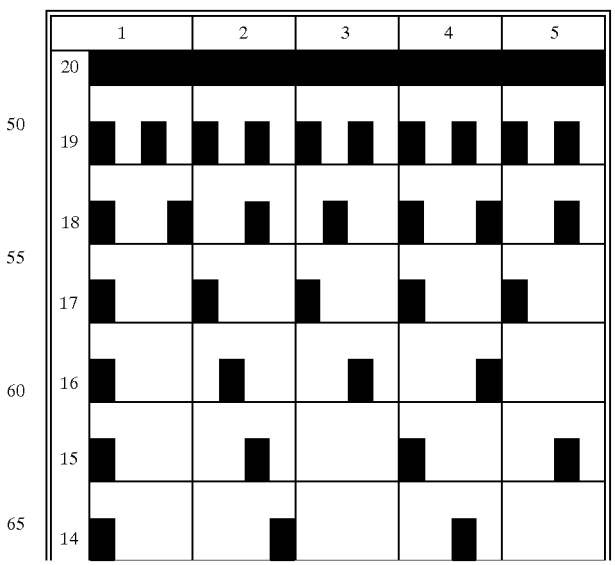

LSDR 200 Radios

The Low Speed Data Radio (LSDR 200) is a point to point hopping transceiver. The radio receives a Radio Data Protocol (RDP) packet, encapsulates it in a Transmission Data Protocol (TDP) packet, and transmits it to another radio. A TDP packet consists of a preamble, sync word, a RDP packet, next frequency, and CRC. When a TDP packet is received by a radio, the preamble and sync words are checked and then the destination address is examined and compared with the node address (masked with 0xFE). If a match is found or a broadcast command is received (cmd=0x02), the data (a RDP packet) is retrieved and passed to the router through the radio interface. If there is no address match, the TDP packet is discarded and not sent to the router or acknowledged to the source radio.

If an acknowledge RDP packet is received with the maximum transmission window time, it will be immediately broadcast. Otherwise, the radio goes into a search mode for other RDP packets.

LSDR's have two operation modes. Mode 0 receives/sends RDP packets for the router packet interface, while mode 1 let's the LSDR act as a serial interface according to a designated connection. In either mode, radio communication is with TDP packets and only point to point without intervening radios or routers.

The router host interface operates at 9600 baud with TRS and CTS controlling data through-put. Because the goal is to provide as close to 9600 baud radio through-put as possible, only a CRC is used to guarantee valid data delivery and no acknowledgment or re-try is implemented. It is the responsibility of a higher level protocol to guarantee data delivery.

Data Encapsulation

The following illustrates the data encapsulation for a TDP, RDP and an IP.

| | | | TDP | | | | | |
|---|---|---|---|---|---|---|---|---|
| Preamble | Sync Word | Destination | Src | Cmd | Data | Next Freq | CRC | |
| 7E 7E 7E 7E | CF A3 59 3E | XX XX XX XX | XX | XX | 275 bytes | XX | XX XX | 20 to 291 bytes |
| 4 | 4 | 4 | 1 | 1 | 0–275 | 1 | 2 | |
| | | | <---RDP Packet---> | | | | | |

| | | | RDP | | | | | |
|---|---|---|---|---|---|---|---|---|
| Sync Word | Destination | Src | Cmd | # Routes | Routes | Sequence | Length | Data |
| CF A3 59 3E | XX XX XX XX | XX | XX | XX | 15 bytes | XX | XX | 255 bytes 13 to 283 bytes |
| 4 | 4 | 1 | 1 | 1 | 0–15 | 1 | 1 | 0–255 |

-continued

IP

|  | <---32 bits---> | | |
|---|---|---|---|
| 0 | Version/IHL | Type of Service | Total Length |
| 4 | | Identification | 0/DR/MF/ Fragment Offset |
| 8 | TTL | Protocol | Header Checksum |
| 12 | | Source Address | |
| 16 | | Destination Address | |
| 20 | | Options/Padding | |
| 24 | | Data | |

Datagram/Packet Flow

Figure 46:
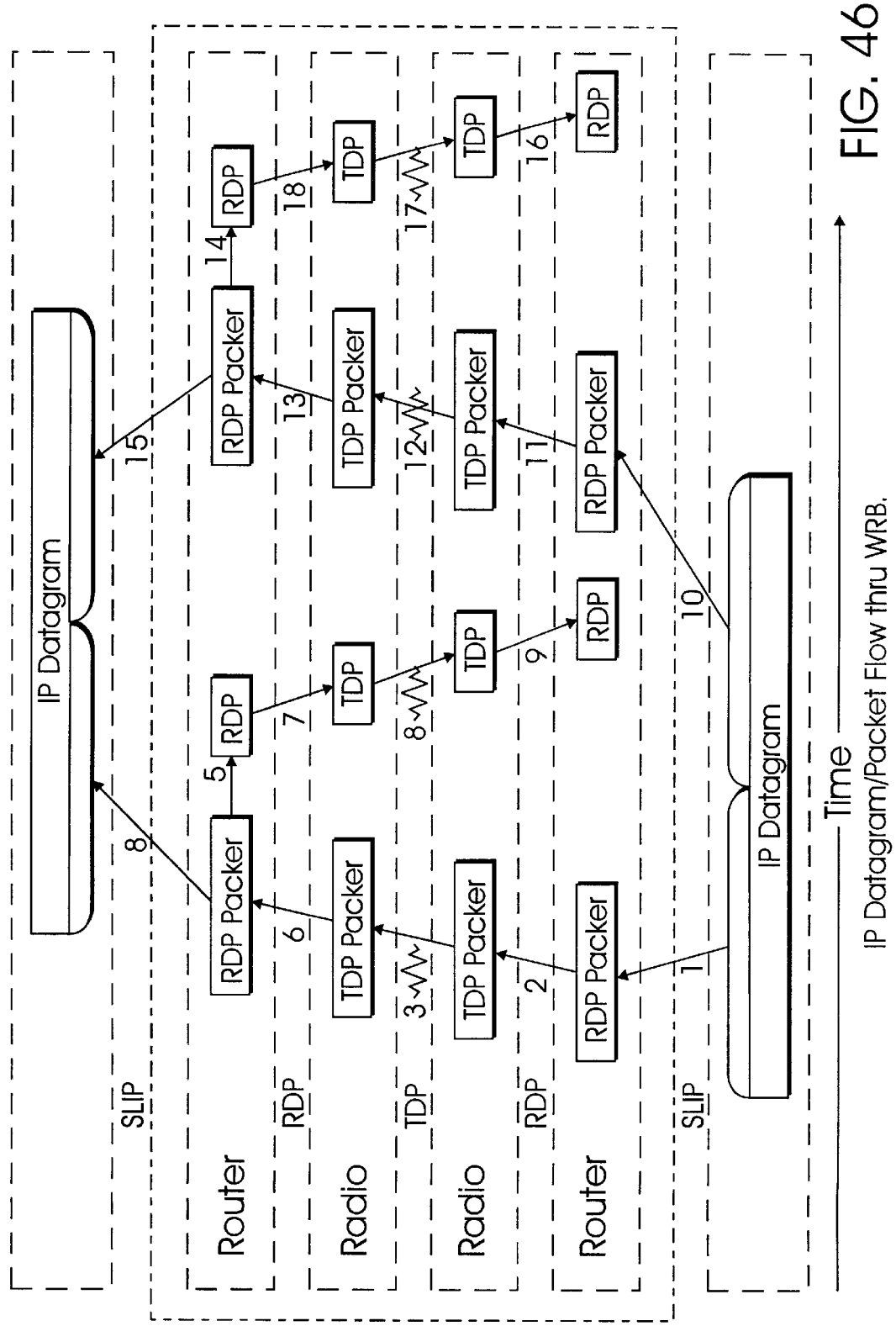
FIG. 46 shows a schematic representation of a IP datagram/Packet flow through the WRB.

FIG. 46 shows a schematic representation of a IP datagram/Packet flow through the WRB. An IP datagram (1) is encapsulated in SLIP and sent through the host interface to the router. The router creates a RDP packet by appending a preamble to the front of a 256 byte fragment of the IP datagram and sends it to the radio (2). The radio receives the RDP packet and creates a TDP packet by appending a preamble, next frequency, and CRC. This packet is broadcast for reception by other radios (3).

When a radio receives a TDP packet (3) that matches its address, the preamble is stripped and the RDP packet (4) is sent to its router. The router sends an acknowledgement RDP packet (5) back to the source and the IP RDP fragment is encapsulated in a SLIP packet and sent on to the data repeater module processor (6).

The radio receives the acknowledgement RDP packet (7), encapsulates it in a TDP packet and sends it back to the source radio (8). The RDP ACK packet is passed to the source router (9) at which time, the router releases its resources and receives the next segment of the SLIP datagram (10).

This process continues until the IP datagram has been transmitted to the destination data controller module processor.

Figure 47:
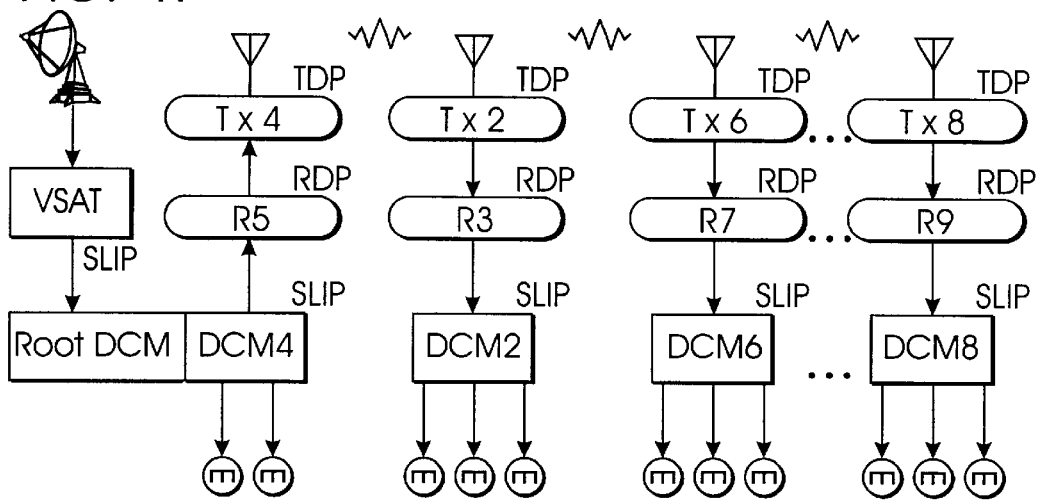
FIG. 47 shows a layout of a WRB for a walk-through example.

FIG. 47 shows a layout of a WRB for a walk-through example.

The following lists a walk-through example of a WRB communication.

| | | | | | |
|---|---|---|---|---|---|
| 1. Root Data Collection Module (DCM) receives IP datagram from VSAT. | 137.75.52.10 | 137.34.9.55 | | | WinGate 8/IP datagram |
| 2. DCM extracts RB subnet address from IP data and sends SLIP data to root RB router R5 with WG8 address. | 22.22.22.8 | 137.34.9.55 | | | IP datagram |
| 3. Router R5 packetizes 256 bytes of IP datagram into a RDP packet and uses router table to create delivery path (8:4→3→7→8). RDP packet is sent to radio Tx4 | 22.22.22.3 | 4 | 0 | 7.8 | IP datagram |
| 4. Radio Tx4 adds preamble/sync to RDP packet to router R3 and transmits. | Pre/sync | 22.22.22.3 | 4 | 0 | 7.8 IP datagram |
| 5. Radio Tx2 receives TDP packet, verifies correct destination, and sends the RDP packet to router R3. | 22.22.22.3 | 4 | 0 | 7.8 | IP datagram |
| 6. Router R3 verifies a valid RDP packet, generates an acknowledge RDP packet to send to source router R5, and sends it to its radio Tx2. | 22.22.225 | 3 | FF | | |
| 7. Radio Tx2 encapsulates the acknowledge RDP packet into a TDP packet and transmits. | Pre/sync | 22.22.22.5 | 3 | FF | |
| 8. Upon reception of acknowledge TDP packet, Tx4 verifies correct destination and sends acknowledge RDP packet to router R5 which then releases the packet memory (no re-try necessary). | 22.22.22.5 | 3 | FF | | |
| 9. Router R3 modifies the RDP packet to address router R7, puts its address as the last route (source), and sends to radio Tx2 for transmission. | 22.22.22.7 | 3 | 0 | 8.4 | IP datagram |
| 10. Radio Tx2 adds preamble/sync to RDP packet and transmits. | Pre/sync | 22.22.22.7 | 3 | 0 | 8.4 IP datagram |
| 11. Radio Tx6 receives the TDP packet, verifies its destination, | 22.22.22.7 | 3 | 0 | 8.4 | IP datagram |

| Step | | | | | |
|---|---|---|---|---|---|
| and sends the RDP packet to router R7. | | | | | |
| 12. Router R7 verifies a valid RDP packet, generates an acknowledge RDP packet back to the source router R3, and sends it to radio Tx6. | | 22.22.22.3 | 7 | | FF |
| 13. Radio Tx6 encapsulates the acknowledge RDP into a TDP packet and transmits. | Pre/sync | 22.22.22.3 | 7 | | FF |
| 14. Upon reception of acknowledge TDP packet, Tx2 verifies destination and sends acknowledge RDP packet to router R3 which then releases the packet memory (no re-try necessary). | | 22.22.22.3 | 7 | | FF |
| 15. Meanwhile, router R7 modifies the RDP packet to address router R8 DCM8, puts its address as the last route (source), and sends it to radio Tx6 for transmission. It updates its router table. | | 22.22.22.8 | 7 | 0 | 4.3 IP datagram |
| 16. Radio Tx6 adds preamble/sync to RDP packet and transmit. | Pre/sync | 22.2222.8 | 7 | 0 | 4.3 IP datagram |
| 17. Radio Tx8 receives TDP packet, verifies its destination and sends the RDP packet to router R9. | | 22.22.22.8 | 7 | 0 | 4.3 IP datagram |
| 18. Router R8 verifies a valid RDP packet, generates an acknowledge RDP packet back to the source router R7, and sends it to radio Tx8. | | 22.22.22.7 | 9 | | FF |
| 19. Tx8 encapsulates the acknowledge RDP into a TDP packet and transmits. | Pre/sync | 22.22.22.7 | 9 | | FF |
| 20. Upon reception of acknowledge TDP packet, Tx6 verifies destination and sends acknowledge RDP packet to router R7 which then releases the packet memory (no re-try necessary). | | 22.22.22.7 | 9 | | FF |
| 21. Router R9 sees that the RDP packet is for WG8 and sends it through the host interface to WGS as a fragment of an IP datagram. R9 also updates its router table to the root DCM (0:8→7→3→4). | | 22.22.22.8 | 137349.55 | | IP datagram |
| 22. This process continues until a complete IP datagram has been transmitted from the root data collection module to DCM8. | | | | | |

3. The Host Module a. Overview

Returning to a consideration of FIG. 1, host module 122 is in communication with the data collection modules 110 through a network system. The host module 122 is a centrally or regionally located control center or centers which is used to monitor and control all the information exchange required by the monitoring system. The host module monitors the network health, processes customer requests, and notifies the customer authorities of alarm conditions. The host module also performs the functions of a data warehouse which collects all the information from the system and transmits the processed information to the customer's processing and display facilities.

The host module receives the information from the sensor interface module through the data collection modules. The data collection module information is transmitted over commercial carriers, and collected for processing by the host module. The host module then uses application software to compile the information into a user specified readable format. This information may then be made available to the customer. Types of available information include energy usage analysis, energy management operations and energy billing services.

In an alternate arrangement, the host module could be by-passed and a direct link might be provided from the data collection module to a customer's host system. In this application, the data collection module would be programmed to transmit in a manner compatible with the customer's system.

b. Physical Characteristics

The host module is typically a 24 hour per day×7 day per week network control center which consists of hardware devices designed to control and monitor information storage, processing and retrieval. The host module contains a main processing computer, such as a Sun Sparc™ Workstation; access to commercial communication networks, such as Skytel; data storage components, such as a Microsoft Access™ database run on dual Intel™ based NT servers; and communication output connections, such as connections to the Internet.

c. Method of Operation

The host module receives data from a plurality of sensor interface modules through the data collection modules 110 and data repeater modules. The host system validates the data and passes the validated data to an internal data base, such as an Oracle™ data base running on redundant workstations. The database maintains a complete history of information received from the sensor interface modules. The data is stored and available to customers as needed. The host module uses this internal data base to provide information which is processed for communication transmission at the customer's request.

Figure 48:
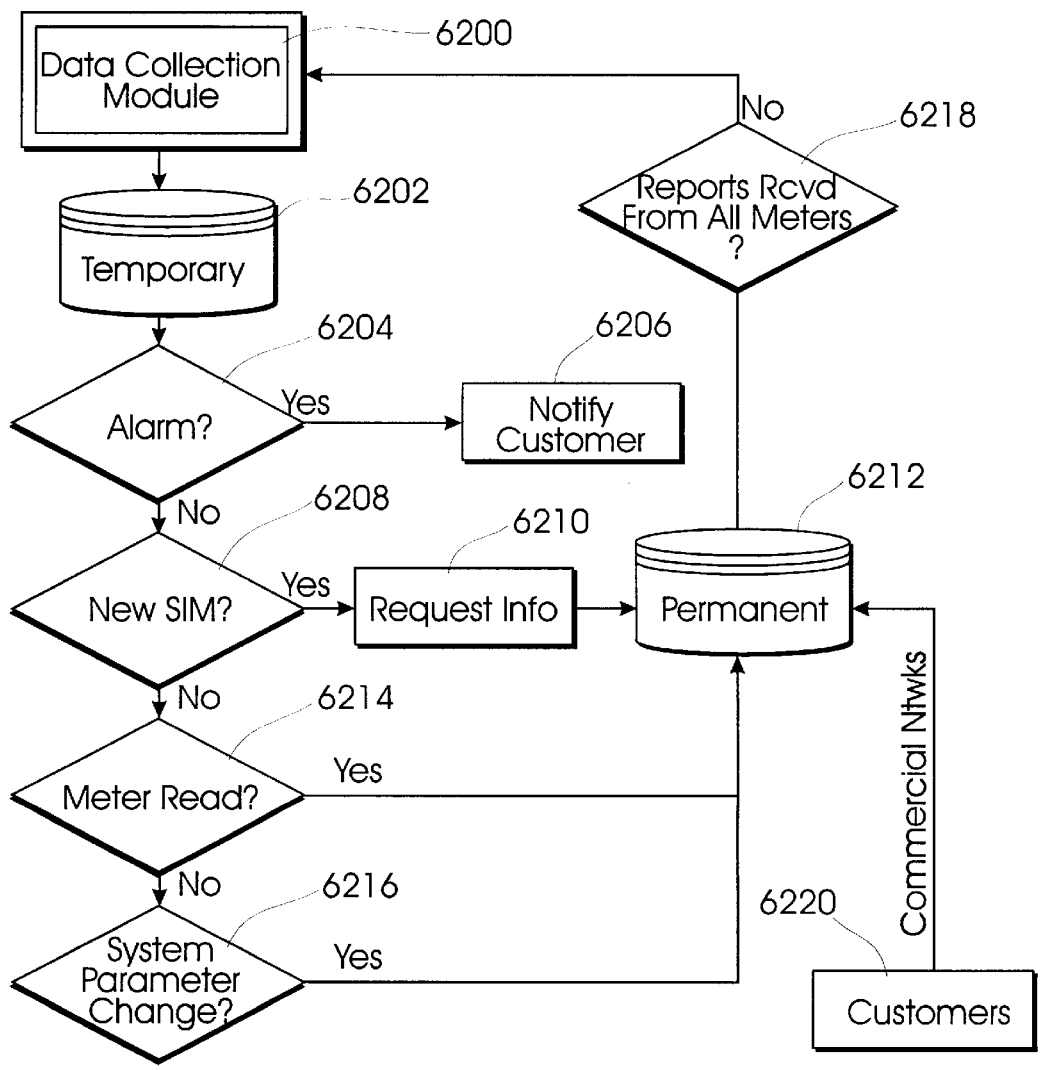
FIG. 48 is a flow chart of operation of the host module.

FIG. 48 is a flow chart of operation of the host module 122. Information is received from the data collection module 6200 and placed into temporary memory storage 6202. The information is then processed to determine the type of data signal contained within the information, and the appropriate action is taken for the information received.

First, the information is tested to see if it is alarm condition 6204. If the information is in alarm condition then the customer is immediately notified 6206. The program then resumes normal operation. If the information is not in alarm condition, then it is tested to see if it is a new sensor interface module that has been detected 6208.

If a new sensor interface module has been detected 6208, then the data collection module will request information 6210 from the host module. The host module will assign a reporting priority to the data collection module receiving the sensor interface module signal. If the data collection module is the first data collection module to report information from the sensor interface module, then it will be assigned primary responsibility for reporting that sensor interface module's information. All other data collection modules reporting information from the same sensor interface module will be assigned a secondary reporting responsibility. The main program will then add the sensor interface module information and the primary or secondary status of the data collection module to the permanent storage record 6212.

If a new sensor interface module had not been detected 6208, then the information would be tested to see if it was a proper reading of a meter 6214. If the information was a proper meter reading 6214, then this information would be added to permanent data base 6212 to update the system information.

If the information was not a meter reading 6214, then the information would be checked to see if it was a proper system parameter change 6216. If the information was a system parameter change 6216 then this information would also be added to the permanent data base 6212.

If the information fails the system parameter change 6216 then the signal has failed all of the proper signal tests and it is discarded from the main processing of the system.

Once information has been transferred into the permanent or long term storage facilities 6212, then the information is available to customers through a commercial network 6220. The information is made available in any manner the customer requires. This manner of transmitting information can be programmed into the host module. Standard commercial networks which can be used are items such as cable TV modems, regular phone line modems, the Internet, or other such communication devices.

Once all the information has been stored in the permanent data base structure 6212, then the system will return 6218 to receiving reports from the meters at the data collection module 6200.

1. Receiving Information From the Data Collection Modules

The data collection modules 110 transmit information to the host module. In the preferred embodiment, the data collection modules transmit the information through a commercial network to the host module. Alternatively, the host module can request updates from the data collection module as needed.

In the preferred embodiment, the data collection module will be assigned an Internet address and communicate through a modem as is well known in the prior art. The host module will be assigned an address for transmitting and receiving the data collection module signals. The data collection module will send and receiving information to and from the host module as an Internet protocol (TCP/IP) signal. The information signal will be sent out on the Internet, transferred across the Internet, and received by the other module. This connection allows the use of an extensive network of high grade communication equipment without having to implement an entirely new system for this information collection system.

This Internet transmission system allows for the use of a minimum cost information transmission system, because already existing phone lines may be used, and only local telephone calls are necessary for connection to the Internet. In addition, the Internet service provider may collect the non-alarm condition data collection module signals and create a single data stream signal into the host module at an off-peak usage time for non-critical monitoring applications. A critical monitoring application would require immediate information access and the signals should not be held for later transmission.

2. Processing Information From the Sensor Interface Module

Once the data stream is received by the host module 122, the data stream is verified for accuracy. The data stream is then divided into the individual sensor interface module information packets. These individual information packets are then used to update the appropriate meter information and storage databases. This updated information is stored into both the most recent information database as well as the long term or permanent database.

3. Storage of Information for Later Retrieval

Information which has been received from the sensor interface modules is stored for later processing by the host module. The information is stored in a short time database. This short time database contains current readings and a definable number of days, 30 days in the preferred embodiment, of the most recent information history.

The validated data from the sensor interface modules is also permanently stored in a long term database. The long term database maintains a complete history of each meter interface device. The data is maintained on behalf of the customer for access by the customer either on demand or on a periodic basis.

4. Transmitting Information to Customers

Information is transmitted to the customer in a customer defined manner. The information is preferably made available over an Internet or other TCP/IP type connection with appropriate protocols and connections. An Internet or other TCP/IP type of connection allows customers to use software applications which allow the user to graphically view the stored information and their energy consumption rates. Other information can be provided through this system as the customer may desire. In the preferred embodiment, the Internet connection allows the customer to see their energy consumption in a graphical format for daily, weekly, monthly, and yearly usage rates by simply accessing a web site on the Internet. In addition, the software allows the customer to run "what-if" software and compare their existing bill against alternative billing options available by their electricity supplier.

5. Device Adjustment Modules

Device adjustment modules are used to monitor and control the operation of various devices and applications according to varying utility prices and the device consumption information. An example of a device control module is a module to control a Johnson Control™ thermostat by attaching a device control module with a power system, processor with associated firmware, and a radio. The module monitors the energy usage by the air conditioning and heating systems controlled by the thermostat and can adjust the operation usage to stay below increased billing increment costs for energy supply and usage. A two-way sensor interface module would be utilized. The device adjustment module transmits information to the system and receives controlling information from system update transmissions.

4. Complete System Overview

Figure 49:
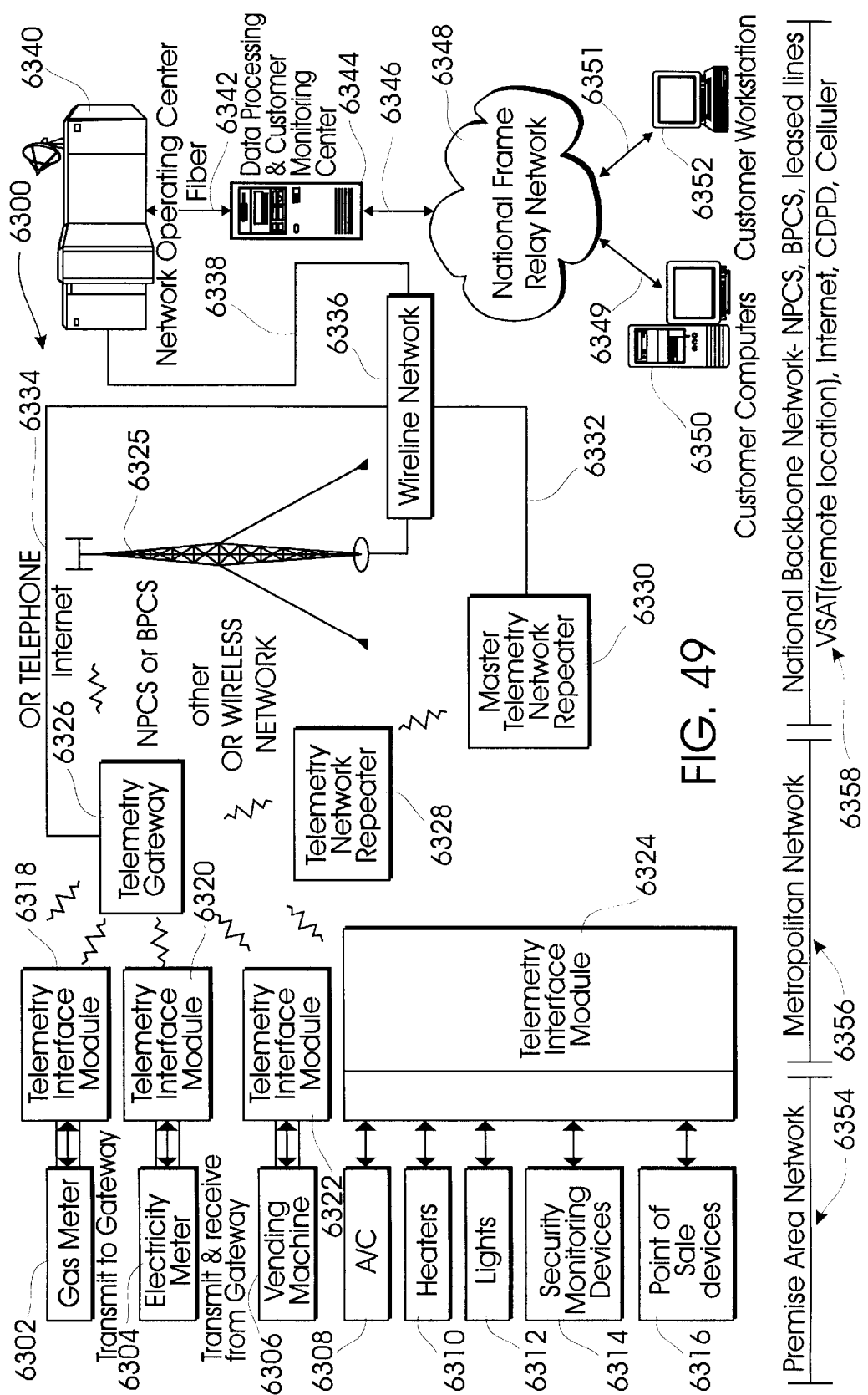
FIG. 49 shows an example of an overall network schematic implementing the present invention.

FIG. 49 shows an example of an overall network schematic generally designated by the numeral 6300 implementing the present invention. In this example, a gas meter 6302 is connected to a transmitting and receiving sensor interface module 6318 which transmits and receives information from a data collection module 136. An electrical meter 6304 is connected to a second transmitting and receiving sensor interface module 6320 which also transmits and receives information to and from data collection module 6326. A vending machine 6306 is connected to a transmitting and receiving sensor interface module 6322 which transmits and receives information to and from data collection module 6326. Air conditioning system 6308, heaters 6310, lights 6312, security monitoring devices 6314, and point of sale devices 6316 are all connected to transmitting and receiving sensor interface module 6324 which transmits and receives information to and from data collection module 6326.

Data collection module 6326 is connected to commercial network 6336 by at least one communication system such as those illustrated. The data collection module 6326 is shown with a connection to the commercial wireline network 6336 through a telephone type system 6334. A second alternative for connection of the data collection module 6326 to the commercial network 6336 is shown by the NPCS or BPCS 6325. A third alternative for connection of the data collection module 6326 to the commercial network 6336 is shown through the use of a data repeater module 6328 and a connected data collection module 6330 which can communicate directly with communication network 6336 through connection 6332.

Communication network 6336 is connected through connection 6338 to network operating center 6340. The network operating center 6340 is connected through connection 6342 to host module 6344 which is also known as a data processing and customer monitoring center. The host module 6344 is connected through connection 6346 to the national frame relay network 6348. The national frame relay network 6348 is connected through connection 6349 to customer computers 6350. The national frame relay network 6348 may also be connected through connection 6351 to customer workstation 6352.

The general layout of the wide area remote telemetry system 6300 is formed from the premise area network 6354, the metropolitan network 6356 and the national backbone network 6358. The premise area network 6354 consists of the monitored devices, the sensor interface modules, the data collection modules and the connections to the appropriate elements. The metropolitan network 6356 consists of the data collection modules, and the appropriate connections such as a NPCS or BPCS, or data repeater module and master data collection module. The national backbone network 6358 consists of the elements which transmit, process, store, and forward information to the end customer connections, such as a customer computer or a customer workstation.

Whereas, the present invention has been described in relation to the drawings attached hereto, it should be understood that other and further modifications, apart from those shown or suggested herein, may be made within the spirit and scope of this invention.

What is claimed is:

1. A pulse encoder for a sensor interface module, said pulse encoder for use with an existing meter having a meter dial, said encoder comprising:

an encoder shaft having a first end with a top and bottom, and a second end having an attachment clip, wherein said bottom is slotted to fit over a meter dial and said top has a shoulder;

a surrounding spring mounted around said encoder shaft and biased against said shoulder;

an encoding magnetic field generator having a central opening therethrough, wherein said generator is mounted over said encoder shaft in order to rotate with said encoder shaft and biased against said surrounding spring; and a magnetically actuated reed switch positioned adjacent to said shaft having two flexible reeds, wherein each reed has a contact point for connecting and deconnecting with the contact point of the other reed whereby the rotation of a magnetic field by the magnetic field generator causes the connecting and deconnecting of said contacts.

2. The pulse encoder of claim 1, further comprising:

a positioning end for rotatably positioning said magnetic field generator on said shaft; and an adaptor placed between said encoding magnetic field generator and said positioning end for changing the position of said magnetic field generator in relation to said end.

3. The pulse encoder of claim 2, further comprising:

an encoder faceplate seal for sealably attaching said positioning end to a utility meter cover having said meter dial.

4. A sensor interface module, comprising:

a hardware sensor including a pulse encoder wherein said encoder includes an encoder shaft which is slotted to fit over a meter dial and a magnet having a central opening therethrough with said magnet mounted over said encoder shaft;

a sensor connecting harness;

a central processing unit micro-controller;

a clock;

a battery power supply and or a converter for external power;

a spread spectrum radio transmitter including a synthesizer, a voltage controlled oscillator, a voltage controlled oscillator filter, a power amplifier, an amplifier filter, and an antenna;

a termination cover enclosure main body with mounting location for said hardware sensor;

a front cover; and a front seal which sealably attaches with said main body to said front cover.

5. A sensor interface module as set forth in claim 4 including a mounting adapter for connecting to said harness.

* * * * *